United States Patent [19]
Tulbert

[11] 4,076,414
[45] Feb. 28, 1978

[54] MOTION PICTURE PRINTING APPARATUS

[76] Inventor: David J. Tulbert, 308 Laburnum Crescent, Rochester, N.Y. 14610

[21] Appl. No.: 550,261

[22] Filed: Feb. 18, 1975

[51] Int. Cl.² .............................................. G03B 27/78
[52] U.S. Cl. ........................................ 355/38; 355/83; 355/88
[58] Field of Search ......................... 355/36, 38, 88, 97, 355/83, 84, 37; 250/211 R, 205, 564, 226

[56] References Cited

U.S. PATENT DOCUMENTS

| | | | |
|---|---|---|---|
| 2,691,917 | 10/1954 | Curry | 355/37 |
| 3,085,469 | 4/1963 | Carlson | 355/37 |
| 3,120,782 | 2/1964 | Goddard et al. | 355/38 X |
| 3,519,347 | 7/1970 | Bowker et al. | 355/38 X |
| 3,663,110 | 5/1972 | Rising | 355/38 X |
| 3,761,172 | 9/1973 | Letzer | 355/37 X |
| 3,813,158 | 5/1974 | Zahn et al. | 355/38 |

Primary Examiner—Richard A. Wintercorn
Attorney, Agent, or Firm—Schovee & Boston

[57] ABSTRACT

A high speed, photographic optical printer, for making duplicates of a master motion picture film, wherein the overall exposure and the color balance of the copy film can be automatically controlled and are continuously adjustable over a wide dynamic range by means of electro-optical modulators, such as PLZT ceramic devices, in the light path between the light source and the copy film, and an electric circuit connected to each electro-optical modulator for controlling their transmissivity. In another embodiment, overall exposure is controlled by controlling the electrical energy applied to a pulsed xenon source that is turned on once for each frame.

108 Claims, 22 Drawing Figures

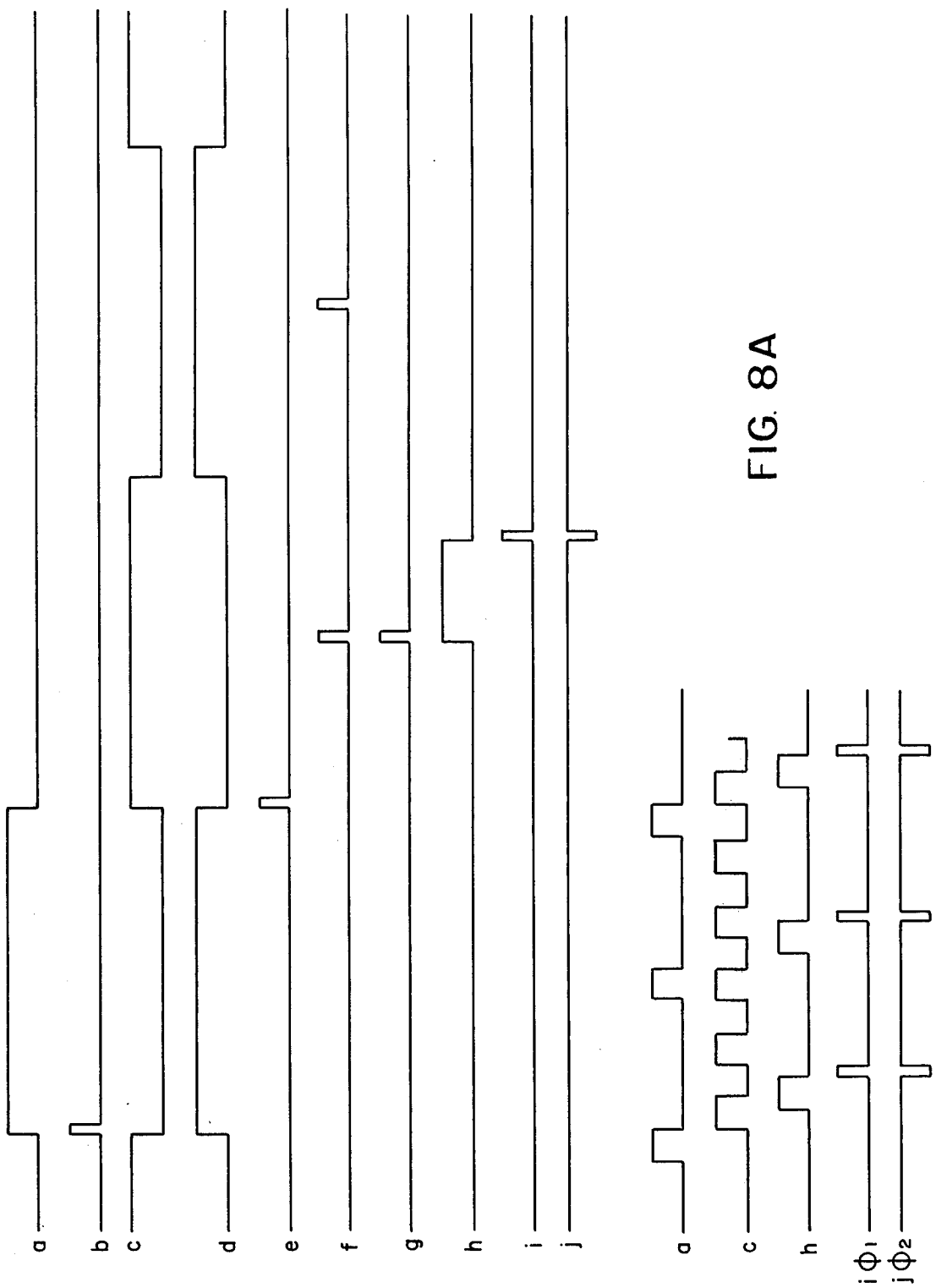

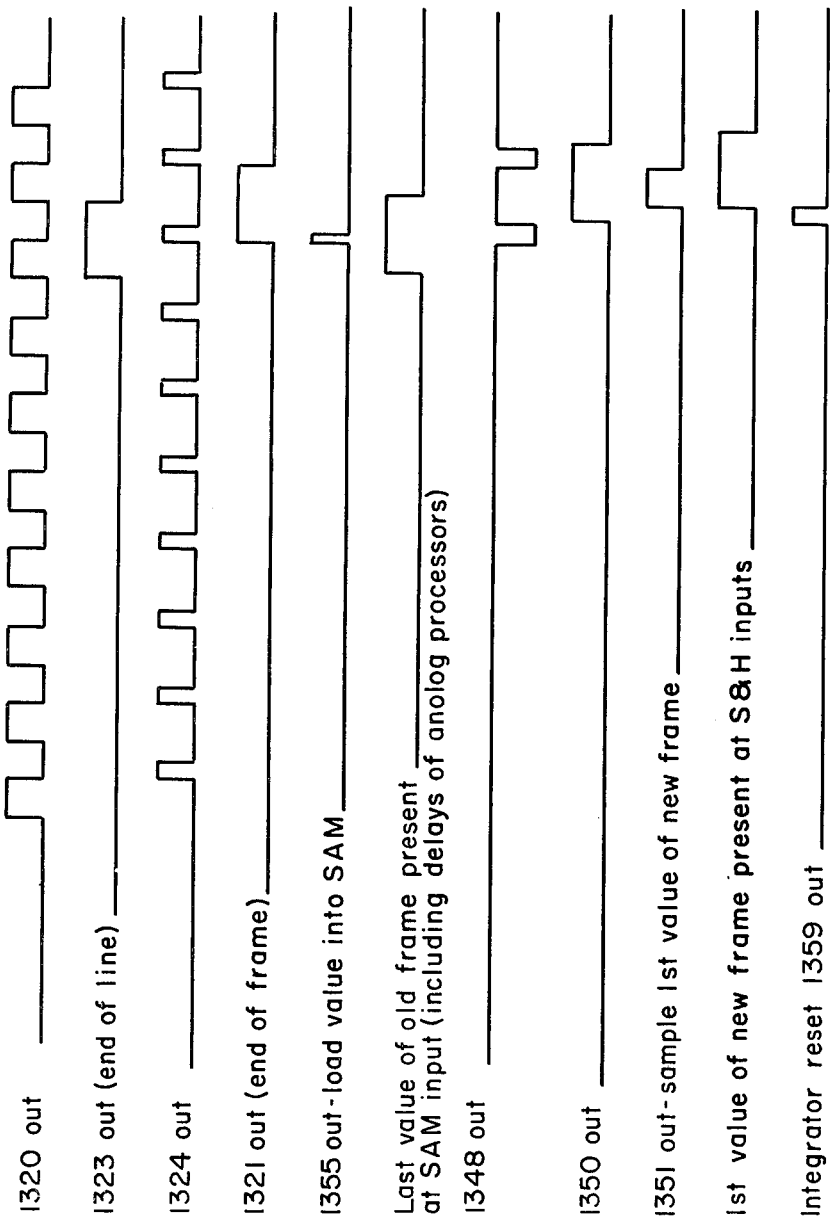

MOTION PICTURE PRINTING APPARATUS

BACKGROUND OF THE INVENTION

1. Field of the Invention

This invention relates to the art of optical printing, and more particularly to improved means for controlling the exposure and/or color balance of the exposed copy over a considerably broadened exposure and color balance range. The invention is particularly useful when the copying rate is high enough to warrant full or partial pre-specification and/or automation of the exposure control and color correction processes.

2. Description of the Prior Art

It is commonly known in the photographic arts to make a photographic reproduction by projecting onto a light sensitive emulsion a focused image of a photographic master negative or positive, contained on a suitable transparent glass or plastic transparent base. The "focused projection" may be accomplished either through a suitable optical system, as is well known in the optical art, or by creating intimate contact between the master image bearing material and the sensitized emulsion or the copy film during the exposure time span. The sensitized emulsion may be fixed on some transparent material such as glass or clear plastic, as is the case for slide and motion picture duplication, or it may be fixed on some opaque medium such as paper as is the case for print production. In either case, some means is necessary for regulating the "exposure" (which may be broadly defined as $$\text{Exp} = \int_o^t I(t) \, dt,$$

wherein $t$ is time and $I(t)$ is the intensity of the illumination passing through the master image and striking the emulsion as a function of time) to insure that as much as possible of the detail present in the master image is reproduced in the copy.

Similarly, with color duplicators, the relative color balance of the exposing light source must be closely regulated to properly adjust for color balance aberations in the master image. In practice, due to the nature of the color photochemical process, the color balance may be adequately controlled by simultaneously controlling the relative exposure delivered by several discrete or partially overlapping regions of the color spectrum, which regions are usually selected to correspond to the peak sensitivites of the chemicals in the sensitized emulsion. These regions are usually red, green and blue for additive printers, and cyan, magenta, and yellow subtractive printers.

In practice, since the overall exposure variation is perceived as a separate parameter from color balance variations, it is convenient, though not always economically or physically practical, to control the overall exposure separately and independently from the ratios of exposures in the different color bands.

Throughout the following description it should be understood that it is often desirable to vary the color balance or exposure widely from the so-called "correct" values to achieve artistic effects or for other purposes. For example, in the art of motion picture duplication, it is common practice to vary the relative frame-by-frame exposure during some fixed number of frames from normal exposure to zero exposure or vice-versa. The resulting image density variation is known as a "fade" and is widely used for artistic effect.

In low speed copying devices such as photographic enlargers and the like, exposure is usually regulated by varying exposure time. The light source may be energized for a given time period or it may be maintained at a constant value and "chopped" by a mechanical shutter. Color balance is controlled by inserting different color filters or combinations in the light path, which selectively absorb some light from certain color spectral bands.

However, in high speed copiers, such as motion picture copiers, these techniques are not satisfactory. Normal tungsten light sources cannot maintain acceptable color stability if they are rapidly switched on and off, and the considerable thermal inertia of a metal filament virtually eliminates such switching as a viable exposure control means at the duplication speeds currently practised. Shutters, by reason of their slow speeds and lack of automation potential, are not used. The usual approach is to maintain the light source at a constant intensity and vary exposure by modulating the intensity of the light output beam. To this end numerous designs for electro-mechanical light modulating valves are in common use. The disadvantages of their use will be discussed below.

Since the usual motion picture master image roll contains numerous scenes spliced together, which may have been photographed under widely varying conditions of illumination, it is usually necessary to make many color balance corrections in the course of a single copy. Since changing filters would require the inconvenience of temporarily stopping the printing operation, another system is commonly used. The light beam from the source is physically split into several preferably non-overlapping color bands, usually the primary colors, red, green and blue, by the action of suitable filters or dichroic mirrors as is well known in the art. Each beam is modulated separately with a separate electro-mechanical light valve, and the several beams are then recombined before being applied to the sensitized emulsion. This gives white light of variable color balance. When this approach is used then over-all exposure is usually regulated by operating the several color control valves in synchronization rather than with a fourth valve since the valves are expensive and transmit only part of the light that strikes them.

Perhaps the most obvious disadvantage in the use of electro-mechanical light valves for exposure and color control modulation is the sacrifice in speed and system versatility. The devices, because they incorporate moving parts, are fairly slow in response time as compared to the frame rates presently used in optical printers. Further, they offer a relatively small number of discrete intensity increments, usually only forty, for exposure and/or color balance variations.

It is correspondingly an object of the present invention to provide a high speed printing apparatus capable of implementing exposure and color corrections virtually instantaneously. A further object is to provide a printer capable of providing continuously adjustable color balance and exposure modulation over a wide dynamic range.

A further disadvantage of electro-mechanical light valves is their settling time. That is, after a command for a change in exposure is delivered, a certain period of time must elapse before the next command can be given.

It is correspondingly an object of the present invention to provide a high speed printing apparatus capable of implementing exposure and color correction commands fast enough so that a new command can be delivered on each frame if desired, even at very fast frame rates.

Because of the versatility limitations mentioned above, electro-mechanical light valves of the type used for exposure corrections cannot be used to create fades, which require smooth yet rapid variation over a large dynamic range. Thus a fourth light valve of a different construction is used to create fades. But even specially constructed fader valves usually offer a very limited number of fade lengths, and usually only the logarithmic intensity function can be implemented. In addition, the use of a fourth light valve adds to the complexity and cost of the machine.

It is correspondingly an object of the present invention to provide a high speed printer capable of implementing all exposure and fade and color balance corrections with only three light valves. A further object of the invention is to provide a printer on which color balance and exposure correction function can be controlled as completely independent orthogonal signals. It is also an object of the present invention to provide a printing apparatus with which fades of any length and conceivable single-valued mathematical function can be implemented, and with which the operator may specify any desired exposure or color balance value from a broad dynamic range for any frame.

The operation of electromechanical light valves can be pre-specified by placing strings of commands on paper tape or a similar digital recording medium. But due to the slowness of response of these modulators, it is impossible at currently practised printing frame rates to automate the color correction and exposure correction processes. Though it is a simple matter to automatically measure the density and color content of a given frame at a high speed, it is impossible with current electro-mechanical devices to make automatic compensation in exposure and color balance at the correct instant when the given frame has entered the printing aperture. This limitation necessitates a technician who visually examines the print in advance and assesses the needed exposure corrections and color balance by eye. He must then prepare a paper tape with the desired corrections to be fed as commands to the light valve system during the printing run.

It is correspondingly an object of the present invention to provide a printer which has the potential, by virtue of its instantaneous response characteristics, for complete automation of the exposure correction and color correction functions. Thus the machine operator must provide data ONLY for those frames for which a deviation from normal color correction or exposure correction is desired.

A further disadvantage of electro-mechanical light valves brought about by their complex mechanical structure is that the interface between the light valve and the control circuits is complex. This necessitates special codes for generating control commands. The codes are difficult to use, being designed for ease of device construction and not for user convenience.

It is correspondingly an object of the present invention to provide a printer capable of interfacing with control electronics capable of accepting color balance, exposure correction, and fade information commands in a format completely compatible with photographic terminology, and further, to provide versatile interfaceability with electronics capable of providing variability in the input language without the necessity for rewiring or re-designing the control circuitry.

While electro-mechanical light modulators can be designed to deliver reasonable absolute accuracy, they cannot be built with fast enough response times to incorporate them in servo-mechanisms operative at frequencies adequate for current printing frame rates. Such servo-mechanisms would allow light output regulation to be independent of light source intensity variations due to line ripple, power droop, or aging of the light source bulb. This deficiency results in the necessity of frequent, usually daily, test runs of the exposure and color balance of the light source. These test runs are both time consuming and costly.

It is correspondingly an object of the present invention to provide a printer which does not have to be calibrated, once initially adjusted. The calibration is entirely independent of long or short term variations in the intensity or color balance of the light source, whatever their causes. It is the invention's further object to provide a printer whose light source power supply does not have to be heavily regulated.

The aforementioned slowness of electro-mechanical light valve response has made it necessary for the motion picture industry to adapt a secondary device as a light chopper. This device is the familiar black leader spliced between shots during checkerboard editing, in a way well known in the motion picture art. The practice is so common that it is no longer generally realized that its necessity partially arises from a deficiency in present printer technology.

It is correspondingly an object of the present invention to provide a printer capable of rapid enough light modulation to wholly eliminate the necessity for opaque leader in checkerboard editing.

The inherent mechanical limitations of fading and exposure control valves makes it difficult or impossible to adjust their transfer functions to closely match the widely varying characteristc curves ("OD vs. log E curves") of different photographic emulsions. As a result, in some cases, fade and exposure corrections, however highly they match certain standardized curves, do not yield optical density corrections or functions in the print which conform closely to those curves. Thus a perfectly logarithmically exposed fade may not appear very logarithmic at all when the print is processed and screened. Another related deficiency often observed is a variation in color balance during fading.

It is correspondingly an object of the present invention to provide a printer whose fade, exposure, and color balance mechanisms can be easily interfaced with standard electronic calibration circuits exactly matched to the characteristic curves of a given film emulsion, which circuitry can be easily replaced or modified if the film stock is replaced.

SUMMARY OF THE PRESENT INVENTION

Exposure and color balance regulated copies of motion pictures are made by employing one or more electro-optical modulators in the light path between the light source and the copy film and electrically controlling the transmissivity of the modulators to control the exposure, etc. of the copy film.

BRIEF DESCRIPTION OF THE DRAWINGS

The present invention will be more fully understood by reference to the following detailed description thereof, when read in conjunction with the attached drawing, wherein like reference numerals refer to like elements and wherein.

DETAILED DESCRIPTION OF THE PREFERRED EMBODIMENTS

Figure 1:
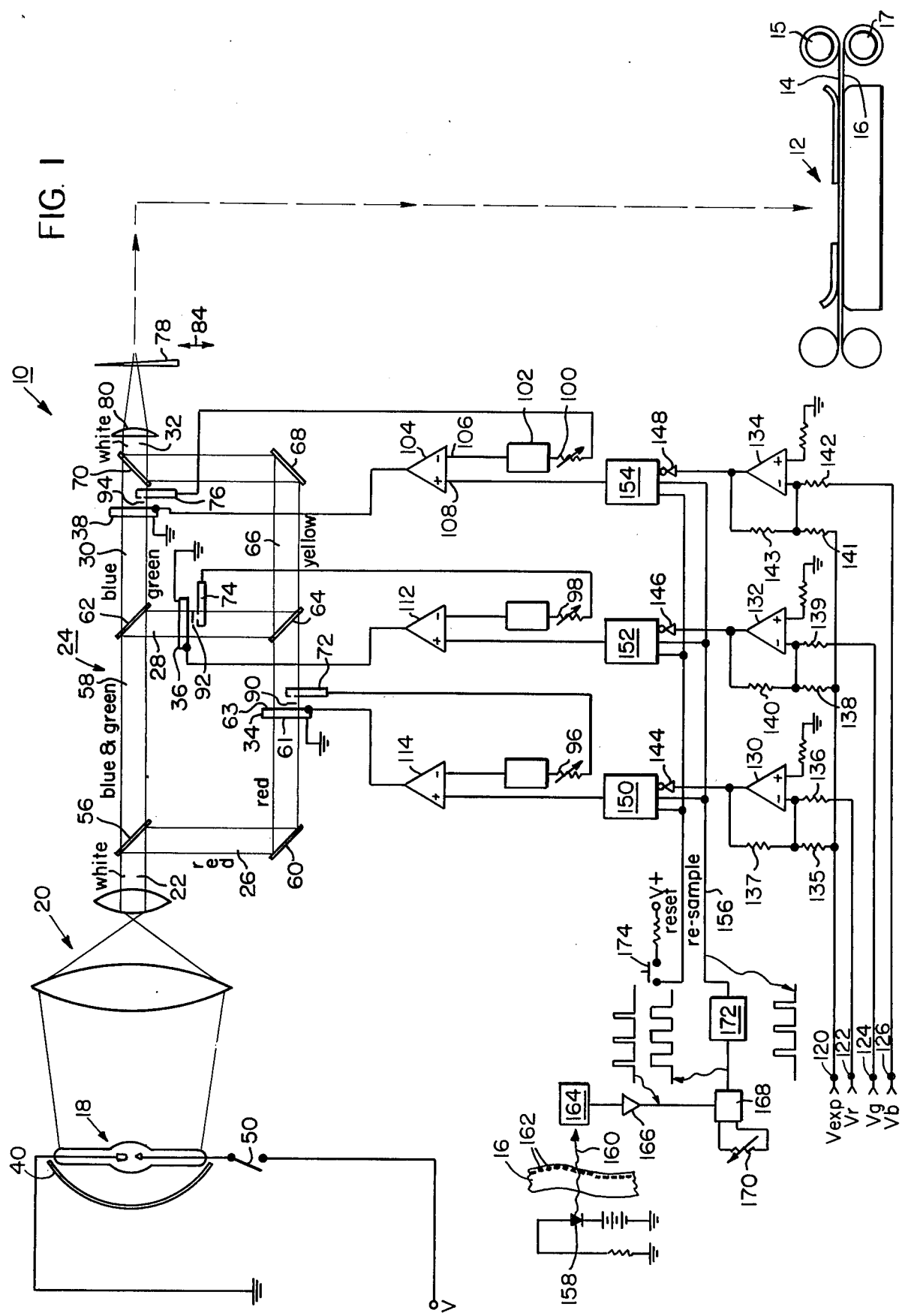
FIGS. 1–19 are partly diagrammatic, partly schematic illustrations of the preferred embodiments of the present invention.

With reference now to the drawings, FIG. 1 shows one embodiment of an optical printer 10 according to the present invention. The optical printer 10 includes an exposure gate 12 where a master film 14 and a copy film 16 are caused to be moved by motors 15 and 17 respectively, together in intimate contact continuously and at a uniform rate past the gate 12 for exposure by the printing light. However, the projection type optical printer can be used without violating the spirit of the invention. The exposure system includes a light source 18, a lens system 20 for collimating the light into a parallel beam 22, a mirror system 24 for separating the beam 22 into three different beams 26, 28 and 30 and then recombining them back into one beam 32, and three electro-optical modulators 34, 36 and 38, one in each of the three different beams 26, 28 and 30 respectively.

The light source 18 can be of any type commonly used such as tungsten or Xenon and can be enclosed, if desired, in a reflector 42 to capture and focus the light.

The use of other types of light sources, such as laser light sources is certainly within the scope of the invention. The use of rotating or moving diffusers for removing the "speckle" phenomenon resulting from the coherency of laser light is well known in the optical art and is not described or shown herein though such modifications for purposes of adapting other types of light sources are not violations of the spirit of the invention.

The mirror system 24 resolves the beam 22 into several spatially separated color bands. For convenience, resolution into red, blue and green bands will be shown, but it is understood that resolution into other colors, and different numbers of colors can be employed, as desired. The mirror system 24 includes a dichroic mirror 56 that reflects red light, producing the beam 26, and transmit a green and blue light beam 58. A mirror 60 reflects the red beam 26 through the electro optical modulator 34 which is used to modulate the intensity of the beam 26, which is preferably a PLZT electro optic ceramic but can also be a Kerr cell, a Pockels cell, a ferro-electric ceramic, a magneto-optical rotator or ferro-magnetic device, an organic liquid crystal device, an electro-optic modulator made from organo-substituted carboranes (see U.S. Pat. No. 3,711,180 and the article "Electrooptic Properties of Ba, Sn, and La Modified Lead Zirconate Titanate Ceramics": by Land and Thacher in "The Physics of Opto-Electronic Materials" Edited by W. A. Albers, Jr., Plenum Publishing Corp.) and any other device which can directly modulate the intensity or polarization characteristics of a light beam through electrical activation the term "electro-optical modulators" is hereby defined for use in the present specification and claims to include all such devices which are transparent to light and which can continuously vary the exposure and to exclude all electromechanical devices such as shutters, etc, having mechanically moving parts). A PLZT modulator includes, for example, a pair of transparent electrodes 61 and 63, one on each side of the PLZT ceramic, or interdigitated conductive electrodes on one surface of the electro-optic modulator, all such electroding systems being within the spirit of the invention. Further, if the electro-optic modulator is of the type which controls the polarization of the light by electrical means, then the modulator unit may include polarizing devices to convert the polarization modulation to an intensity modulation. The need for such polarizers, and their proper use in conjunction with electro-optic modulators is well-known as will be obvious to those skilled in the art. However, the term "electro-optic modulator" is deemed to include the use of such polarizers where necessary. Further, the use of electro-optic modulators that work by electrically inducing variable scattering of an incident beam, which results in variable illumination of a point after the modulator, are deemed to be within the scope of the invention and are thus included within the term "electro-optic modulators" as used in the present specification and claims.

Similarly, the blue and green beam 58 is resolved by a dichroic mirror 62 into the transmitted blue beam 30 and the reflected green beam 28. The beams 28 and 30 are passed through electro-optic light modulators 36 and 38, respectively, which are similar to the modulator 34 in the red beam 26. A dichroic mirror 64 transmits red light and reflects green light and thus serves to recombine the red and green beams 26 and 28 into a yellow beam 66. A mirror 68 reflects the yellow beam 66 into a dichroic mirror 70 which reflects red and green but transmits blue, and thus serves to add the blue beam 30 back into the yellow beam 66 to create the white light beam 32. The color balance of the white light beam 32 can be controlled and varied as desired by electrically varying the ratios of the transmissivities of the electro-optical light modulators 34, 36 and 38, and the over-all light intensity of beam 32 may be varied by varying the overall transmission of the several light modulators while holding the ratios of their transmissivities constant. Detailed electrical drive means for accomplishing these regulations are described below.

Three photodetectors, 72, 74 and 76 are positioned so as to monitor the output beams of the three electro-optic light modulators 34, 36 and 38 respectively. The photodetectors are used in a "closed loop" system to closely regulate the color balance and intensity of the beam. The detailed operation of these closed loops are described below.

The next element in the optical train, which must be outside the feedback loop, downstream from the photodetectors 72, 74 and 76, is a neutral density wedge filter 78 such as is well known in the optical arts. It is placed near the focal point of a lens 80 so that the light passing through it is focused and thus subtends a very small area on the surface of the wedge. The small area prevents the creation of a brightness gradient in an output beam 82, due to the density gradient in the wedge 78 itself. The wedge filter 78 can be moved in the direction of the arrow 84 to adjust the absolute intensity of the output beam 82. This is necessary to adjust the gross exposure to be within the limits of modulation provided by the electro-optic modulator elements. The wedge 78 can be moved throgh the action of a screw or cam attached to a calibrated knob (not shown) to permit accurate adjustment. Alternately, photodetective circuits capable of showing on a meter or other read-out means, the actual intensity of the light output, can be used for purposes of calibration. A true exposure meter, not just an intensity meter, that can aid in the calibration of the invention, will be described below.

Turning now to the electrical operation of the optical printer 10, the several photodetectors 72, 74 and 76 are placed in the several colored beams 26, 28 and 30 so that a portion of the illumination in each spectral band is incident upon their photosensitive surface. If desired, a portion of the illumination may be deflected by partially reflective mirrors, and the photodetectors may be located outside the path of the main beams. Three neutral density filters 90, 92 and 94 are placed, one in front of one each of the photodetectors 72, 74 and 76, and the densities of the filters are chosen to balance the differing sensitivities of the several photodetectors to the different spectral bands striking them. Further balancing can be accomplished by adjusting three potentiometers 96, 98 and 100 in the circuits described below. Different methods of connection of such potentiometers, varying with different photodetectors, are well known in the electrical arts. A good deal of latitude exists in the placement of the photodetectors 72, 74 and 76, but the placement shown is preferred. Photodetectors can be placed in the optical train after the spectral beams are re-combined by placing the proper spectral band-pass filter in front of each detector.

Each one of the electro-optic light modulators 34, 36 and 38 is placed in a negative electric feedback loop through which the level of its transmitted illumination may be easily and accurately controlled. Since the several feedback loops are identical, only one (the one used with modulator 38) need be described in detail. The output of photodetector 76 can be adjusted by potentiometer 100 and is wired into a logarithmic converter 102. The photodetector 76 can be operated in the current mode, and the logarithmic convertor 102 will provide a voltage proportional to the log of the input current. Alternatively, the photodetector 76 can be of the type which provides an output voltage and in that case the log convertor 102 will provide an output signal proportional to the log of the voltage input from the photodetector. Logarithmic convertors are well-known in the electrical art, and therefore need not be described in detail herein. The output of the log convertor 102 drives the inverting input 106 of an operational amplifier 104, which is a device whose output current and voltage are sufficient, either of themselves or with supplemental electronic driving devices (not shown), to provide power for the full range of modulation of light intensity provided by the electro-optic modulator 38. Since the optical transmitance vs applied electric field strength of many electro-optic modulators is quatriatic in nature (as for the PLZT ceramic described above) only the absolute value of the output voltage controls the transmittance. Care must therefore be taken that the operational amplifier's output is unipolar. It will be obvious to those skilled in the electrical arts that if an amplifier is capable of driving the PLZT both positive or negative with respect to the ground potential of the PLZT's section electrode, the negative driving voltage (which will be translated into positive transmitances) will cause the operational amplifier PLZT — photodetector loop to become a "positive feedback" rather than the desired "negative feedback" loop. This will result in a very rapid switching of the PLZT to its fully transmissive state if the control signal (input to "+" terminal) ever goes slightly negative. Under these circumstances the control of light intensity will be lost. This effect can be avoided in several ways. First the "+" input or the output of the operational amplifier can be clipped (as is commonly known in the electrical arts) so that the output will never fall below zero. Second, the operational amplifier can be chosen to be one whose negative power terminal can be wired, instead, to ground without interfering with its operating characteristics. Third, the ground terminal of the electro-optic modulator can be wired to the same negative potential as the operational amplifier, which will assure that the PLZT will never be driven into the negative electric field domain.

Due to the electronic characteristics of operational amplifier 104, it will automatically adjust the transmissivity of the electro-optic modulator 38 so that the voltage present at the inverting input 106 of the operational amplifier 104 will equal whatever voltage is presented at the non-inverting input 108 thereof. Since the output current or voltage of the photodetector 76 is linearly related to the applied light intensity, and since the signal is converted to a logarithmic value by log converter 102, before being applied to the operational amplifier 104, the logarithm of the intensity of light transmitted by modulator 38 will vary linearly with the control voltage impressed on the non-inverting input of the operational amplifier 104. Put another way, one could state that the transmitted intensity is an exponential function of applied control voltage. The following chart will further clarify the interrelations between electrical and optical signals at various points in the feedback loop.

| Control Voltage Impressed at input 108 | Voltage at input 106 transmissivity of modulator 38 automatically adjusted so V 106 = V 108) | Current at point 100 = log $^{-1}$V 106 microamp. | Intensity of blue light at 38 | %T/OD of modulator 38 + 70 + 80 |
|---|---|---|---|---|
| 0 volts | 0 volts | 1 u amp | 0.1mc | .005%/4.3 |
| 1 volts | 1 volts | 10 u amp | 1mc | .05%/3.3 |
| 2 volts | 2 volts | 100 u amp | 10mc | .5%/2.3 |
| 3 volts | 3 volts | 1000 u amp | 100mc | 5.0%/1.3 |
| 4 volts | 4 volts | 10,000 u amp | 1000mc | 50.0%/0.3 |

This chart is based on the following presumptions:
Sensitivity of photodector: 10microamp per meter candle
Incident intensity in beam 30: 2000mcs
Maximum intensity transmitted at beam 32: 1000mcs The exponential dependence of input intensity on input control voltage is desired because the density of an exposed photographic emulsion is approximately linearly dependent on the exponential variation of the incident exposure. It should be noted that the desired exponential exposure relation could be obtained by placing a log$^{-1}$ convertor between the input control voltage and the non-inverting input 108 of the operational amplifier 104, or elsewhere in the system, without violating the spirit of the invention. In that case, the log convertor 102, would not be included in the feedback loop.

The feedback loop described above is identical to those used to drive each of the several color band intensity modulators 34, 36 and 38. Thus, exponential variations in the intensities of each of the several color bands can be implemented by linearly varying the values of the control voltages impressed on the non-inverting inputs of loop operational amplifiers 104, 112 and 114. To obtain the full benefit inherent in the electronic speed of this invention's light modulation properties, it is desirable to use these control voltages for creating fades, and modulating exposure, as well as for implementing color balance corrections. The dynamic range of the electro-optic light modulators 34, 36 and 38 can be as high as 1000:1 depending on the characteristics of the specific type of device used. This range is sufficient under most conditions and for most commonly used photographic emulsions to provide both exposure correction and fade making capability by applying different signals to the same set of inputs; presuming of course that the fully dynamic range of the device is available for use. To achieve this condition in practice, the absolute range of the system, and thus the maximum light output must be adjustable for different film stocks, which require different exposures. The absolute optical output of the system, obtained when all the electro-optic modulators 34, 36 and 38 are operating at maximum transmissivity, can be attenuated by varying the position of the neutral density wedge 78 to provide an output intensity equal to the desired maximum intensity for the given frame rate and film stock in use. This intensity will usually be slightly higher than the intensity needed for proper exposure of the densest scene in the master image roll. Then virtually the whole dynamic range of the electro-optic modulators 34, 36 and 38 can be used, which permits fades, exposure, and color balancing all to be accomplished at high frame rates with only three electro-optic modulators. A fourth electro-optic modulator can be used in place of the neutral density wedge 78, however the light source would have to be about three times as intense, since the maximum transmissivity of the electro-optic modulator is is only 35%.

As has been mentioned before, it is desirable that exposure correction and fade values be variable independently of the color balances of the light. The circuit means described below accomplishes this end, and simultaneously permits the control of these four functions (overall exposure, and intensity of the three bands) with the use of only three electro-optic modulators.

Four input control signals 120, 122, 124 and 126 are voltages representative of the logarithms of the desired overall exposure, ($V_{exp}$) and the intensities of the three color bands ($V_r$, $V_b$, and $V_g$) respectively. Three operational amplifiers 130, 132, and 134 are wired as inverting voltage summing amplifiers, as is well known in the electronics art. A plurality of resistors 135-141 positioned as shown in FIG. 1 can be selected to weight the summing of $V_{exp}$ to each of the three color balance signals; three feed back resistors 137, 140 and 143 can be selected to provide amplification, or lack of it, of the sum voltages. These procedures are well understood in the electronic art as will be evident to those skilled in the art. Thus, the absolute values of voltages output from operational amplifiers 130, 132 and 134 are linearly proportional to the sums of the input voltages as follows (but the sign of the output voltages are always inverted):

$$V_{out\,130} = -(k_1 V_{exp} + k_2 V_r)$$

$$V_{out\,132} = -(k_3 V_{exp} + k_4 V_g)$$

$$V_{out\,134} = -(k_5 V_{exp} + k_6 V_b)$$

where $k_1 \ldots k_6$ are dependent on the values of resistors 135-143.

Linear inverting amplifiers 144, 146 and 148 act to reinvert the voltages $V_{out\,130,\,132,\,134}$. If, for the sake of simplicity of explication, we further let the values of resistors 135-143 be such that $k_1 \ldots k_6 = 1$, the above equations may be simplified as follows:

$$V_{in144} = V_{exp} + V_r$$
$$V_{in146} = V_{exp} + V_g$$
$$V_{in148} = V_{exp} + V_b$$

As has been previously stated, in order to maintain a constant color balance, it is necessary to maintain a constant ratio among the transmissivities of the three electro-optic modulators 34, 36 and 38, and therefore it is necessary to maintain constant differences among the log transmissivities. Since log transmissivity varies directly with impressed control voltage, it is necessary, therefore to maintain constant differences between the control voltages $V_{in144-148}$ to maintain a constant color balance. By examining the equations for $V_{in144-148}$ it can be easily verified that variations in $V_{exp}$ do not effect differences between any pair of the three voltages. Thus, the exposure voltage can be varied over its full range without varying the color balance. Similarly, the intensity of any of the several spectral bands can be varied over its full range completely independently of the other band intensities. It should be noted that summing circuitry described above for accomplishing the computation is only one specific embodiment for purposes of representation. Any summing means, including digital computers, whether such means are present at the site of the invention or at some remote point, are considered to be applicable to this embodiment without violating the essential limit of the invention. Further, the accomplishment of the summing operation at some time prior to the actual exposure and storage of said sums is clearly within the scope of the invention.

A drawback to this scheme, however, is that the overall exposure is not independent of the color control voltages $V_b$, $V_r$, and $V_g$. If, for example, all three of these voltages were set at the maximum permitted voltage, i.e. the supply voltages of the operational amplifiers 130, 132, 134, when changes in $V_{exp}$ over its range of O to $V_{max}$ would have no effect on the exposure since the summed voltages $V_{out\,130-134}$ cannot exceed the supply voltage. The preferred mode of operation, therefore, is to allow the range of the color voltages $v_r$, $V_b$ This permits the operator to choose the values of $V_r$, $V_b$ and $V_g$ to provide the desired color balance, while making sure that their sum is close to O. Thus, the value of $V_{exp}$ will remain an accurate representation of the actual exposure delivered. This "scaling-to-zero-sum" operation can be performed either by the operator who prepares the data, or by a computer, if one is used to aid in the preparation of the data. Later in this specification, an analog circuit directly interfacable with the present invention will be presented, which circuit will perform the operation automatically.

Whether the "scaling-to-zero-sum" operation is accomplished by computer or by the operator, the net result is to remove all "common mode" voltage from the sum $V_r + V_g + V_b$ into $V_{exp}$. This insures that $V_{exp}$ is an exact representation of the actual exposure, and that fade-out will terminate when $V_{exp}$ is some fixed fraction (determined by the emulsion characteristics of both the master image emulsion and the copy film emulsion) of the normal exposure value. This will only be the case, however, if the color balance of the light source is set to create "normal" or close to normal color balance when it illuminates the master film 14 being copied. If one or more colors are greatly under or over emphasized for artistic effect or some other purpose, then the image in the color layers of the copy film 16 corresponding to the over or under emphasized colors will fade out before or after the rest of the image.

As discussed above, any of a large number of analog, digital, or hybrid data systems can be used to provide the control signals $V_{exp}$, $V_r$, $V_b$, $B_g$. But analog control signals are usually continuously changing and digital signals have to be converted to analog signals in advance, which requires a certain, usually varying, amount of time. It is preferable for control voltages to the electro-optical modulators 34, 36 and 38 to change virtually instantaneously when the master image is exactly positioned in the exposure gate 12. A large exposure or color balance change impressed at any other instant results in a stripe across a frame.

Returning now to FIG. 1, the inverter-summed outputs of the summing amplifiers 130, 132 and 134 are re-inverted by the three amplifiers 144, 146 and 148 to provide the control voltages needed to drive each of the electro-optical modulators 34, 36 and 38. These voltages are input to three sample hold circuits 150, 152 and 154 which can be any type well-known in the art. The operation of these sample hold circuits 150, 152 and 154 is such that they will resample the analog data present at their inputs, and adjust their outputs equal to the sampled inputs only during the time interval when a "resample" line 156 is activated. At all other times the outputs will retain the value of the input signal at the instant when it was last sampled. Thus, the changing of electro-optical modulator transmissivities can be made to occur only when a master image frame is correctly positioned in the exposure gate 12. A light emitting diode 158 radiates light in the infra-red region where most print films are not sensitive. Light rays 160 therefrom pass throgh sprocket holes 162 in the copy film 16, whose movement is synchronized with the movement of the master film 14. The copy film 16 can be illuminated by said light emitting diode 158 either upstream or downstream of the exposure gate 12 as long as this monitoring station is a fixed distance from the gate 12. Thus, the light is chopped into the indicated pulsed waveform by the alternating opacities of the copy film and transparencies of its sprocket holes. This light is converted to an electrical signal by a photodetector 164, and amplified by an amplifier 166, as is well-known in the art. The output pulses are used to trigger a "one-shot" monostable multivibrator 168, as is also well-known in the electrical art. By varying the resistance in a potentiometer 170 attached to said multivibrator 168, the period of the output pulses can be varied from virtually zero to some value longer than the period of the input pulse. The output signal of the monostable multivibrator 168 is input to a negative-going edge detector 172, such as is well known in the electrical arts. This detector 172 generates a positive pulse of fixed duration, as shown in the timing diagram, whenever the output of the monostable multivibrator 168 returns to the zero state. Thus, by varying the potentiometer 170 wired to the monostable multivibrator 168, the period of time between the presence of a sprocket hole 162 and the resample command, as delivered by the edge detector 172 can be varied. Therefore, it is possible to vary the synchronization so that re-sampling operations, and hence transmissivity changes in the electro-optic modulators 34, 36 and 38, occur only when a master image frame is correctly positioned in the gate 12. It should be noted that mechanical or other means for obtaining the sprocket triggered electrical pulses can be used without violating the spirit of this invention. The voltages stored in the sampling circuits 150, 152 and 154 can be manually reset to zero by depressing a button 174 which activates transistors or switches (not shown), to short out capacitors (not shown) within the sampling circuits 150, 152 and 154. The resample line 156 signals can be used to drive another negative edge detector (not shown) and therefore an "end of re-sample" can be provided foy synchronizing external data generating or handling equipment such as computers.

Figure 2:
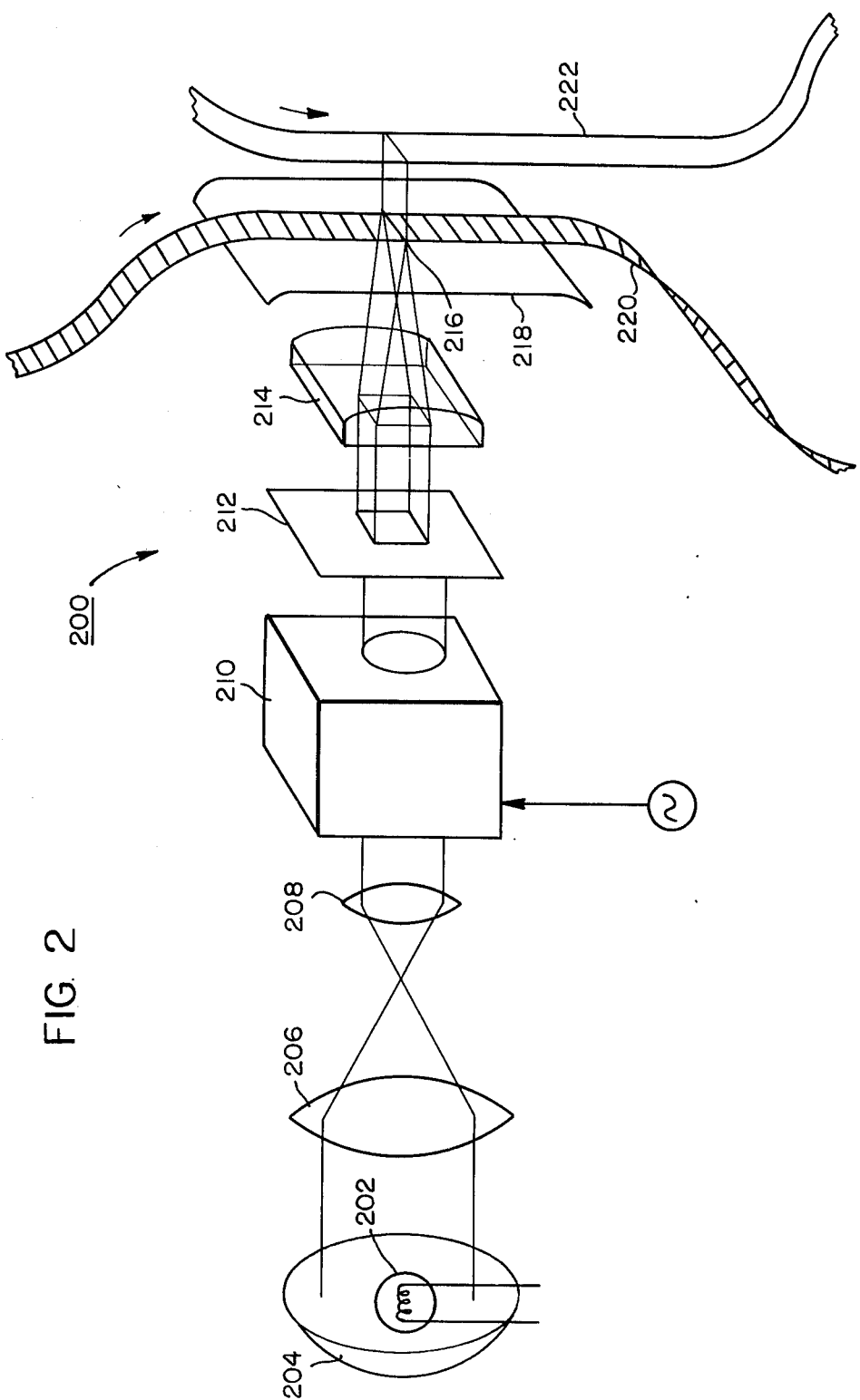

FIG. 2 shows another embodiment of the present invention, which is a further refinement intended primarily for use with the continuous type of optical printers. In continuous printers, the gate is usually a slit of about the same height as a frame. A difficulty with slit type exposure gates is that at any given instant, the film between the upper and lower edges of the gate is not evenly exposed, e.g. the film portion about to leave the gate is fully exposed, while the portion about to enter the gate is not yet exposed. Thus, if the exposing light is suddenly cut off, as through the operation of a high speed light modulator or chopper, the resultant image for that instant will possess a density gradient from full exposure density to zero exposure density, whose length will equal the height of the exposure slit. The presence of this density gradient is independent of the speed of operation of the light valve. The accomplishment of the main the embodiment of FIG. 2 which is the removal of this gradient, depends partly on, but not wholly upon, the speed of the light modulator used.

It has been necessary with continuous motion picture printers to use a secondary device to remove this gradient: a piece of opaque leader. The leader is spliced to the image film at the frame where it is desired for the image to leave the screen, and since the opaque leader moves at the same rate as the film, proper exposure is maintained and the effect of a sharp cut is achieved. The next shot to follow is printed onto the copy film in a separate operation. The result is the familiar AB roll editing where shots are alternated between 2 or more master image rolls, and the empty spaces are filled with opaque leader. A drawback to this type of editing is that once the precious original camera footage is cut, a shot cannot be made longer without destroying the temporal continuity of the sequence. The traditional solution to this problem is the "zero-cut" printer in which the head and tail lengths of a shot are extended into the opaque leader, and some sort of a shutter mechanism is tripped to effect the cut. The problem with this solution is that, due to the aforementioned density gradient, the zero-cut appears as a one frame dissolve. Thus zero cutting is not usually used for release prints but only for the copying of test prints before final editing of the camera original film into the standard AB roll format has been completed.

An object of this embodiment of the present invention is to provide an improved printer capable of effecting true zero-cuts, and thus to simplify the editing process. A further object is to eliminate the unpleasant and distracting image of a splice which results when two shots are printed head-to-tail from the same master roll with a splice between them.

The present embodiment used light modulators to achieve the desired splice skipping.

Referring now to the drawings, FIG. 2 shows a continuous type optical printer 200 including a light source 202 which can be of any type producing sufficient illumination. The light may be reflected by an optional reflector 204 collected by a lens 206, and collimated by a lens 208. The light then passes through an electro-optical modulator 210 which can be of any type responding rapidly enough, relative to the speed of the film, to achieve the splice skipping effect desired (e.g. to achieve complete turn off of illumination during exposure of the frme line). The modulator 210 can also include means such as those described above, with reference to FIG. 1, for separating the beam into several spectral bands, modulating each separately, and then recombining them. The beam emerging from the modulation 210 is passed through a shaping mask 212. The preferred shape is a square cut from the opaque substance, such that the square is the largest one possible inscribable within the cross-sectional circle of the light beam. The light then passes through a cylindrical lens 214 which focuses the light into a thin line at a gate 216. The gate 216 may possess a long opening or, more preferably, a thin slit perpendicular to the edges of the film. The purpose of the mask 212 is to insure that the intensity distribution of the focused beam at the gate 216 is even over the length of the light line. It is obvious that the focusing of a circular beam through the cylindrical lens 214 will yield a line of light whose intensity distribution is a sinusoidal function. Alternate means for providing the thin line of light at the gate 216 can be used with out violating the essential spirit of the invention. A plate 218 of opaque material has the printing aperture or gate 216 cut therein. The optics can be adjusted to insure even illumination of the gate 216 by the beam focused at the gate 216. A master image film 220 and a copy film 222 are shown separated, however, they may in fact be in intimate contact with each other. Alternatively, various optical elements can be inserted between them to project master images onto the copy film 222. Such modifications do not violate the spirit of the invention, as long as the master film 220 and the copy film 222 move in synchronization with each other and continuously at a constant rate with respect to the gate 216, and as long as exposure is effected by a thin line of light.

In actual practice, the gate 216 can be made quite narrow because a diffraction pattern, which would result only in the direction perpendicular to the aperture and would therefore degrade resolution only slightly, would not create illumination non-uniformities along the direction of the slit. The system can be "tuned" for effective apertures as small as 0.002 inches. The crucial parameter is the speed at which the modulator 210 can change from the normal exposure transmissivity to the fully "off" state (for reversal films). The time should be fast enough that only a very small fraction of the height of the master image frame is exposed due to the modulator turn-off delay.

Figure 3:
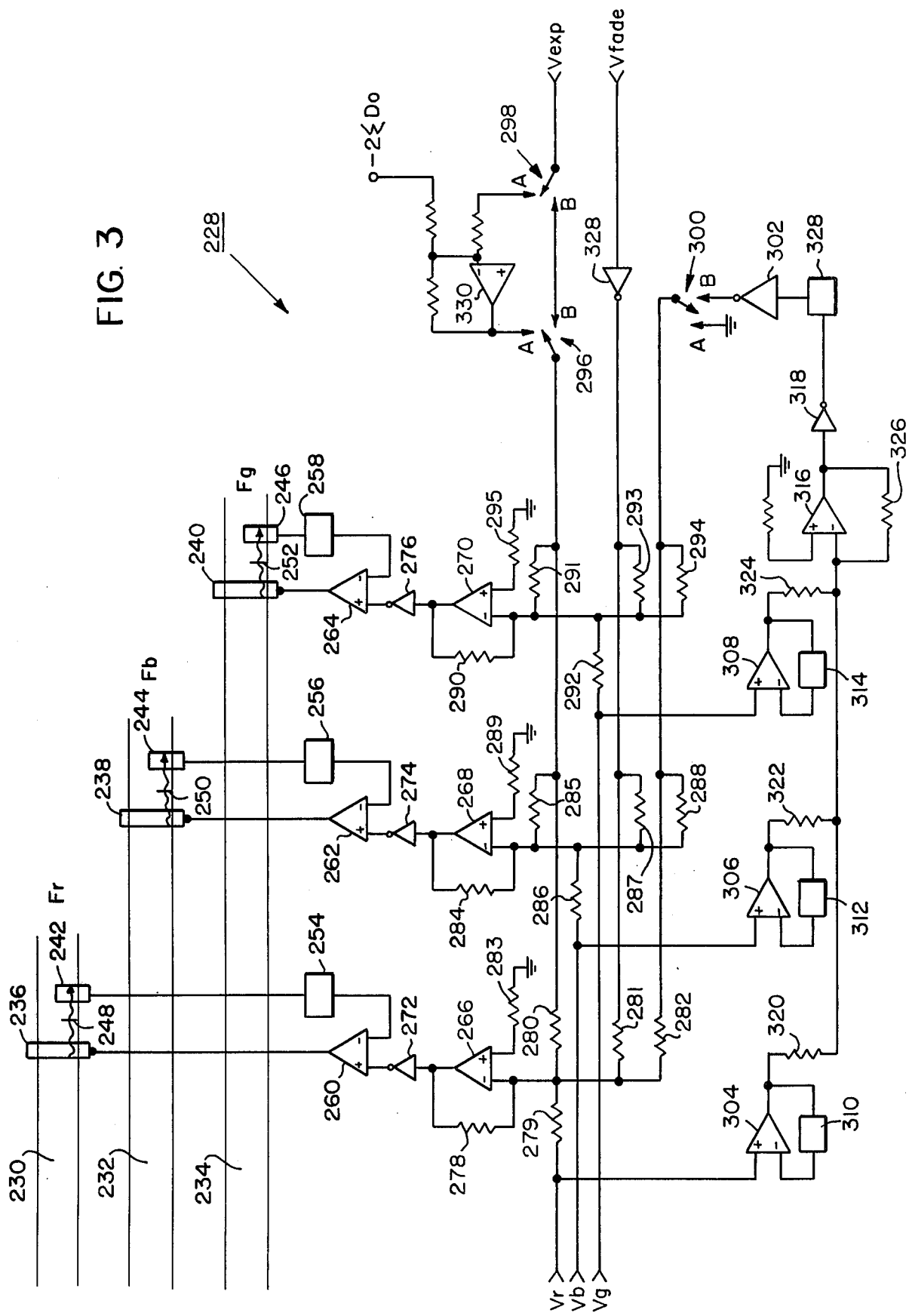

FIG. 3 shows another optical printer 228 embodiment of the invention. For simplicity, the light source, the dichoric mirrors or other means for dividing the light beam into several spectral bands, the beam recombining means, and the density wedge used to adjust overall exposure, are not shown. They are identical to those described above with reference to FIG. 1 for accomplishing these functions. The light, which has been resolved into several spectral beams, such as the red, green and blue beams shown in FIG. 3 at 230, 232 and 234 is passed through three electro-optic light modulators 236, 238 and 240, which can be any of the types previously described. As previously described, the amount of light flux transmitted by the modulators 236, 238 and 240 can be varied by varying the driving voltages impressed thereon. The intensities transmitted are monitored by photodetectors 242, 244 and 246, which can be placed in the paths of the transmitted beams as shown. These photodetectors can also be illuminated by a small fraction of the total transmitted flux by the use of partially reflective mirrors which would reflect a small portion of the light into the photodetectors while transmitting the rest. Such means are well known in the art, and they are not shown in FIG. 3, although their use is considered to lie within the scope of this invention. The densities of three neutral density filters 248, 250, and 252 are chosen so as to compensate for the varying sensitivities of the photodetectors 242, 244 and 246 to different wave lengths of light. As has been previously described, the electric signals from the photodetectors 242, 244 and 246 are directly proportional to the quantity of flux striking them, and such signals are input to three log converters 254, 256 and 258 which are well-known in the electrical arts. The outputs from the log converters are input into three operational amplifiers 260, 262 and 264 at their inverting inputs. Operational amplifiers are well known in the electrical arts. Operational amplifiers 260, 262 and 264 have output signal ranges, either along or in combination with supplemental power amplifiers, to drive the electro-optical modulators 236, 238 and 240 over their full optical density variation ranges. The operational amplifiers 260, 262 and 264 will thus automatically adjust the transmissivities of the electro-optic modulators so that the transmitted fluxes will equal $10^v$ where $v$ is the voltage impressed on the non-inverting inputs (the "+" inputs) of the operational amplifiers 260, 262, 264, and therefore a linear change in "$v$" will result in a linear change in the optical density of the electro-optic modulators 236, 238, and 240. Further information about the behavior of the interconnected elements of FIG. 3 thus far described has been previously given above.

The optical printer 228 includes three operational amplifiers 266, 268 and 270 connected in the inverting summing mode well-known in the electrical arts, and the output voltage therefrom, after inversion by three linear voltage invertors 272, 274 and 276, equals the sums of the voltages applied at the inverting inputs (the "−" inputs) of the operational amplifiers 266, 268 and 270. (It is presumed, of course, that the values of resistors 278–295 have been properly chosen to insure non-weighted voltage summing. Formulas for choosing those values are well-known in the electrical arts.)

The embodiment shown in FIG. 3 has two modes of operation ("A" and "B") which can be selected by switches 296, 298 and 300. The operation of the invention with switches 296, 298 and 300 switched to the "B" position will first be described. In this mode, Vexp, the exposure regulating voltage, is directly summed at the inverting inputs of the three summing amplifiers 266, 268, and 270. The three color balance control voltages Vr, Vb and Vg are also summed at these inputs, Vr is summed to operational amplifier 266 only, Vb is summed to operational amplifier 268 only and Vg is summed to operational amplifier 270 only. Another signal, Vk, the output from an inverting operational amplifier 302 is also summed to all three of the summing inputs. The value of Vk is continuously computed by analog circuit means so that changes in Vr, Vb, and Vg do not alter the total output light flux, which is the sum of the colored fluxes, F total = Fr + Fb + Fg. The value of Vk is computed as follows: each of the voltages Vr, Vb and Vg is applied to the non-inverting input of one of three operational amplifiers 304, 306 and 308 (in addition to the application of these voltages to the summing amps 266, 268 and 270). Operational amplifiers 304, 306 and 308 are connected to log convertors 310, 312 and 314 to produce voltages at the outputs of the operational amplifiers 304, 306 and 308 equal to the antilogarithms of the input voltages Vr, Vb and Vg. These antilogarithm voltages are summed by an inverting summing amplifier 316, and the sum is inverted by a linear invertor 318. The three resistors 320, 322 and 324 are chosen so that non-weighted summing occurs and a resistor 326 is chosen so that the amplification of operational amplifier 316 is exactly .33333... Thus, the output of the linear inverter 318 may be written as follows:

$$V318 = (10^{Vr} + 10^{Vb} + 10^{Vg})/3$$

V 318 is connected to the input of a log convertor 328, and the output thereof is inverted by the operational amplifier 302. Thus Vk may be given as:

Therefore, the total exposure delivered by Ftot is completely independent of Vr, Vb, and Vg, and the exposure is independent of the color balance set by Vr, Vb, and The advantages of the device can be seen by examining its operation in some typical cases as represented by the following data. It is presumed that the overall flux delivered by this exposure regulating device has been adjusted at the output through the use of a movable neutral density wedge or the like, such that a density of 1.0 in each of the electro optic modulators will produce a properly exposed print if the average density of each of the colors of the master image is 1.5. For the sake of discussion, it is further presumed that the flux incident on each of electro optic modulators is constant. This permits the convenience of discussing the exposure in terms of the densities of the electro optic modulator and of the master image. (In actuality the device maintains constant flux by varying the densities of the electro optic modulators so that constant input flux is not a requirement for proper operation of the device).

| OD Master Image Layers | | | OD Electro optic modulators | | | | | | | | | | | |
|---|---|---|---|---|---|---|---|---|---|---|---|---|---|---|
| Dmr | Dmb | Dmg | Der | Deb | Deg/ | Vr | Vb | Vg | Vexp | LogFr | LogFb | LogFg | Logk | Case# |
| 1.5 | 1.5 | 1.5 | 1.0 | 1.0 | 1.0 | 5.0 | 5.0 | 5.0 | 4.00 | 4.00 | 4.00 | 4.00 | −5.00 | 1 |
| 1.5 | 1.5 | 1.5 | 1.0 | 1.0 | 1.0 | 1.5 | 1.5 | 1.5 | 4.00 | 4.00 | 4.00 | 4.00 | −1.50 | 2 |
| 1.6 | 1.5 | 1.5 | .937 | 1.037 | 1.037 | 1.6 | 1.5 | 1.5 | 4.00 | 4.063 | 3.963 | 3.963 | −1.537 | 3a |
| 1.6 | 1.5 | 1.5 | .900 | 1.00 | 1.00 | 1.6 | 1.5 | 1.5 | 4.037 | 4.100 | 4.00 | 4.00 | −1.537 | 3b |
| 2.0 | 1.5 | 1.5 | .5 | 1.00 | 1.00 | 2.0 | 1.5 | 1.5 | 4.236 | 4.500 | 4.00 | | | 4 |

$$Vk = -\log \frac{(10^{Vr} + 10^{Vb} + 10^{Vg})}{3}, \text{ or}$$

$$Vk = \log \frac{3}{10^{Vr} + 10^{Vb} + 10^{Vg}}$$

$$= \log 3 - \log(10^{Vr} + 10^{Vb} + 10^{Vg}) \text{ or}$$

$$Vk = \log k, \text{ where } k = 3(10^{Vr} + 10^{Vb} + 10^{Vg})$$

The operation of the entire device can now be described as follows:

log $F_r$ = sum of voltages at inverting input of
operational amplifier 266
 $= V_r + \text{Vexp} + Vk = V_r + \text{Vexp} + \log k$
log $F_b = V_b + \text{Vexp} + Vk = V_b + \text{Vexp} + \log k$
log $F_g = V_g + \text{Vexp} + Vk = V_g + \text{Vexp} + \log k$
$F_r = \log^{-1}(\log F_r) = k(10^{Vexp + Vr})$
$F_b = k(10^{Vexp + Vb})$
$F_g = k(10^{Vexp + Vg})$
The total flux can be represented as:
$F_{tot} = F_r + F_b + F_g = k(10^{Vexp+Vr}) + k(10^{Vexp+Vb}) + k(10^{Vexp+Vg})$
$F_{tot} = k \cdot 10^{Vexp}(10^{Vr} + 10^{Vb} + 10^{Vg})$
Since
$k = \frac{3}{10^{Vr} + 10^{Vb} + 10^{Vg}}$, $F_{tot}$ may be rewritten as:
$F_{tot} = 3 \cdot 10^{Vexp}$, and
Log $F_{tot} = \log 3 + \text{Vexp}$ The total flux can be represented as:

$$F\text{tot} = Fr + Fb + Fg = k(10^{Vexp + Vr}) + k(10^{Vexp+Vb}) + k(10^{Vexp + Vg})$$

$$F\text{tot} = k \cdot 10^{Vexp}(10^{Vr} + 10^{Vb} + 10^{Vg})$$

Since $$k = (10^{Vr} + 10^{Vb} + 10^{Vg}), F\text{tot may be rewritten as:}$$

$$F\text{tot} = 3 \cdot 10^{Vexp}, \text{ and}$$

$$\text{Log } F\text{tot} = \log 3 + \text{Vexp}$$

Cases 1 and 2 show that the total flux delivered is independent of the values of Vr, Vb, and Vg. Case 3a shows the effect of changing one of the color control voltages (Vr) while keeping all other voltages constant. Calculation reveals that the circuit has adjusted the fluxes to create the desired color balance but has kept the total flux constant. Further, the negative changes in Fb and Fg are equal and each is equal to half the positive change in Fr. This insures that the new color of the exposing illumination lies in the red-cyan line since removing equal quantities of blue and green is equivalent to removing cyan which is red's complement. Thus the difference between the color voltages accurately represent true color balance. It should also be noted that these results were achieved easily by setting Vr, Vb and Vg equal to the measured densities Dmr, Dmb and Dmg respectively. The color balance will always be set to produce proper compensation for unbalanced master images as long as:

Dmr − Dmb = Vr − Vb

Dmr − Dmg = Vr − Vg

Dmb − Dmg = Vb − Vg and the absolute values of Vr, Vb and Vg are not important as long as these conditions exist. The following relationships always hold for this system:

(Log Fr − Log Fb) = Vr − Vb = Deb − Der

Log Fr − Log Fg = Vr − Vg = Deg − Der

Log Fb − Log Fg = Vg − Vg = Deg − Deb, and these insure correct color balance.

It should be noted that the conditions of 3a show proper color balance but not proper exposure. It was stated above that proper exposure occurs with a density of 1.0 in the electro optic modulators and 1.5 in the master. To achieve proper exposure in this case, the density of the blue and green electro optic modulators (which have risen to 1.037 due to the change in color balance), must be lowered back to 1.000. This is accomplished in case 3b by increasing Vexp by an amount equal to the negative of the desired intensity change, i.e. by +0.037. This change in Vexp decreases Deb + Deg from 1.037 to 1.00, and also decreases Der from 0.937 to 0.900. It should be noted that Dmr and Der are not the original 1.5 and 1 but that their sum is the same: 1.5 + 1 = 2.5 = 0.9 + 1.6. Thus, proper exposure occurs in the red layer as well; the extra flux absorbed by 0.1 unit increase in the density of the master red layer is exactly compensated by a 0.1 unit decrease in the density of the red PLZT ceramic or other modulator.

It should also be noted that the differences $$\log Fr - \log Fg = Vr - Vg$$

$$\log Fr - \log Fb = Vr - Vb$$

$$\log Fg - \log Fb = Vg - Vb$$

remain constant for any value of Vexp. This permits fading, etc. without change in color balance.

A separate input, Vfade is provided to accomplish fading conveniently. The value of Vfade is inverted by linear invertor 328 and summed through resistor 281, 287, and 293 by operational amplifiers 266, 268, and 270. Thus Vfade = 0 is a fully faded in condition, and increasing Vfade has the same effect as decreasing Vexp. Vfade max, the positive value of Vfade at which the last remnant of image will fade from the copy print, depends on a number of factors including the characteristics of both the master and copy film stocks, the contrast and exposure of the master, and the processing times of the copy stock. When very accurate fadeout points are desired, all these factors must be considered in determining Vfade max. Later in this disclosure, a device for generating very accurate fade voltages will be taught.

Numerous other electrical devices can be devised to perform the functions discussed above, including digital circuits of both the hand-wired and programable type, such as digital computors. Such circuitry, including the necessary programs to perform the operations outlined above on digital computers do not violate the essential spirit of the invention, because the relationships of the various flux intensities to the control voltage data does not change. The particular analog embodiment shown in FIG. 3 is representative of, but not exhaustively representative of, the invention, and any embodiment providing the specified relations between output fluxes and input control voltage data is considered to be an embodiment of the invention. Likewise, data storage and retrieval systems such as magnetic tape recorders/players, could be inserted conveniently at numerous points in the system. They would permit the data that eventually reaches the electro-optic modulators to be stored (in whatever format is necessary for the location of such storage means within the invention) and played back at different points in time and at different speeds. Such storage means allow the operator the freedom to input sets of conditions at a very slow rate and play them back at a much faster rate, and/or at a later point in time. The use of such devices does not violate the essential spirit of the invention because they do not change the relationships between values represented in the data (though they may change the data's format), nor do they add any new data.

The operation of the device with switches 296, 298 and 300 in the "A" position will now be examined. Switch 300 disconnects the invertor 302 from the summing amplifiers 266, 268 and 270 and instead sets Vk = 0. Switches 298 and 296 serve to pass Vexp through an additional analog circuit before it reaches the summing amplifier. The circuit is an inverting summing amplifier which provides on its output a voltage equal to (2 Do - Vexp). This voltage is used instead of Vexp. Do is the sum of the electro optic modulator density and the master image density necessary to achieve proper exposure of all color layers of the print. Do has the same value for all three colors. The value of Do can easily be varied by resetting the neutral density wedge, and it can therefore be presumed that Do is a constant if the wedge is set for proper exposure. The value of Do used in the data above is 2.5. The usefullness of these circuits can be easily seen by examining the equations for the operation of the device in mode "A".

$$\log Fr = Vr + 2 Do - Vexp$$

$$\log Fb = Vb + 2 Do - Vexp$$

$$\log Fg = Vg + 2 Do - Vexp$$

| D Master | | | D Electro-optic Modulators | | | | | | | | | | |
|---|---|---|---|---|---|---|---|---|---|---|---|---|---|
| Dmr | Dmb | Dmg | /Der | Deb | Deg/ | Vr | Vb | Vg | Vexp | log Fr | log Fb | log Fg | Case # |
| 1.5 | 1.5 | 1.5 | 1.0 | 1.0 | 1.0 | 1.5 | 1.5 | 1.5 | 2.5 | 4.000 | 4.000 | 4.000 | 1 |
| 1.8 | 1.2 | 1.4 | .7 | 1.3 | 1.1 | 1.8 | 1.2 | 1.4 | 2.5 | 4.300 | 3.700 | 3.900 | 2 |
| 1.8 | 1.2 | 1.4 | 1.2 | 1.8 | 1.6 | 1.8 | 1.2 | 1.4 | 3.0 | 3.800 | 3.200 | 3.400 | 3 |
| 1.8 | 1.2 | 1.4 | 1.7 | 2.3 | 2.1 | 1.8 | 1.2 | 1.4 | 3.5 | 3.300 | 2.700 | 2.900 | 4 |

The above data illustrates the operation of the circuits. It is again presumed for purposes of discussion that the flux input to each electro optic modulator is constant at $10^5$ units and that exposures depend straightforwardly on electro optic modulator densities.

Case No. 1 is similar to case No. 2 given for mode "B" above. The values of the densities of the three color layers of the master image are input directly as Vr, Vb and Vg. Vexp is set at 2.5 which is its "center value". Case 2 shows that as long as Vexp is 2.5 and as long as the voltage values of Vr, Vb and Vg are set equal to the actual densities in the respective color layers of the master image, proper exposure will be achieved. This can be demonstrated for each layer as follows:

$$Dmr + Der = 1.8 + 0.7 = 2.5$$

$$Dmb + Deb = 1.2 + 1.3 = 2.5$$

$$Dmg + Deg = 1.4 + 1.1 = 2.5$$

As before, as long as the sums of densities for each color are 2.5, proper exposure will be achieved. Vexp = 2.5 volts is a center value, and departures from normal exposure can be quickly implemented by increasing or decreasing Vexp. An increase of 0.1 volts in Vexp (Vexp = 2.6) causes the densities of each of the electro-optical modulators to increase by 0.1 corresponding to a log E decrease of 0.1. Obviously, if a direct relation between exposure and Vexp were desired an inverting summing amplifier 330 could be bypassed by putting switches 296 and 298 in "B" position.

As for the "B" mode, Vfade is provided to allow convenient implementation of fades.

The statements made above about the many modes of implementation of the electronic circuits of the invention, and about the use of digital electronics and programs, and about the use of data storage devices apply to both modes of operation equally.

Figure 4:
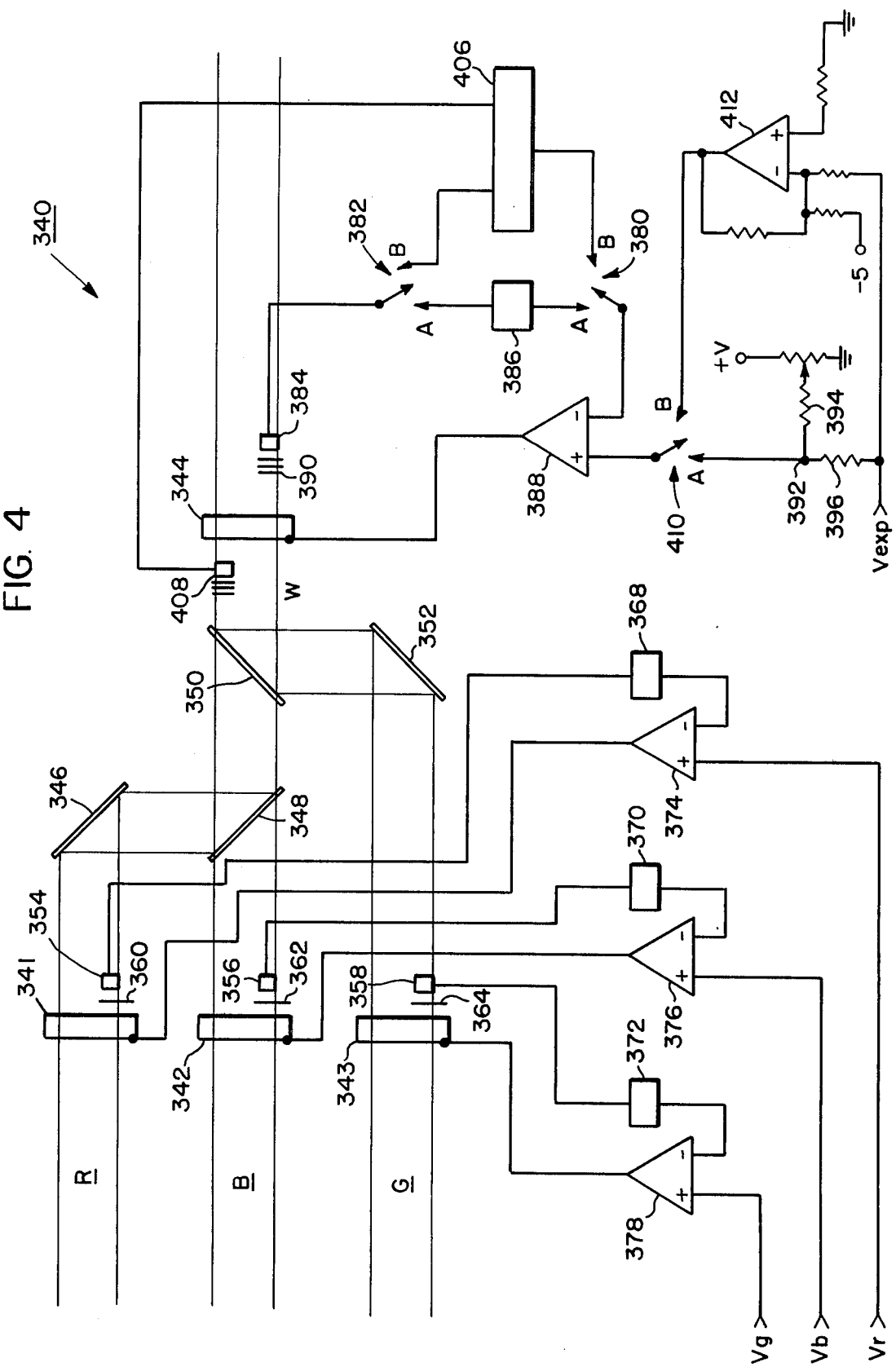

FIG. 4 shows an optical printer 340 embodiment of the invention using four electro optic modulators 341, 342, 343, and 344 rather than three. This embodiment permits the use of very simple electrical circuits and might therefore be manufactured less expensively, when the state of the electro optical art progresses to the point where the electro optic modulators 341-344 can be manufactured inexpensively. Since the optical train is essentially identical to that shown in previous embodiments, it will not be shown or described in this specification. Several collimated beams of light, R, B, and G, which contain wave lengths of light in fixed spectral bands, are passed through the electro optic modulators 341, 342, and 343, respectively. The beams are then combined to form white light by means of dichroic mirrors 346, 348, 350 and 352, as is well-known in the optical art. The collimated white beam W is passed through the fourth electro optic modulator 344. The electro optic modulators 341, 342 and 343 are connected in electro optical feedback loops as previously described. Photodetectors 354, 356 and 358 are placed in the beams or are illuminated by a fraction of the beam's fluxes by the use of partially reflective mirrors. The densities of neutral density filters 360, 362, and 264 are selected to equalize the sensitivities of the photodetectors 354, 356 and 358 to different spectral bands. Photovoltaic voltages or photocurrents from the photodetectors 354, 356 and 358 are converted to logarithmic form by log elements 368, 370 and 372 and the logarithmic output voltages are connected to the inverting unputs of operational amplifiers 374, 376 and 378. Thus, as has been previously explained in great detail, the relation of flux transmitted, to the control voltages Vr, Vb and Vg applied to the non-inverting inputs of operational amplifiers 374, 376 and 378 can be expressed as follows:

$$Fr = 10^{Vr}, \log Fr = Vr$$

$$Fb = 10^{Vb}, \log Fb = Vb$$

$$Fg = 10^{Vg}, \log Fg = Vg$$

where Fr, Fb and Fg are the quantities of flux transmitted through the three electro optic modulators 341, 342 and 343. The further operation of the device will now be described with switches 380, 382, and 410 in the "A" positions. The "B" mode will be described below. With switches 380, 382 and 410 in the "A" positions, a photodetector 384 is connected through a log element 386 into the inverting input of an operational amplifier 388 (as described above, the sensitivities of the photodetector 384 to different frequencies of light can be equalized through the use of color filters 390. As also described above, the photodetector 384 can be illuminated with a partially reflective mirror). The control voltage applied to the non-inverting input of the operational amplifier 388 is the sum of Vexp and 0.477 volts. The value of the latter constant voltage is equal in volts to the logarithm of 3 (i.e. 0.477). The sum is taken at a junction 392 through resistors 394 and 396. A summing amplifier could alternatively also be used to provide the sum of Vexp and log 3, as is well known in the art. The relation between Vexp and the total flux transmitted through the modulator 344 (Ftot) is:

$$Vexp + \log 3 = \log Ftot$$

$$3 \cdot 10^{Vexp} = Ftot \cdot (Vexp\ Vr,\ Vb\ and\ Vg)$$

Further, if the transmissity of the electro optic modulator 344 is Cw, then the following relation exist:

$$Cw\ (Fr + Fg + Fb) = FTOT$$
$$Cw\ (10^{Vr} + 10^{Vb} = 10^{Vg}) = 3 \cdot 10^{Vexp}$$
$$Cw = \frac{3 \cdot 10^{Vexp}}{10^{Vr} + 10^{Vb} + 10^{Vg}},$$

It follows from the definition of optical density that if the flux incident on each of the several electro optic modulators 341, 342 and 343 is Io, then the following relations exist:

$$Dr = \log Io - \log Fr$$

$$Db = \log Io - \log Fb$$

$$Dg = \log Io - \log Fg$$

where Dr, Db, and Dg are the optical densities of electro optic modulators 341, 342 and 343 respectively. Some typical values of the electric and optical parameters specified above are as follows (Io presumed to be $10^6$):

| Vexp | Vr | Vb | Vg | Fr | Fb | Fg | Dr | Db | Dg | FTOT = $3 \cdot 10Vexp$ | Dw | Case # |
|---|---|---|---|---|---|---|---|---|---|---|---|---|
| 4 | 5. | 5. | 5. | $10^5$ | $10^5$ | $10^5$ | 1.0 | 1.0 | 1.0 | $3 = 10^4$ | 1.0 | #1 |
| 4 | 5.0 | 5.1 | 5.2 | $10^5$ | $1.26 \times 10^5$ | $1.59 \times 10^5$ | 1.0 | 0.9 | 0.8 | $3 \times 10^4$ | 1.107 | #2 |
| 2 | 5.0 | 5.0 | 5.0 | $10^5$ | $10^5$ | $10^5$ | 1.0 | 1.0 | 1.0 | $3 \times 10^2$ | 3 | #3 |

Case No. 1 shows that the densities Dr, Db and Dg of electro optic modulators 341, 342 and 343 depend only on Vr, Vb and Vg. Case No. 2 shows that the circuitry will automatically adjust the value of Dw to maintain Ftot constant at the value determined by Vexp. This constancy of Ftot is an important property of the this embodiment since it provides independent control of color balance and exposure. Case No. 2 also shows that the differences between densities Dr, Db and Dg can be simply adjusted by adjusting the values of Vr, Vb and Vg. These voltages can assume values exactly equal to the densities in the three color layers of the master print (not given in table), and the device will automatically provide the correct proportion of fluxes of the several spectral color bands of light, i.e. the correct color balance. Case No. 3 shows the Dr, Db and Dg are independent of Vexp, and that changes in Dw are equal to changes in Vexp. The use of a separate voltage Vfade for convenience in implementing fades, as has been described above, is not shown in this embodiment, but its use, as well as the proper electronic implementation of it will be evident to those skilled in the art and need not be described in detail here. Other embodiments of this invention which use different means for computing the values defined above, including the use of digital circuitry and programs, need not be described in detail here. Similarly, the use of data storage and retrieval systems at any point in the circuitry described above can be employed if desired.

The operation of optical printer 340 with switches 380, 382, and 410 in the "B" positions will now be described. In this mode, the photo electric signal from the photodetector 384 is input to a logarithmic ratio detector 406, a device well-known in the electrical arts. An additional photodetector 408 configured with sensitivity filters (not numbered) as is detector 384, also inputs photocurrent to the second input of the detector 406, and the switch 380 disconnects the log element 386 from the operational amplifier 388, and instead connects 388 to the output of the log ratio detector 406. The ratio of electric signal strengths from the linear photodetectors 408 and 384 will equal by definition to the ratio of the optical fluxes before and after the electro optic modulator 344 and thus the output signal of the log ratio detector 406 is proportional to the optical density of the electro optic modulator 344. In this mode of operation, therefore, the operational amplifier 388 will automatically adjust the transmissivity of the electro optic modulator 344 so that the log of the ratio of the photocurrents, and thus of the fluxes, will equal the value of the control voltage applied at the non-inverting input of the operational amplifier 388. The control voltage actually applied is selected by a switch 410 which for this mode of operation is in the "B" position, connecting the output of an operational amplifier 412 to the input of the operational amplifier 388. The operational amplifier 412 is connected as an inverting summing amplifier so that its output is $-(Vexp - 5) = 5 - Vexp$. The operation of the device can be described as follows:

$$\log Fr = Vr, Fr = 10^{Vr}$$

$$\log Fb = Vb, Fb = 10^{Vb}$$

$$\log Fg = Vg, Fg = 10^{Vg};$$

the flux incident on the electro optic modulator 344 is $Fr + Fb + Fg$, and the transmitted flux is Ftot. As described above, the density Dw of electro optic modulator 344, and thus the value of Ftot, will be automatically adjusted so that:

$$\log(Fr + Fb + Fg/FTOT) = 5 - Vexp = Dw$$

$$\log(Fr + Fb + Fg) - \log FTOT = 5 - Vexp$$

$$\log(10^{Vr} + 10^{Vb} + 10^{Vg}) - \log FTOT = 5 - Vexp$$

and thus
$$\log FTOT = Vexp - 5 + \log(10^{Vr} + 10^{Vb} + 10^{Vg})$$
$$FTOT = (10^{Vr} + 10^{Vb} + 10^{Vg}) \cdot 10^{Vexp - 5}$$

It is obvious from these equations that the proper logarithm changes in the exposure can be implemented by making linear changes in Vexp, and that unit changes in Vexp produce unit changes in Dw. Some typical values will demonstrate the relationship between Vr, Vb, and Vg and Ftot. It is presumed that the flux incident on electro optic modulators 341, 342 and 343 is $Io = 10^5$

| Vexp | Vr | Vb | Vg | Dmr | Dmb | Dmg | Dr | Db | Bg | Dw | 5-Vaxp | log Fr | log Fb | Log Fg | log FTOT | Case # |
|---|---|---|---|---|---|---|---|---|---|---|---|---|---|---|---|---|
| 10 | | | | (Densities of master image) | | | (Densities of electro optic modulators) | | | | | | | | | |
| 4 | 4.0 | 4.0 | 4.0 | 1.5 | 1.5 | 1.5 | 1.0 | 1.0 | 1.0 | 1.0 | 1.0 | 4.0 | 4.0 | 4.0 | 3.477 | #1 |
| 4 | 3.8 | 3.9 | 4.0 | 1.3 | 1.4 | 1.5 | 1.2 | 1.1 | 1.0 | 1.0 | 1.0 | 3.8 | 3.9 | 4.0 | 3.385 | #2 |
| 2 | 4.0 | 4.0 | 4.0 | 1.5 | 1.4 | 1.5 | 1.0 | 1.0 | 1.0 | 3 | 4.0 | 4.0 | 4.0 | 4.0 | 1.477 | #2 |

Case 1 and case 2 show that changes in master image densities can be directly compensated by dialing in values of Vr, Vb and Vg such that $Vr1 - Vr2 = Dmr1 - Dmr2$. $Vb1 - Vb2 = Dmb1 - Dmb2$; $Vg1 - Vg2 = Dmg2$ (where the numerical subscripts refer to various case numbers in the chart). If these relations are maintained then no change in Vexp is necessary since the decrease in total flux exactly compensates for the decrease in master image densities. Cases 1 and 3 show that changes in the log Ftot are equal to changes in Vexp. Thus, the exposure can be adjusted over a broad range completely independently of the color balance since electro optic modulator 344 absorbs flux equally from the several color bands. Further, Vexp can be used to scale the flux as determined by Vr, Vb and Vg, by any Cw, between transmittance value Cw max 10 - OD and Cw min where Cw max and Cw min are determined by the type of electro optic modulator used. The statements made above concerning the use of a separate Vfade voltage, the use of other computing circuits and programs and the use of data storage and retrieval systems clearly apply to this embodiment.

Figure 5:
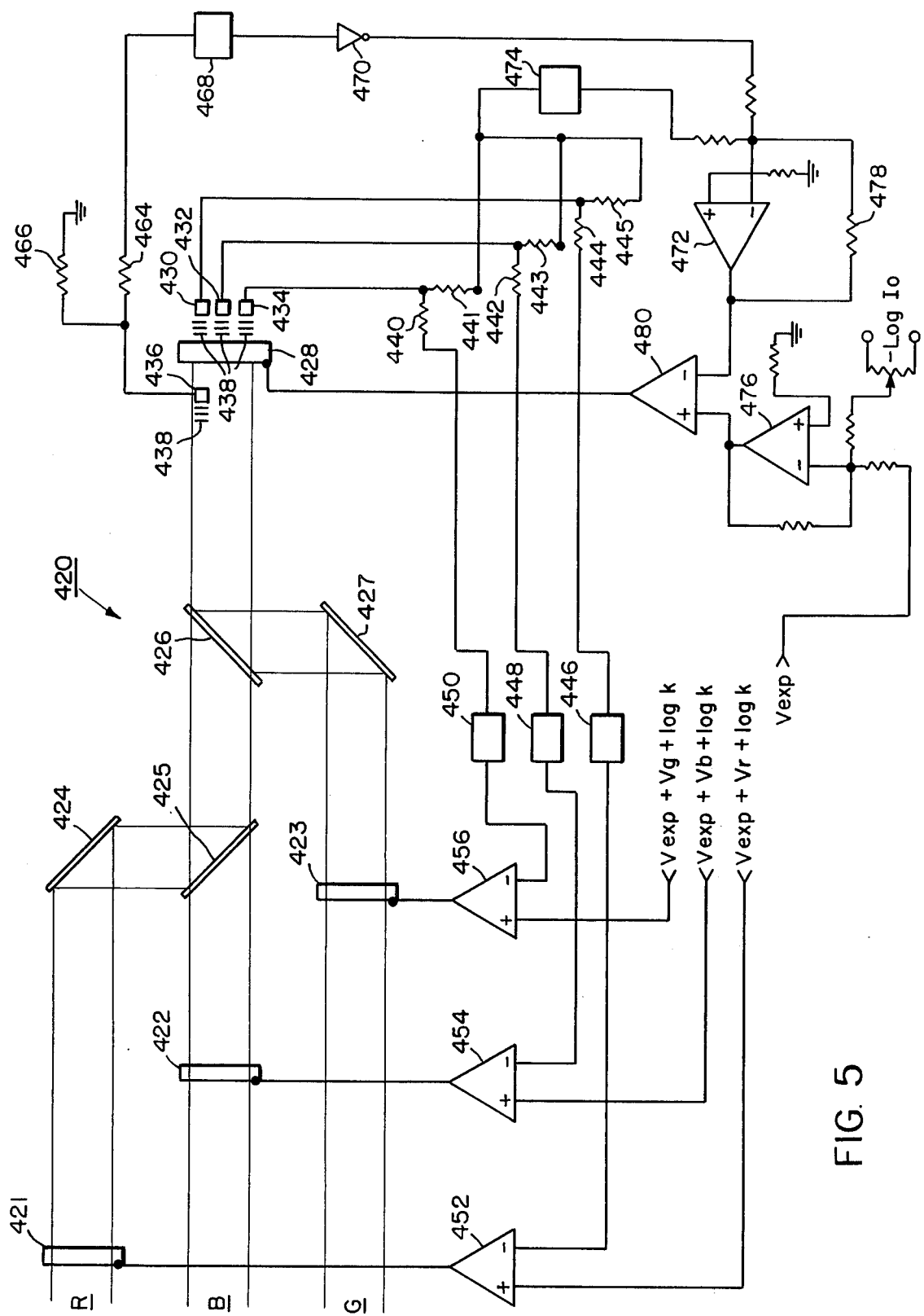

FIG. 5 shows another optical printer 420 embodiment using electro optic modulators. Since the major portions of the optical train have been described above, they will not be discussed here, nor will the computing circuitry of generating (Vexp + Vr + logk), (Vexp + Vb + logk), (Vexp + Vg + logk), since it has also been described previously. Three collimated beams containing flux from several spectral sands, such as red, green and blue, are passed through three electro optic modulators 421, 422 and 423. The beams are then combined to make white light by mirrors 424, 425, 426 and 427 as previously described. The white light is passed through a fourth electro optic modulator 428. Three photodetectors 430, 432 and 434, one for each of the three electro optic modulators passing colored light, are positioned behind the electro optic modulator 428 so thatthe flux passing therethrough impinges upon them. One more photodetector 436 is positioned in the beam in front of the electro optic modulator 428. Colored filters 438 are positioned in front of the photodetector 436, to equilibrate the differing sensitivities of the photodetectors to different wavelengths of light. For photodetectors 430, 432, and 434, the color filters 438 are chosen to provide sensitivity to only one bond of color light.

Hence, 430 is made sensitive only to red light, 432 only to blue light, and 434 only to green light. The output signals of the color photodetectors 430, 432 and 434 are divided into two equal currents by resistors 440-445, each of which has the same value. (Current dividers are shown, but voltage dividers can also be used, as is well-known in the art if the photodetectors are photovoltaic.) Half of the signal from the photodetectors 430, 432 and 434 is fed through log convertors 446, 448 and 450 and into the inverting inputs of power operational amplifiers 452, 454 and 456. These operational amplifiers will automatically adjust their outputs so that enough flux flows through the electro optic modulators 421, 422 and 423 to create sufficient current in the photodetectors 430, 432 and 434 to set the inverting inputs of the operational amplifiers 452, 454 and 456 equal to the values impressed on their non-inverting inputs. Note that the photo current from photodetector 436 does not enter into the feedback loops just described.

The photocurrent from photodetector 436 is divided in half by resistors 464 and 466. This is necessary to scale the photo-current into the same range as the other photocurrents (which were also halved, by resistors 440-445). The current passes from resistor 464 through a log element 468, through a linear voltage invertor 470 and into one of the summing lines of a summing amplifier 472.

The remaining photocurrents from photodetectors 430, 432 and 434 (half of which went to log elements 446, 448 and 450) are summed and passed through a log element 474. The inputs of amplifier 472 have the values -log Ii and log It, where Ii is the intensity incident upon 428 as detected by 436, and It is the intensity transmitted by 428 as detected by 430, 432 and 434 and summed by the resistor network above. The summing amplifier 472 sums two signals and inverts them. In addition, the value of the operational amplifier 472 feedback resistor 478 is adjusted to provide a gain of 2. The output of the operational amplifier 472 has the value 2(log Ii - log It).

Another summing amplifier 476 has as its inputs Vexp and -log Io, where Io is the flux incident on each of the electro optic modulators 421, 422 and 423. The output of this amp 476 is the value Log Io - Vexp. This value and the value 2(log Ii - log It) are input to a power operational amplifier 480. The equations of the system are as follows:

$$2 \log C_w = \log Io - Vexp$$

$$\log C_w = \frac{\log Io - Vexp}{-2}$$

where Fr, Fb and Fg are the fluxes transmitted by electro optic modulators 421, 422 423 & 428 and $C_r$, $C_b$ and $C_g$ are the transmissivities of those electro optic modulators. $2(\log Ii - \log It) = 2 \log Ii/It = -2 \log C_w$ where $C_w$ is the transmissivity of the electro optic modulator 428.

$$2 \log C_w = \log Io - Vexp$$

$$\log C_w = (\log Io - Vexp)/-2$$

Some typical values will make the operation of this system clear. Log Io presumed = 10.

| Vexp | Vr | Vb | Vg | log k | log Fr | log Fb | log Fg | 3·10 Vexp | log$^{CR}$/CR | log$^{CB}$/CB | log C$^G$/CG | log CW/CW | Dw | Case # |
|---|---|---|---|---|---|---|---|---|---|---|---|---|---|---|
| 8 | 2 | 2 | 2 | −2 | 8 | 8 | 8 | 3·10⁸ | −1/.1 | −1/.1 | −1/.1 | −1/.1 | 1 | 1 |
| 6 | 2 | 2 | 2 | −2 | 6 | 6 | 6 | 3·10⁶ | −2/.01 | <2/.01 | −2/.01 | −2/.01 | 2 | 2 |
| 2 | 2 | 2 | 2 | −2 | 2 | 2 | 2 | 3·10² | .4/.0001 | −4/.0001 | −4/.0001 | −4/.0001 | 4 | 3 |
| 0 | 2 | 2 | 2 | −2 | 0 | 0 | 0 | 3·10⁰ | −5/.00001 | −5/.00001 | −5/.00001 | −5/.00001 | 5 | 4 |
| 6 | 4 | 4 | 4 | −4 | 6 | 6 | 6 | 3·10⁶ | −2/.01 | −2/.01 | −2/.01 | −2/.01 | 2 | 5 |
| 6 | 4.2 | 4.3 | 4.5 | −4.353 | 5.847 | 5.947 | 6.147 | 3·10⁶ = Fr + Fb + Fg | −2.153 | −2.053 | −1.853 | −2/.01 | 2 | 6 |

Cases 1-4 show that the color balance is entirely independent of Vexp. They also show that the range of output flux is variable over a far greater range than the range of any electro optic modulators. PLZT ceramics, for example, have a range of about 4 decades, while the present embodiment has a range of 8 decades. This is accomplished by cascading 2 electro optic modulators in a manner that adds their ranges by adding their densities. Cases 2 and 5 show that the over-all exposure is completely independent of the color voltages Vr, Vb and Vg. Cases 5 and 6 show that the color balance depends on Vr, Vb and Vg only, and that a simple relation exists between the changes:

$$Vr - Vb = \log Fr - \log Fb = C_b - C_b$$

$$Vr - Vg = \log Fr - \log Fg = C_g - C_r$$

$$Vb - Vg = \log Fb - \log Fg = C_g - C_b$$

The comments made earlier in this specification about use of a separate Vfade to conveniently implement fades, the use of other computation means including digital circuits and programs, and the use of data storage and retrieval systems at any point within the circuitry of any identically functioning embodiment apply also in this embodiment.

Figure 6:
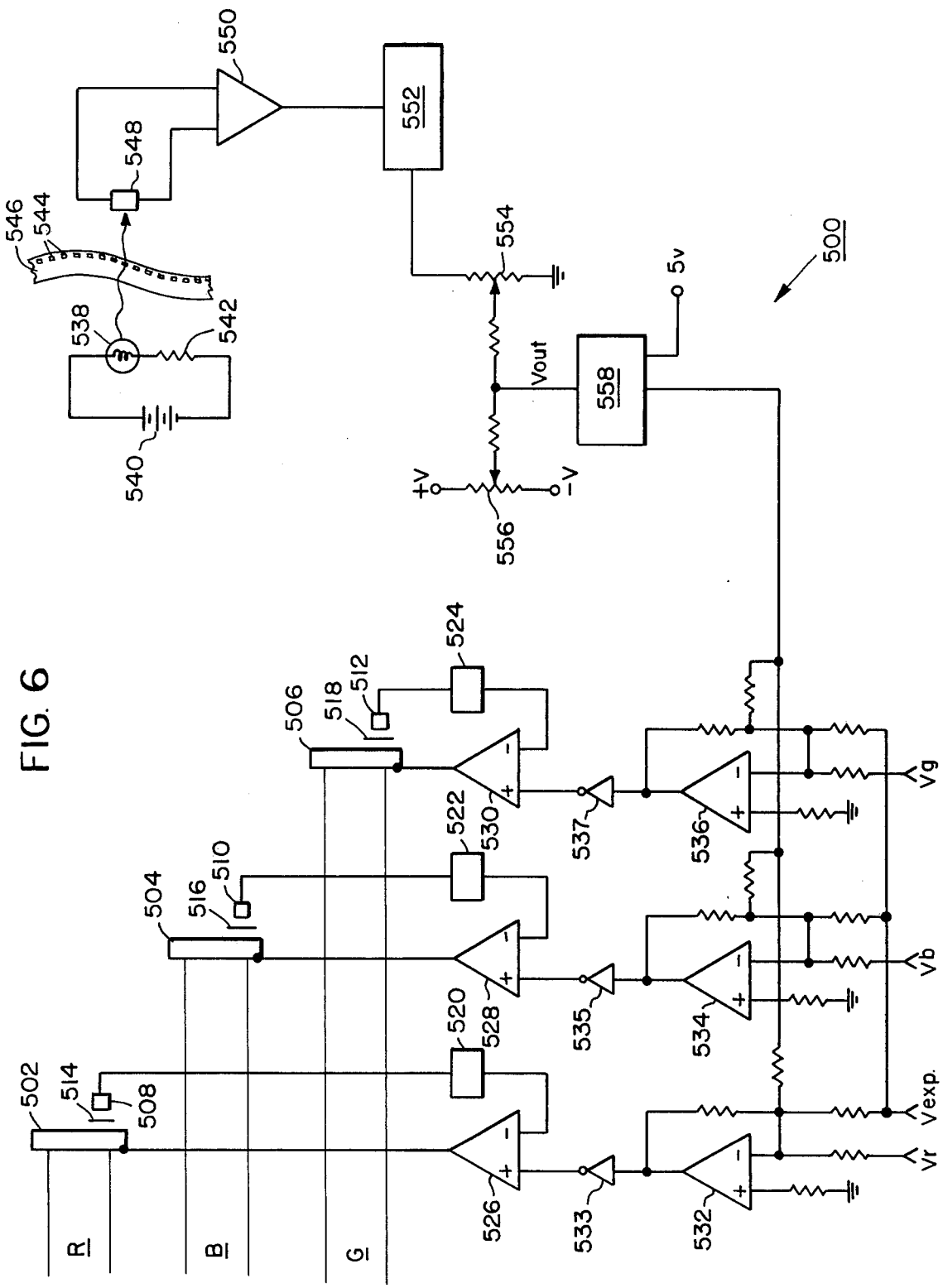

One of the advantages of using electro optic modulators is that their high speed permits the virtually instantaneous adjustment of the exposure to compensate for changing conditions. For instance, variations in the speed of the film movement in continuous printers, which would normally cause variations in exposure, can be easily compensated. The embodiment shown in FIG. 6 is an open loop film running speed compensator 500. Three electro optic modulators 502, 504 & 506 are illuminated by several collimated beams (R, B and G) of colored light. The combination of the beams to produce white light is not shown, being shown above and also being well known in the art. The electro optic modulators 502, 504 and 506 are connected in feedback loops using photodetectors 508, 510 and 512, spectral sensitivity balancing filters 514, 516 and 518, log elements 520, 522 and 524, and power operational amplifiers 526, 528 and 530. The presence of log elements 520, 522 and 524, creates circuitry conditions in which the flux transmitted by the electro optic modulators 502, 504 and 506 will be maintained at a value equal to 10 raised to a power numerically equivalent to the voltage impressed at the non-inverting inputs of the operational amplifiers 526, 528 and 530. Three operational amplifiers 532, 534 and 536 are used to sum the color control voltages Vr, Vb and Vg with the exposure control voltages, as has been previously described. Three linear inverting buffers 533, 535 and 537 restore proper polarity to these signals. As will become apparent, the details of the computing circuits at the inputs are not relevant, as long as they provide a summing junction. Likewise, the details of the configuration of the electro optic modulators are not critical, as long as the overall exposure can be regulated by a voltage. A light emitting diode 538, or other light source, which can emit in the infrared region where ordinary photographic emulsions are not sensitive, is connected to a battery 540 through a current limiting resistor 542. The light from the light emitting diode 538 is chopped by sprocket holes 544 of the film 546 to produce a series of light pulses on the surface of a photodetector 548. These pulse are amplified by amplifier 550. Other electrical, mechanical, or optical means for producing a series of electrical pulses whose frequency is proportional to the speed of the film can be used, and the use of these in place of the pulse generating system shown is simply an equivalent thereof. Electrical pulses from the amplifier 550 are fed to a tachometer circuit, 552 (such as is well-known in the art) and which produces a voltage directly proportional to the frequency of the input pulses. This voltage may be divided as necessary by a potentiometer 554 and a constant may be added as necessary by a potentiometer 556. These two potentiometers therefore provide a control over the slope and y intercept of the "V out vs frequency" function. For purposes of discussion we will presume that V out =0.01fin, and further that fin = 500 is the running speed of the printer for which no compensation of the input exposure control voltage is necessary for proper exposure. Vout = 5 for fin = 500, and thus the value of the reference voltage input to a log ratio detector 558 is shown at 5.0 volts. The voltage output from the ratio detector can be given as:

log Vout/5 or log fin/500

It can be seen that the value is negative when the running speed is less than 500 and positive when it is more. The voltage representing this value is summed directly to Vexp. Some typical values will make the operation of the circuit more clear:

| fin | $\frac{fin}{500}$ | $\log \frac{fin}{500}$ | Vexp | Vexp + Correction | $\Delta$log Iout |
|---|---|---|---|---|---|
| 500 | 1 | 0 | 4 | 4 | 0 |
| 50 | .1 | −1 | 4 | 3 | −1 |
| 5000 | 10 | 1 | 4 | 5 | +1 |

Where Iout is the intensity of the output exposing illumination.

These values show that a change in the speed of the printer is correctly compensated by a change in the output illumination; which means that the exposure is constant over a broad range of printer running speeds. Such a compensation device allows the use of less expensive mechanical film drive components in the construction of the printer, and is also a convenience to the user.

Figure 7:
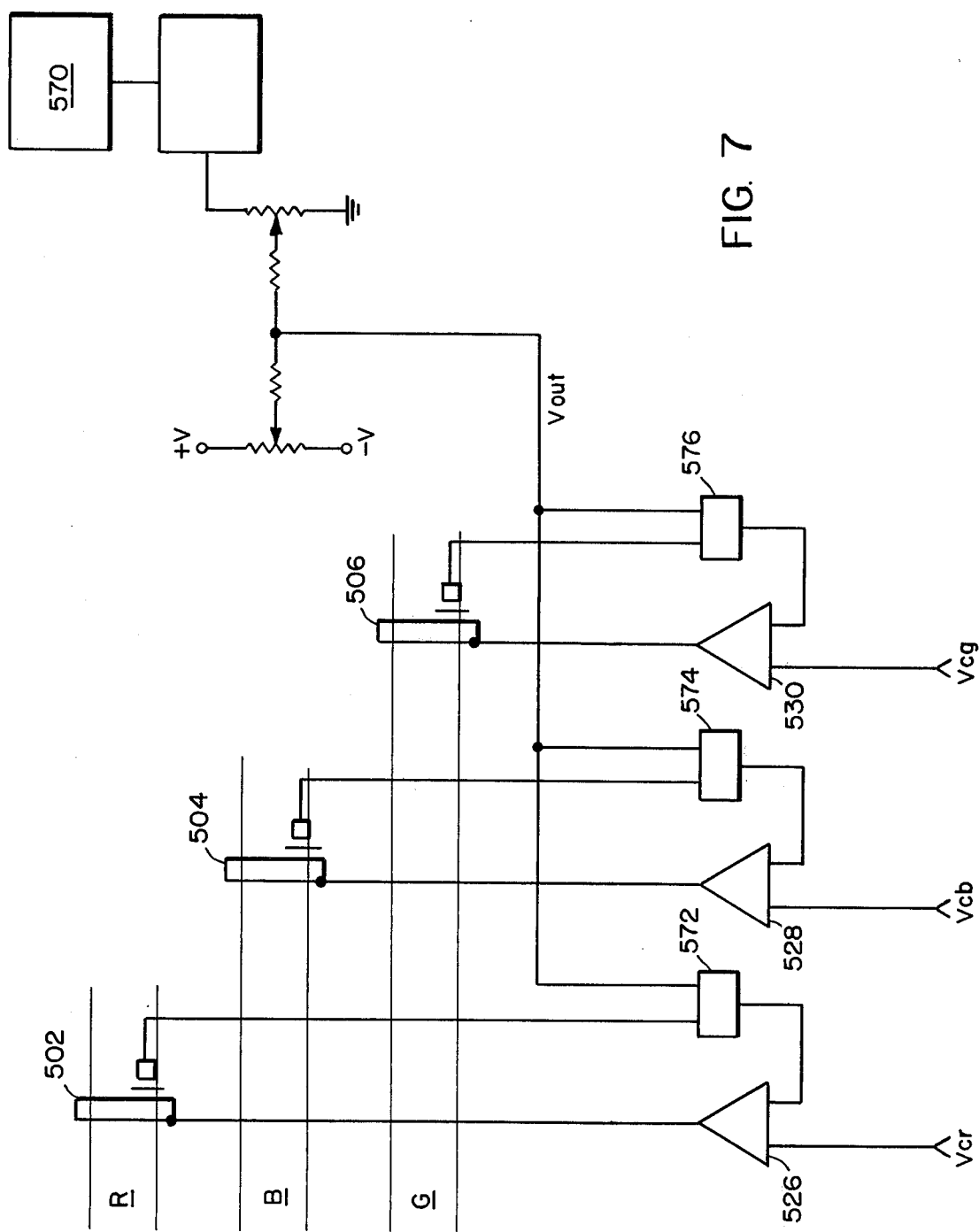

FIG. 7 shows another embodiment of the invention. In this case, the exposure is directly computed and this signal is used in the electro optic modulator feedback loops in place of an intensity signal. The various elements shown without reference numerals are the same and function identically to previously described elements (see FIG. 6). FIG. 7 shows a sprocket detection means 570 such as the one described in the previous embodiment of FIG. 6. The three log ratio devices 572, 574 and 576 are standard in the electrical arts. Their output signal value is equal to the log of the ratio of the input signal values. This embodiment utilizes the fact that changes in film speed occur slowly enough when compared to the time of exposure of a single frame that the exposing flux may be considered constant over the period of a frame. Thus the exposure, which may be given as:

$$E = \int_0^t I(t)\, dt$$

reduces to:

$$E = \int_0^t I\, dt = It, \text{ where } t \text{ is the exposure time.}$$

A closed logarithmic loop, such as previously described, is created by the photodetectors, the log ratio elements and the operational amplifiers 526, 528 and 530. The loop equation is log It − log Vout = Vcr, = V, cb = V, cg where It is the intensity of flux transmitted by the electro optic modulator. The subtraction of log fin makes the value input to the inverting inputs of the operational amplifiers 526, 528 and 530 an exposure value rather than an intensity value, and therefore serves to provide correct exposure over a broad range of running speeds, as the following values will show. It is presumed for the sake of discussion that normal exposure will be provided by $10^4$ units of flux at the running speed of 100 frames per second. It is further presumed that exposing flux from only one of the electro optic modulators is under consideration

| Fin | Vout | log Vout | Vcr,cb,cg | log It | log E |
|---|---|---|---|---|---|
| $10^2$ | 1 | 0 | 2 | 2 | 0 |
| $10^2$ | 1 | 0 | 4 | 4 | 2 |
| $10^3$ | 10 | 1 | 4 | 5 | 2 |
| $10^1$ | 0.1 | −1 | 4 | 3 | 2 |

The operational amplifiers 526, 528 and 530 will adjust the flux transmitted by the electro optic modulators 502, 504 and 506 to whatever value is necessary in order to maintain the log of I/fin equal to the values VCR, VCB and VCG input to the non-inverting inputs of the operational amplifiers 526, 528 and 530. The signals VCR, VCB and VCG can be generated by any of the means described or to be described herein.

The statements made above about the use of a separate Vfade signal for convenience in implementing fades, the use of other computing means such as digital circuit and program computing means, and the use of data storage and retreival systems also apply to the two embodiments of FIGS. 6 and 7.

Figure 8:
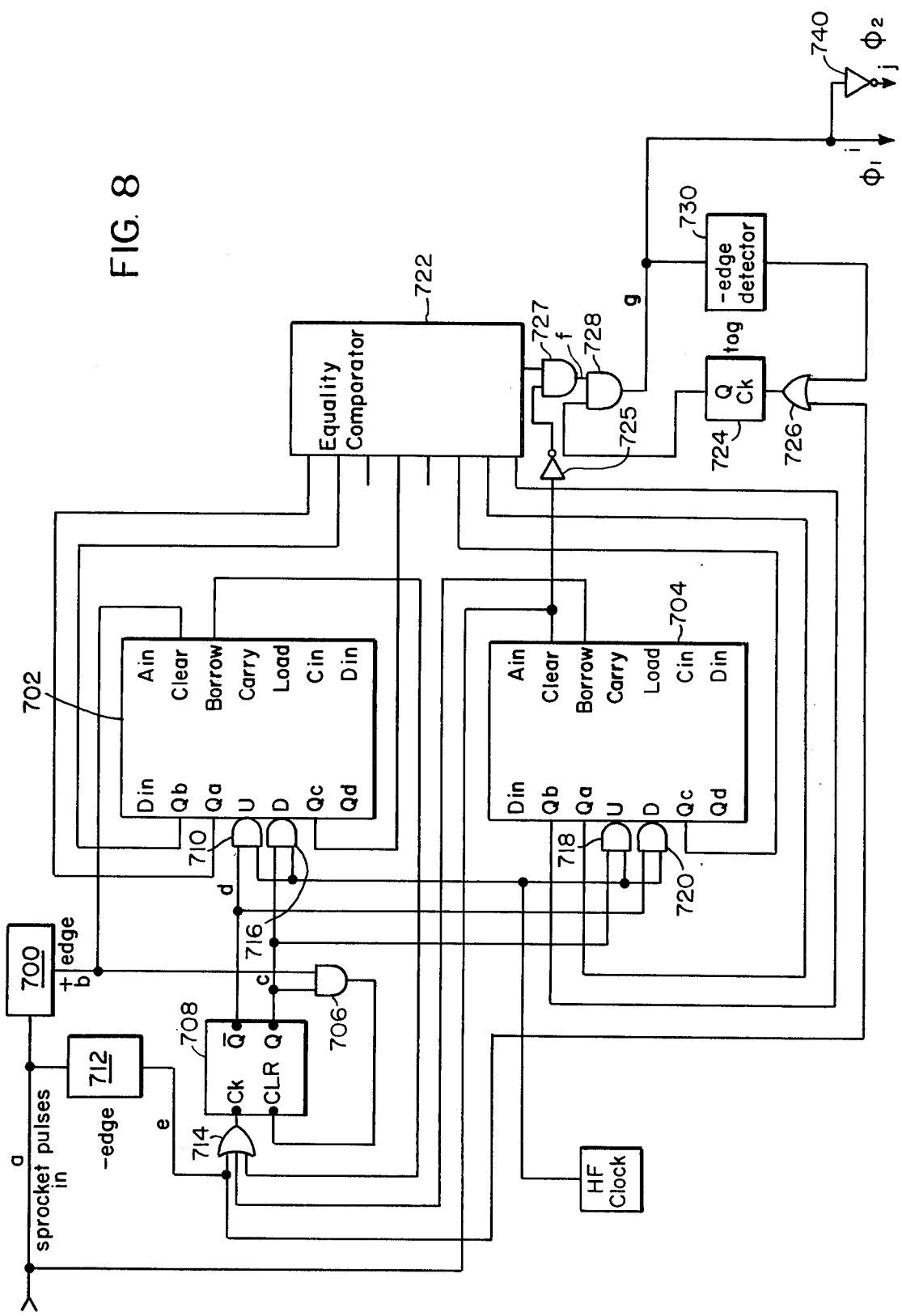
Figure 9:
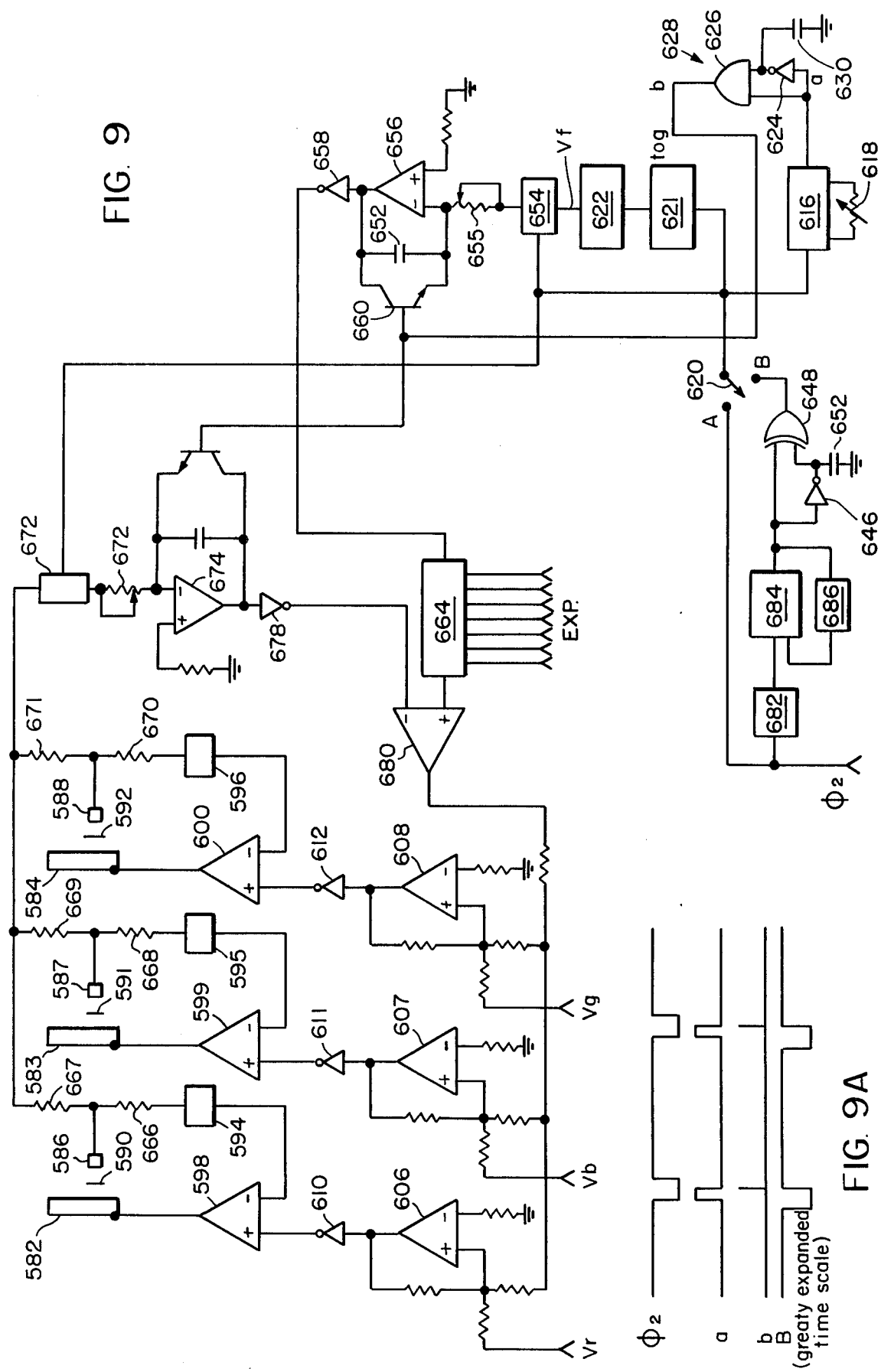

FIGS. 8 and 9 show another optical printer 580 embodiment which provides compensation for variations in running speed of the printer. The circuit works by integrating the signal from the photodetectors to yield an exposure signal. That signal is compared to an ideal ramp signal (also generated by the circuit) whose value indicates what the exposure signal should be for a given printer speed and the correct electro optic modulator transmissivities. The comparison is used to vary the electro optic modulator transmissitivities during the frame so that the exposure ramp conforms with the ideal ramp.

Figure 10:
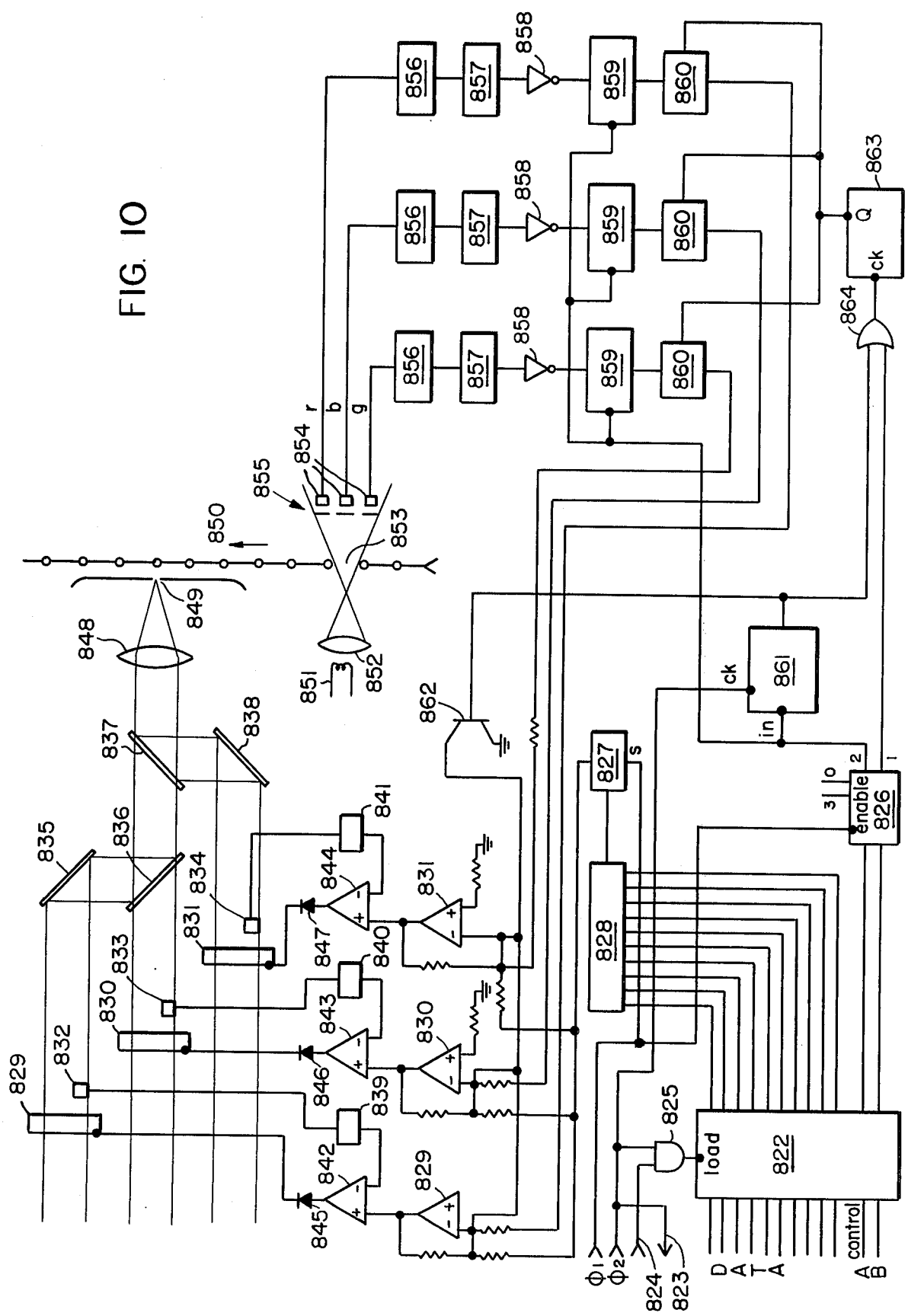

FIG. 8 shows the clock circuits (which are also used for the embodiment of FIG. 10). FIG. 8A is a timing diagram for this circuit. Pulses from a sprocket detector (not shown) are input at A. It is presumed that the sprockets are detected by some means that generate a positive signal for the time during which the sprocket is positioned in front of the detector. A fairly accurate clock circuit is required so that signal switching (exposure changes) of the embodiment will only occur between frames.

A positive edge detector 700 generates a very brief (50 nsec.) positive pulse on the rising edge of the sprocket pulse. This 50 nsec. pulse sets counter 702 to 0. Counters 702 and 704 are up down binary counters such as the SN 74193 with borrow and carry outputs. The sprocket pulse itself resets counter 704 so that it cannot count while the sprocket pulse is high. The brief pulse from the edge detector 700 activates AND gate 706 so that if the Q output of a toggle flip flop 708 is high, the output of AND gate 706 will go high to clear toggle 708 which sets the Q output to the low state. As soon as the brief pulse from 700 falls, counter 702 will start to count. Since the Q output of toggle 708 is low and the Q input is high, clock pulses from high frequency clock will be gated by AND gate 710 into the "count up" clock input of counter 702 and the "count down" input will remain low. The counter will count up until the falling edge of the sprocket pulse is detected by a negative edge detector 712 which generates a brief (50 nsec) positive pulse. This pulse toggles 708 through OR gate 714, which sets output Q = high and Q low; and enables AND gates 716 and 718 while disabling AND gates 710 and 720. The falling edge of the sprocket pulse also enables counter 704 by removing the high signal from its "CLEAR" input. Counter 702 will now count down while counter 704 counts up. It should be noted that each counter can be many bits long though only 4 bit counters are shown. Also, the least significant bit Qd of the counter is not used, as will be explained below. The outputs of counters 702 and 704 are monitored by an equality detector 722 and when they are equal, the output f of the detector 722 goes high for the clock pulse during which the equality occurs. Since the least significant bits of counters 702 and 704 are not used, an equality must occur since only even numbers are present at the inputs of the equality detector 722. The equality pulse has no effect on the counting operations, and counter 702 continues to count down, and counter 704 counts up until counter 702 reaches 0. Then the "borrow" output of counter 702 goes high, which toggles flip flop 708 through OR gate 714, and the counting directions are reversed. The "borrow" output of counter 704 also toggle flip flop 708 through OR gate 714, and thus the circuit is an oscillator whose period equals the period of the sprocket pulse. The circuit will continue to oscillate until another sprocket pulse occurs at which time the oscillator will assume the period of the new sprocket pulse. At the instant of the first equality pulse, both counters have completed half their count and the equality pulse thus always occurs at exactly the temporal midpoint of the first oscillation of the counters after the sprocket pulse has fallen. As long as the frame rate is constant during the brief period between the sprocket pulse and the first oscillation, the first equality pulse will correspond to the spatial midpoint of the sprocket hole, but delayed, by a period equal to half the current period of the sprocket pulse. Thus, the circuit accurately detects the presence of a frame line in the printing gate, and does so independent of the printer's running speed. It should be noted that a simple delay circuit triggered by the sprocket pulse will not be independent of printer speed, because the delay will be constant once set while the period of the sprocket pulse will vary.

Returning now to FIG. 8, at the instant the edge of the sprocket pulse falls a low level occurs at digital invertor 725, which applies a high level to AND gate 727, thus enabling that gate to pass equality pulses. 725 and 727 insure that the spurious equality pulse occurring when the counters are initially reset is not output. Also, the falling edge of the sprocket pulse causes negative edge detector 712 to generate a brief positive pulse, which triggers a toggling flip flop 724 through an OR gate 726. This sets flip-flop 724's output high which enables AND gate 728. When the first equality pulse occurs at "f" it will be transmitted through gate 728. The falling edge of the equality pulse causes negative edge detector 730 to generate a brief positive pulse which resets Q of flip-flop 724 to low through OR gate 726. Since detector 712 goes high only once for each sprocket pulse received, only the first equality pulse for each frame is passed. A digital invertor 740 provides the complement $\phi_2$ of the brief clock pulse $\phi_1$. It is intended that the sprocket detector include means for mechanically adjusting the distance between the detector and the printing gate, such as, for example, a screw which, when turned, will translate the whole sprocket detection means with respect to the exposure gate. During calibration of the printer, this screw is adjusted so that equality pulses occur exactly when the frame is properly positioned in the gate.

FIG. 9 shows three electro optic modulators 582, 583 and 584 for the several spectral bands (the optical components used to separate and recombine the spectral bands are not shown since they have been described above) and three photodetectors 586, 587 and 588 for monitoring the flux transmitted by the electro optic modulators. Three neutral density filters 590, 591 and 592 whose values are selected to compensate for varying sensitivities of the photodetectors to different wavelengths of light are employed as previously described. Each of the electro optic modulators is connected in a negative logarithmic feedback loop consisting of log elements 594, 595 and 596 and power operational amplifiers 598, 599 and 600. The operation of these feedback loops has been described above. The input flux regulating signal for the drive operational amplifiers is the sum of one of the color control voltages plus an error corrected exposure signal derived by the ramp comparator circuitry mentioned in the introduction to this embodiment. Summing operational amplifiers 606, 607 and 608 and linear inverting amplifiers 610, 611 and 612 are used to provide this sum by a method that has been described above.

Figure 9A:
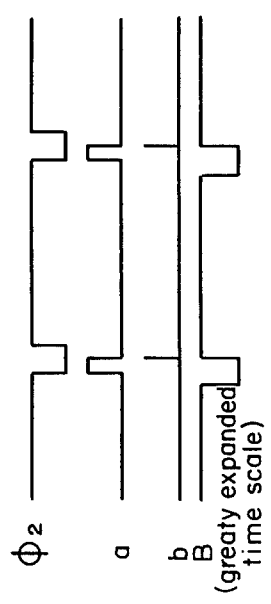

The interface of the clocking circuits described above with the device will now be described. The $\phi_2$ clock signal is input to switch 620. It is presumed, for the present, that this switch is in the "A" position, which connects the $\phi_2$ pulses directly to monostable multivibrator 616. The potentiometer 618 of 616 is set to provide a brief delay as shown in the timing diagram FIG. 9A. The falling edges of "a" pulses are set to occur at approximately the midpoints of the $\phi_2$ low periods. 628 is a negative pulse detector composed of digital inverter 624, OR gate 626 and capacitor 630. It outputs a brief positive pulse at "b" for each negative going edge at "a". The period of the "b" pulses can be adjusted by varying the value of 630. Thus the brief "b" pulses always occur while $\phi_2$ is in its low state. Both $\phi_2$ and "b" are used for clocking. $\phi_2$ is also used to drive tachometer 622 through toggle flip-flop 621. 622 is a frequency doubling tachometer, such as is well known in the arts which produces very low ripple on the DC output when given a pure square waveform input. (A circuit for such a tachometer may be found in National Semi-conductor corps, September 1972, application note AN 72 on page 33, paragraph 10.3.3). Toggle 621 is used to convert $\phi_2$ into the necessary pure square wave.

The voltage generated by the tachometer 622 is switched by an analog gate 654. The gate 654 is controlled by $\phi_2$ so that the output of the tachometer 622 is connected to a integrating operational amplifier 656 except for a brief period when a frame is properly positioned in the printing gate. The transfer function of the amplifier 656 is given as $E_{656\ out}$ $$E_{656\ out} = -RC \int_0^t Vf\, dt,$$

where Vf is the voltage generated by the tachometer 622 and R is the value set on rheostat 655. The value of R in the above equation can be adjusted for calibration purposes. A linear voltage invertor 658 cancels the inverting action of integrator 656. A transistor 660 is connected across the integrating capacitor 662, and thus the capacitor can be shorted and the integrator 656 reset by memontarily applying a positive voltage to the base of the transistor 660. Such pulses are obtained from "b".

The functioning of this integrator 656 is as follows: a sprocket pulse causes pulses "$\phi_2$" and "b". The negative pulse "$\phi_2$" closes gate 654 and disconnects Vf from the integrator 656, then pulse "b" turns on transistor 660 which shorts out the capacitor 652 of integrator 656 and thus resets it. Then pulse "$\phi_2$" rises and the integration of Vf begins again. The whole reset operation occurs during a very brief time (50–100 nsec) while a frame is exactly positioned before the printing gate. Thus the time allowed for the integration is determined by the instantaneous running speed of the printer. Some typical values will make the operation of this segment of the embodiment clear. Presume that:

Vf = 0.001 $f$ where $f$ is the instantaneous frame rate of the printer. Also presume that a basic time unit, $t$, is chosen such that $f \cdot t = 1000$. RC of integrator 656 is presumed to be 10.

| f (fr/sec) | t | Vf | peak value of E out 658 = 10 Vf 19 T |
|---|---|---|---|
| 1000 | 1 | 1 | 10 |
| 100 | 10 | .1 | 10 |
| 10 | 100 | .01 | 10 |
| 1 | 1000 | .001 | 10 |

These values show that the signal output by linear voltage inverter 658 is a voltage ramp whose value changes from 0 volts at time = 0 to 10 volts at time = $t$. The frequency of the ramp equals the instantaneous frame rate of the printer, but the ramp's maximum value is independent of the frame rate. By adjusting rheostat 655, the instantaneous value of the ramp at any instant during the integration process can be made equal to the maximum deliverable exposure to the frame at that instant with all of the electro optic modulators 582, 583 and 584 fully transmissive. If the instantaneous ramp voltages were scaled by some fraction $c$, then the instantaneous value of the scaled ramp would represent the desired delivered exposure to the frame at that instant with the electro optic modulator transmissivities, and thus the total exposing flux, scaled by $c$. The instantaneous value of the scaled ramp thus represents the desired exposure of a frame at a given point in time, and therefore the values of the ramps are "ideal" values. The 10 volt ramps output at the inverter 658 are input to a multiplying digital-to-analog converter 664, whose instantaneous output voltage is equal to the instantaneous input voltage multiplied by the fraction C = EXP/2n, where EXP is a digital number of $n$ bits input into the converter 664 as shown. Thus, the converter 664 is used to scale the 10 volt ramps by whatever fraction is desired. In practice, the converter 664 can accept sufficient digital input bits to provide a large number of scaling factors or exposure increments. As mentioned above, correct exposure is obtained by comparing the "ideal" ramp with the actual exposure ramp.

The actual exposure is integrated as follows. Resistors 666–671 divide the photocurrent of photodetectors 586, 587, and 588 into equal halves. One half of the photocurrent of each of the electro optic modulators 582, 583 and 584 is summed and input to an analog gate 672 which is switched by the same control signal used to switch the analog gate 654. An operational amplifier 674 is connected as an integrator in an identical manner to the integrator 672. A reheostat 676 can be adjusted for calibration purposes to properly relate the value of the actual exposure integral, as output by the amplifier 674 and inverted by a linear inverter 678, proportional to the "ideal" exposure integral. Note that the exposure integrator 674 and the Vf integrator 656 are reset by the same signals and thus their integration ramps are always synchronized. The exposure ramp is then compared with the scaled "ideal" ramp by an operational amplifier 680. If at any instant the value of the exposure ramp is less than the value of the scaled ideal ramp, the output voltage of the operational amplifier 680 will become more positive. This voltage is summed into the flux control circuits of the electro optic modulators 582, 583 and 584, and a positive change will cause the electro optic modulators to transmit more flux. This increases the value of the exposure ramp and reduces the original error. The operational amplifier 680 should be chosen to provide high open loop gain but a low slew rate. The low slew rate insures that the response of the electro optic modulators will be fast enough to "follow" the error correction signals output by the operational amplifier 680. Proper slew rate will yield a critically damped case where any error is exactly compensated in a short time with no oscillation of the error signal (V $^+$ 680 − V $^-$ 680). Thus, once any initial error between the ramps has been corrected, the exposure ramp will follow the ideal ramp almost exactly. The high open loop gain of the operational amplifier 680 insures that the instantaneous value of the exposure ramp will follow that of the ideal ramp with negligible error. It should be noted that during the brief period when the integrators 656 and 674 are being reset, the output of the operational amplifier 680 may be indeterminate. However, the time allowed for reset is so brief compared to the slew rate of the amplifier 68 that very little, if any, change in transmitted flux will occur.

Note that the ideal ramp and the exposure ramp, and hence the error signal, are linear with respect to the quantity of flux they represent, while the values of the signals output by summing amplifiers 606, 607 and 608 are logarithmic with respect to the quantity of flux they represent. Thus, the error correction signals output by the operational amplifier 680 are even more effective in regulating exposure, since a 1 volt change at 680 output will increase flux by a factor of 10. The digital input signal EXP is exponential with respect to flux quantity because of the action of the log elements 594–596.

If the switch 620 is set to the "B" position, the device functions somewhat differently. The input $\phi_2$ signal passes through a toggling flip flop 682 which outputs a perfect square wave whose frequency is half that of the sprocket pulses. The square wave is input to phase locked loop 684, which is capable of capturing signals over a very broad range such as the RCA CMOS CD 4046 phase locked loop. Phase locked loops are well known to those skilled in the electrical arts. Loop 684 will adjust its output frequency until it equals the frequency of toggle 682. However, if a digital frequency divider 686 of the type well-known in the electrical art is inserted in the feed back loop of 684 then the frequency output will be $n$ times the frequency input by toggle 682 where $n$ is the divisor of divider 686.

The multiplied frequency is fed to an edge detector composed of inverter 646, exclusive OR gate 648 and capacitor 652. The output at "B" is a string of negative pulses corresponding to each rising or falling edge of 684's output. The pulse duration is set by the value of capacitor 652 to be in the proper range. Thus, the whole integration and comparison function can be implemented many times for each frame, which would create better accuracy. In this mode the value of RC for integrator 674 would have to be increased by $n$ times to maintain the proper exposure ramp range. If mode "B" of this embodiment is used in conjunction with the embodiment of FIG. 2 above, and if EXP is changed each time a new integration is initiated, exposure gradients over the vertical dimension of a given frame could be easily implemented.

FIG. 10 shows an embodiment of the invention in which automatic exposure and color balance control is implemented by another method. A master image reference frame is made by exposing a few frames of gray card under lighting conditions identical to those in the master image that follows. The embodiment will measure the color densities of the reference frame at some point a fixed number of frames before the printer's exposure gate. The information is stored until the first frame of the shot enters the gate and is then released to the electro optic modulator controllers, which automatically set proper exposure and color balance. In addition, a one frame duration "override" signal provides blanking for the electro optic modulator to insure that the reference frame is not exposed onto the print. The device uses the aforedescribed narrow slit illuminator gate of embodiment 2 to achieve accurate switching of all signals between the frames. The device must also be used with an A—B rolled master so that no frames are added due to the presence of the reference frames. The device uses the same clock circuits as the previous embodiment (FIG. 8).

In the embodiment of FIG. 10, digital control and timing circuitry are used for simplicity in describing the operation of the invention. For this reason a digital interface is shown to digital data storage means (not shown). Data is input to a storage buffer 822 in parallel form on a number of data lines. Clock signal $\phi$ 2 is connected to the storage means via line 823 and when $\phi$ 2 is high a "load next data" command is generated on line 823. New data can be loaded as frequently as every frame, if desired, but the last loaded value could be repeated indefinitely, because buffer 822 will only be loaded with new data if AND gate 825 output is high. This occurs only when both $\phi$ 2 and line 824 from the storage means is high. Thus line 824 is a "load new data" line which enables $\phi$ 2 to activate 822's "load" input. Whenever new data is loaded, a 2 or more bit control word is also loaded into the buffer 822. When $\phi$ 2 falls, indicating the end of the load period, $\phi$1 rises and the data is "released". $\phi$1 enables 2–4 decoder 826 which then sets one of its outputs high if the control word value input from 822 is non-zero. $\phi$1 also enables analog samplehold circuit 827, which samples the analog value output by digital to analog converter 828, and presents it to the electro optic modulator drive circuits through summing amplifiers 829, 830 and 831. Thus, the changing of data as well as the implementation of control functions, always occurs during $\phi$1, when the frame line is in the gate. Before going on, it should be pointed out that digital data need be loaded only when an offset from normal exposure is desired, since the embodiment automatically provides proper exposure and color balance. Also, offsets for each of the color intensities can be provided through the use of more data lines, digital analog convertors, and sample hold circuits. However, the provision for such offsets is clearly within the scope of this invention.

Returning now to FIG. 10, the printer electro optic modulators are shown as 829, 830 and 831. Photodiodes 832, 833 and 834; mirrors 835, 836 837 and 838; log elements 839, 840 and 841; power operational amplifier 842, 843 and 844; diodes 845, 846 and 847; cylindrical lens 848, narrow slit printing gate 849, and master image roll 850 are also shown. Since these parts and their operations have been amply described above in previous embodiments, they will not be described here. An incandescent or other lamp 851 is included whose color balance is approximately equal to that of the main illuminant. Lens 852 focuses the light rays of 851 through the master image at 853, 853 is the gray-card image reference frame that was mentioned above. Note that a frame line, as indicated by the small circles on 850, is in the slit 849. Thus the reference frame illuminant and measuring system shown near 853 is offset by ½ frame. This insures that when the "measure reference densities" command is enabled by $\phi$1 (which goes high when the frame line is opposite the exposure slit) the reference frame will be in the proper position. Light from 851 passes through 853 and impinges on several photodetectors 854, one for each of the electro optic modulators 829, 830 and 831. The response of the photodetectors 854 is limited and balanced by the colored band pass filters 855 placed before them. Thus, each of the photodetectors 854 responds only to light in the same wavelengths as the colored beam passing through the electro optic modulator to which it is connected. The photodetector output signals which are linearly related to the flux transmitted by the reference frame are scaled by analog scalers 856, such as resistive divider networks, so that the signals input to 857 are within the 0–1 transmissivity range. These scaled values are input to log convertors 857, and the log values are inverted by analog invertors 858. Thus, as has been taught above, the values output from inverters 858 are representative of the densities of the reference frame in the several bands used by the printer.

When the control input lines "A" and "B" contain the following values, A=1, B=0, then line 2 of decoder 826 will go high on the next $\phi 1$ pulse. This is the "measure reference frame" line. The line activates sample and hold circuits 859 so that the values present at 858 outputs during this instant, which correspond to the densities of the reference frame, are stored by 859. (However, these values will not be transmitted to the electro optic modulator circuits because analog gates 860 are disabled). Line 2 also sets the input of digital shift register 861 to the high level. When $\phi 1$ falls line 2 of 826 goes low and simultaneously, $\phi 2$ goes high. $\phi 2$ clocks the shift register and shifts a 1 into its first storage location. (861 is of the "O hold time" variety so that the input from line 2 does not have to remain high for a 1 to be shifted into the first storage location). 861 is $n$ bits long by one bit wide, where $n$ is the number of frames between the reference frame and the frame about to enter the slit gate. Thus, $n$ pulses of $\phi 2$ later, when the reference frame is about to enter the gate, the 1 shifted into 861 will emerge at the output. It will be present from the time the rising edge of $\phi 2$ pulse Pi occurs until the rising edge of the next $\phi 2$ Pi+1 occurs. This time interval precisely corresponds to the time period between the presence of the leading frame line of the reference frame in the printing gate and the presence of the trailing frame line. As soon as the output of 861 goes high, (i.e. when the reference frame is about to enter the slit gate) the base of transistor 862 goes high and the transistor 862 turns on. This grounds all the summing inputs of operation amplifiers 842, 843, and 844 and thus causes the electro optic modulators 829, 830, and 831 to assume their minimum transmissivity. Thus the reference frame is not printed onto the copy film (not shown). 861's high pulse also toggles flip flop 863 through OR gate 864. This sets the Q output of 863 high which activates analog gate 860, and connects the density voltages stored in sample hold circuits 859 onto the summing lines of operational amplifiers 842–845. But since these summing lines are grounded by 862, the new signals have no effect until 861 goes low when the reference frame has left the printing gate. When 861 does go low, the electro optic modulators 829, 830 and 831 will move quickly to the color balance, exposure, and exposure offset values input from 860 and 827, and exposure of the image will begin. Note that toggle 863 stays high (and that density values are connected by 860) until it is clocked by a pulse on line 1 which is the "end of exposure" command line. Then the analog gates 860 will close, and the exposure will go to zero. Note also that at no time in the operation other than that specified above does a 1 enter the shift register 816.

Note that for proper functioning, the electro optic modulators and associated electronics must be one of the embodiments described above for which color balance and proper exposure are achieved by entering the densities of the three color layers directly as their corresponding voltage values. The statements made above about the use of other electronic circuitry to embody this invention, the use of digital computers, programs, and the use of data storage and retrieval systems within the circuitry apply to the aforedescribed embodiment.

Figure 17:
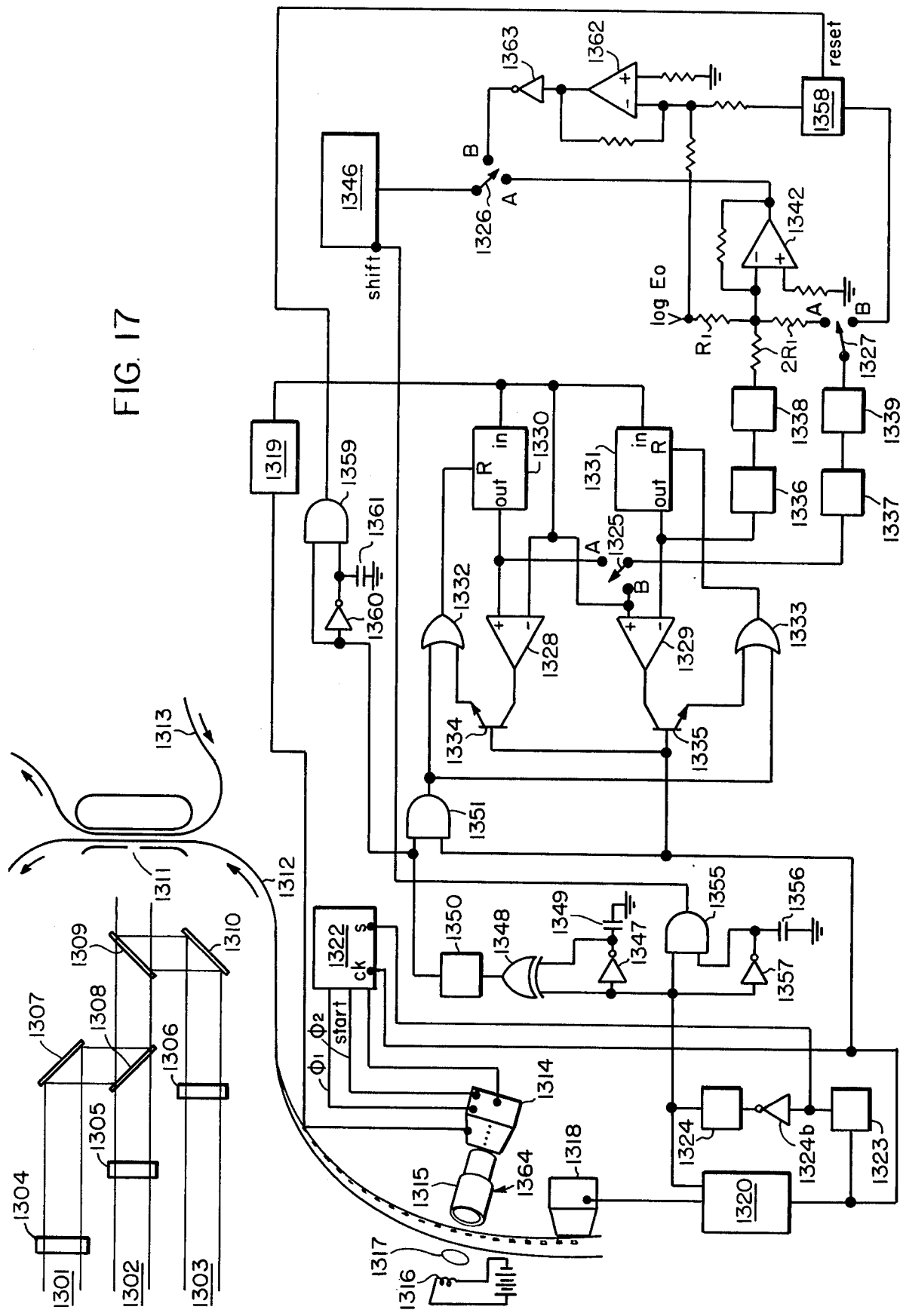

FIG. 17 shows an embodiment of the invention in which the density of each frame is automatically measured at some time prior to the exposure of the frame, and in which the proper exposure for each frame is computed from the measured density and input as a proper control voltage to the electro optic modulators when the frame enters the gate. Thus exposure is automatically normalized and the device's operator need not pre-measure the density to determine the exposure. He needs to communicate with the machine only when an offset from normal exposure is desired.

Referring now to FIG. 17, a printer of the continuous contact variety is shown. The embodiment, however, could be used with equal ease in any other type of printer. Several collimated incident beams 1301, 1302, and 1303, of different spectral bands are directed through several electro optic modulators, 1304, 1305 and 1306. The transmitted beams are then combined to make white light by mirrors 1307–1310. The electronic drive circuitry, including photodetectors, is not shown, having been amply taught above. The emergent white beam is directed at exposure aperture 1311 behind which passes, in synchronization and intimate physical contact, the master image roll 12 and the unexposed copy film 1313. These films move in the direction indicated by the arrows. At some fixed number of frames, before said exposure gate, a scanner 1314 is positioned. A lens 1315 focuses the image of the moving master image frame on the scanner. The master image is illuminated by a light source 1316 whose color balance is near the average color balance of the printer's main light source (not shown), and by a lens 1317. Also in the master image roll's pathway is a detector for sprocket holes 1318 which provides an electrical pulse for each sprocket hole sensed. Scanner 1314 can be of any type which reads a given number of lines per frame and a given number of points per line, and which also puts out an electrical signal in some way proportional to the transmissivity of the point being read. Video orthicon tubes, photodiode arrays, and mechanical or electrical flying spot systems could all be used without violating the spirit of of the invention. FIG. 17 shows a photodiode scanning array of the type known in the electrical arts. The array measures "exposure" (i.e. the time integral of the instantaneous incident flux) at a large number of "photodiode" points arranged in a straight line. At each point the array contains a photodiode and a small capacitor which stores all the electrons generated by that diode due to impingent light flux. The array also contains an internal shift register which connects each storage capacitor in sequence to a single output line. At the instant of each connection a current pulse results as the capacitor discharges through the output line. The total charge transferred, which may be measured by integrating the discharge pulse, is representative of the total exposure since the last measurement was taken. The video output, which is a series of such pulses, is input into a "charge amplifier sample and hold", 1319, which integrates the current pulses one at a time, amplifies them, and stores each value until the integrator has processed the next pulse. Scannable photodiode arrays and charge amplifiers are available from Reticon Corp. in California, among others. In the preferred embodiment, the clock frequency driving the read-out shift registers of 1314 is derived from the printer frame rate.

Figure 18:
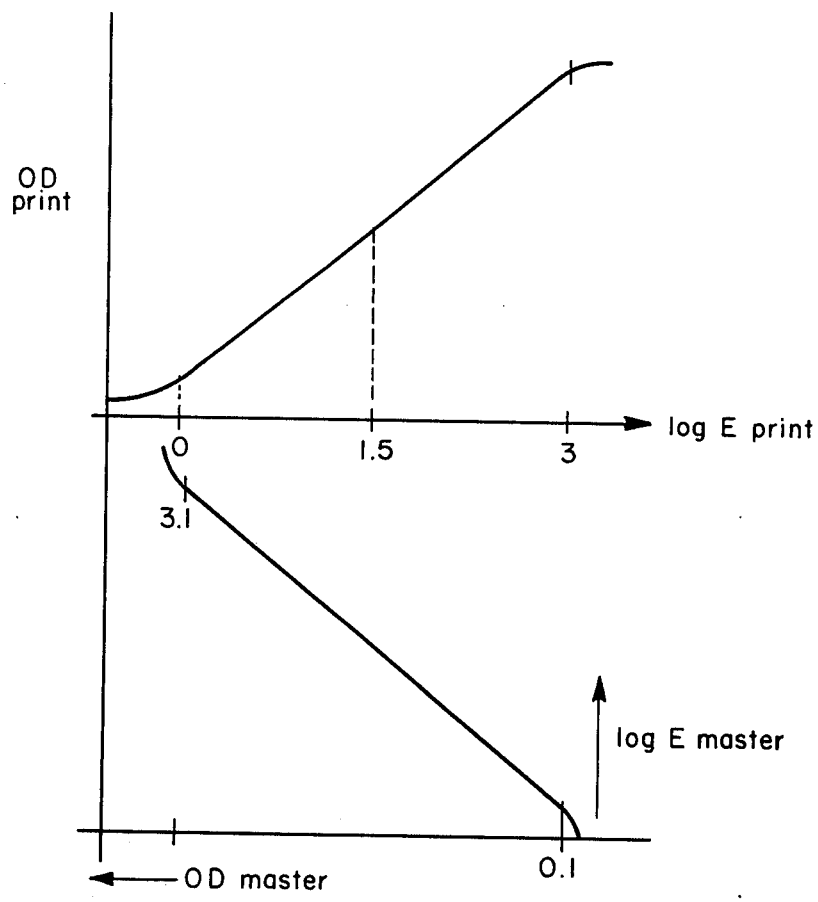

Sprocket detector 1318 drives a phase locked loop 1320 wired as a frequency multiplier by feeding the output loop frequency back through a digital frequency divider 1321 as has been previously taught. The total frequency multiplication provided is *np* where *n* is the number of horizontal lines scanned by 1314 per frame, and *p* is the number of points per line. This clock signal drives the array clock and driver 1322 by providing a pulse once for each time it is desired to shift the next data out of the array. The basic frequency is divided by p by counter 1323 to provide an end of line signal that triggers the re-scanning of the array through 1322. Thus the array scan is re-started immediately following the end of each array scan. Because of the dependence of the scanning rate on the speed of the printer, exactly *n* lines will be scanned for each frame in smooth succession, and thus the value of the video signal will always represent the exposure for a fixed time period if the printer speed is constant. Another counter 1324 is set to further divide the clock pulse frequency by *n* thus providing an end of frame pulse. Digital invertor 246 is used to create clocking conditions in which the end of frame pulse is 180° behind the end of line pulse. The operation of the embodiment with switches 1325, 1326 and 1327 in the "A" position will now be described. In this mode the video signal is input to the inverting input of high speed analog comparator 1328, and to the non-inverting inputs of high speed analog comparator 1329. The other comparator inputs are wired to the outputs of high speed sample and hold circuits 1330 and 1331. We will presume that the outputs of 1330 and 1331 have initially been set equal to the exposure value of the first point of the first line of the frame being scanned. The output of sample and hold circuit 1330 is connected to the non-inverting input of comparator 1328. Thus, presuming that an image is on the scanner 1314, and that the video signal is not 0, the output of comparator 1328 will be at a logical "low" level if the instantaneous value of the video is greater than the output of sample and hold circuit 1330, and at a logical high level if the video signal is less. The output of 1329 will be at a logical "low" level if the value of the video signal is less than the value of the S & H output 1331, and at a logical high level if the output is greater. When the next clock pulse occurs at the output of 1320, transistor switches 1334 and 1335 will be turned on, and if the logical output of either of the comparators is high, the level will be transmitted through OR gates 1332 and 1333 and will cause high speed sample and hold circuits 1330 and 1331 to resample the signal. As soon as the sample output settles to the new value, both inputs of the comparator will be equal and the comparator's output will become 0 which will automatically deactivate the sampling operation. The sample and video signals are connected to comparators 1328 and 1329 in opposite senses, so that comparator 1328 will only cause resampling at 1330 if the video signal is less than the last sampled value, while 1331 will only resample only if the video signal is greater than the last sampled value. Thus if a large number of array photodiodes are read, comparator 1328 will store only the lowest of the values and 1329 will store the highest. At the end of the frame, when all *np* points have been scanned, the highest and lowest values for the whole frame will be remembered. The voltages stored are directly proportional to the exposure received and thus to the transmissivity of the master image presuming for the time being that the frame rate is constant, but: OD = log Ii/It = −1 log T where OD is the density at any point on the master image, Ii is the incident light, It is the transmitted light and T is the transmissivity of that point. The outputs of 1330 and 1331 are continuously available at analog scalers 1336 and 1337 which scale the exposure signals to the 0-1 range of transmissivities, and the scaled signals are continuously input to log convertors 1338 and 1339. Invertors 1340 and 1341 output OD = − log I signals. It is common knowledge among those skilled in the photographic art that proper exposure of a given master image onto a given copy film occurs when the intensity of the illumination is set to provide an exposure equal to the center value of the copy film's exposure range for that master image density corresponding to the center value of the master image density range. FIG. 18 shows this condition graphically. Suppose that the average or median density of the master =

$$(Dav = \frac{Dmax + Dmin}{2} = \frac{3.1 + .1}{2} = 1.6)$$

and that the median exposure value for the printing stock is:

$$(\log Eo = \frac{\log E \max + \log E \min}{2} = \frac{3}{2} = 1.5)$$

If an illuminant intensity of Ii is provided, the exposure can be computed by:

$$\log E = \log It \text{ master} = \log Ii - OD \text{ master}$$

But the desired exposure center value is log Eo = 1.5. Thus:

log Eo = log Ii − OD master, and log Ii, the intensity of the illuminant can be computed for any value of Dav and Eo.

$$\log Eo = \log Ii - 1.6, 1.5 = 3.1 - 1.6, \log Ii = 3.1$$

Operational amplifier 1342 is a summing amplifier, that computes the value of log Ii according to the following equation:

$$\log Ii = \log Eo + (Dmax + Dmin)/2$$

$$(\log Ii = \log Eo + Dav)$$

The instantaneous value of log Ii is always present at terminal A of switch 1326 which connects this value to the input of a serial analog memory, 1346. At the end of each frame, the end of frame line from 1321 goes high. The rising edge of the clock pulse from 1324 generates a brief positive pulse in pulse detector 1355, 1356 and 1357, the duration of which is controlled by the value of capacitor 1356. This pulse clocks the value of log Ii computed for that frame into the first memory cell. It simultaneously shifts out the proper value for the frame in the gate. The memory must have a number of cells exactly equal to the number of frames between the scanner 1314 and the gate 1311.

The rising edge of the end of frame pulse generates a brief low-going pulse at the output of XOR gate 1348, which together with digital invertor 1347 and capacitor 1349 form a rising and falling edge detector. The length of the pulse is set by the value of capacitor 1349. The rising edge of this latter pulse triggers toggle flip flop 1350 which sets its normally low output to the high state. This enables AND gate 1351, so that the next clock pulse at 1320 which is the first clock pulse of the new frame will put the output of 1351 high and reset 1330 and 1331 through OR gates 1332 and 1333. Flip flop 1350 will be reset by the rising edge of the pulse generated by 1348 when the end of frame output returns to 0 which occurs shortly after the end of the sample period generated by 1351 out. Thus the value of the first point of a new frame is always set into 1330 and 1331. The timing diagram of FIG. 17A will make the implementation of this initialization clear. The operation of the device with switches 1325, 1326 and 1327 in the B positions will now be described. In this mode, switch 1325 connects the video signal directly to analog scaler 1337 and log element 1339. Thus the value of density for each point is computed directly rather than just the densities of the highest and lowest values. Switch 1327 connects the density value to an integrating circuit 1358. This circuit is adjusted to perform the following computation:

$$V \text{out } 1358 = \frac{1}{i} \int_0^i D_i \, di$$

where $i$ is equal to $np$ and $Di$ = the density at point $i$ in the scan. This integral is equivalent in analog terms to the following sum:

$$Dav = \frac{1}{i} \int_0^i Di \, di = \frac{1}{i} \sum_{i=1}^{i} Di, \text{ or}$$

$$Dav = \frac{D1}{i} + \frac{D2}{i} + \ldots \frac{Di}{i}$$

Thus the integral is equal to the average density of the frame as scanned over $i = np$ points. Summing amplifier 1362 and linear invertor 1363 compute the value:

Log Ii = log Eo + Dav from the integral, and switch 1326 connects this value to the analog memory 1346. At the end of the frame, the pulse from 1355 clocks this value into the memory. AND gate 1359, invertor 1360 and capacitor 1361 form a positive edge detector which is triggered by the rising edge of toggle flip flop 1350. The pulse output by gate 1359 resets the integrator for the next frame. The timing diagram shows that the value of log Ii is already in the analog memory before the integrator is reset, and that the integrator is ready when the first point of the new frame becomes available. This mode of operation can provide different results from the first mode. Suppose a frame has a large number of points clustered near the bottom of the density curve of the master image, with just one point below that cluster, and one point at the top of the curve. In mode "A" the value of incident illumination will be set at a value computed to give "proper" exposure to the center density value between the two extremes, i.e. on exposure of the center of the log E range of the copy film. It ignores the very large "weighting" caused by the cluster of points just above the minimum density values. Mode "B", however, will perform an exact weighted average. That is, it will decrease the exposure until the cluster of low density values falls near the center of the log E range. However, in doing so, the few high density areas will become grossly underexposed on the print and detail will be lost. Thus mode "B" ignores the content of the picture. A frame which was purposely over-exposed or which consisted entirely of dark values, would be grossly over-exposed during printing. Of course some kind of compromise circuit could be devised for mode B which would allow only partial shifting of the exposure, but this would tend to be self-defeating. It should be noted that all previous automatic exposure control systems, including those that measure the Dav of a frame by measuring the flux transmitted through the whole frame simultaneously, suffer from the drawback of mode "B". For this reason, the circuitry of mode "A" is considered to be a superior solution to the problem of automatic exposure control.

In mode "A" overcompensation of printing exposure tends not to be a problem because all positive images, no matter how dark they may be overall, normally have at least one small bright highlight. By making $n$ and $p$ large, i.e. by using a high resolution scanner, the highlight, will be detected and over compensation will not take place. If a certain amount of averaging of values is required to create a less vigorous, perhaps more pleasing, compensation effect, it can be easily achieved by throwing the image on the diode array out of focus, an to this end adjustable lens focusing means 1364 are provided. With the image out of focus, very small bright highlights or dark shadows will be ignored, partially or totally, depending on the focus, and only the larger more visually "meaningful" picture areas will be measured. The degree of area selection can be controlled by the focus adjustment. If 1364 were a calibrated focusing mount, then the area size would become a presettable quantity. Further if the focusing of the lens were controlled by electro magnetic mechanical means, then the setting of area size could be implemented at high speeds during the printing run.

It should be noted that the exposure delivered by this embodiment is not speed compensated. If the frame rate decreases, then each photodiode in array 1314 will receive more exposure and will therefore provide abnormally low density values. These lowered values would be compensated by decreased electro optic modulator transmissivities and the errors would cancel, if it were not for the delay introduced by the analog shift register 1346. There is no guarantee that the printer will be running at the same speed when the data emerges as it was when the data was measured.

Speed changes can be most conveniently compensated by normalizing the computed density values for changes in running speed before the delay introduced by 1346, and then by using one of the means described above for compensating print exposure for changes in running speed. The photodiode array provides a voltage proportional to the exposure for each diode and we know that: C.E, where $c$ is a constant scaling factor that lowers diode voltage values output E, to within the 0-1 range and T is the computed master image transmissivity at the particular point. But E = It where t is the time of exposure. Let us define $tn$ = exposure period for the "normal" running speed. Then En = E. $tn/t$ where En is the normalized exposure and $t$ is the actual exposure period. Also: En = E. $f/fn$ where $f$ and $fn$ are the actual and normal frame rates respectively. Tn = C.En = C.E. where Tn is the normalized transmissivity of the measured master image spot. Log Tn = log C.E + log $f$ − log $fn$, and − 1 OD$_n$ = log C.E + log $f$ − $k$, where OD$_n$ is the normalized density, and $k$ = log $fn$.

Figure 19:
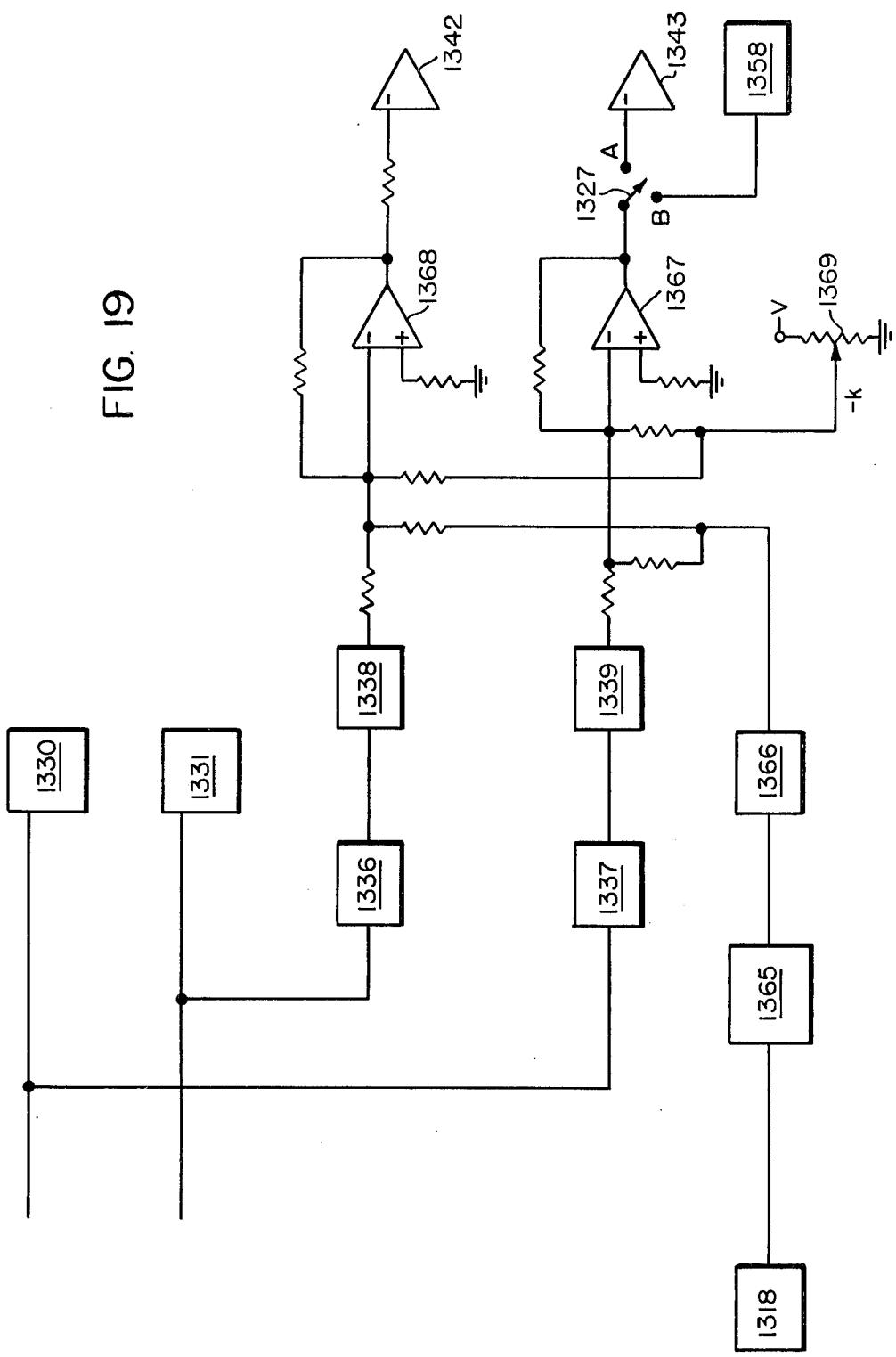

The circuit presented in FIG. 19 can compute the normalized OD, OD$_n$. Parts 1330, 1331, 1336, 1338, 1337, 1339, 1318, 1342, 1343 and 1358 are as shown in FIG. 17 and described above. The sprocket detector now also feeds tachometer 1365, which outputs a voltage proportional to the input frequency. 1366 is a log element. The output of 1366, which value is equivalent to log $f$, is added to the log T values output at 1338 and 1339 by summing amplifiers 1367 and 1368. The value of $k$ is also added. $-k$ must be calibrated for the normalized running speed. The outputs of operational amplifiers 1367 and 1368 are:

log Tn = U −1 (log C.E = log $f$ − k) = OD$_n$

Any of the means mentioned above for compensating for printer speed when OD$_n$ is shifted out of the analog shift register can be used in addition to the circuit just given.

The system of mode "A" is very useful for achieving automatic color correction. All previous systems have used a true averaging system for measuring the densities of the three color layers, such as a light source and photodetector measuring total flux transmitted by a given layer over the whole image area. Such systems may not produce visually pleasing results because they cannot take the image content into account. For example, if a scene shot in a sunlit woods were compensated by one of the averaging systems, the green exposure illumination would be decreased considerably because the green density reading would be very low. Such a compensation would make faces appear too red and blue. A system identical to mode "A" above but using three photodiode arrays on three sequential frames could be used to overcome this problem. The proper spectral band pass filters would be placed over each array to render it receptive only to light of one of the spectral bands. The scanning and much of the control signal manipulation, such as end of frame electronics, could be accomplished for all the arrays with one set of the circuits just described. The remainder of the design will be apparent to those skilled in the electrical arts. If staggered scanners are used, extra external steps of analog memory would have to be added the two additional analog shift registers. for the offsets necessary to fit the arrays together. Of course, variable focusing could again be used to vary the degree of compensation. Color correction can be employed, if desired, along the lines described elsewhere in this application in detail.

The statements made above about the existence of other embodiments of the electronics disclosed here, including the use of digital circuits and programs, and the use of data storage and retrieval systems are deemed to apply hereto.

Figure 11:
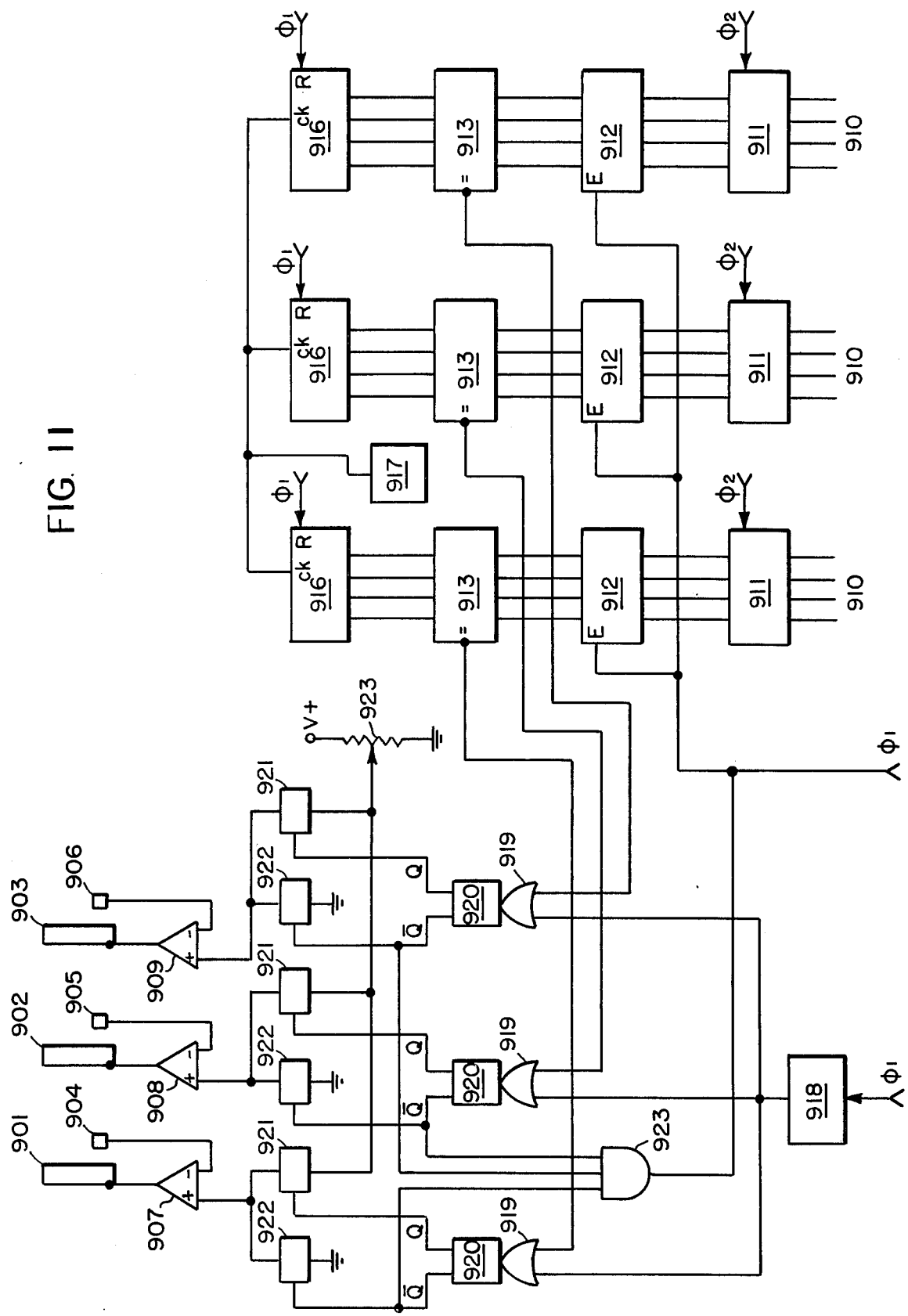

FIG. 11 shows a device which creates proper exposures by a method substantially different from the embodiments described above. This device operates by switching the incident light on for a specific period of time related to the desired exposure by allowing the electro optic modulator to transmit light for only that specific period of time. In this embodiment, the printing slit is equal to the height of the frame plus the height of the frame line, and the exposure time "window" i.e. the length of time during which exposure may be delivered is equal to the height of the frame line divided by speed of film movement. For 16mm film moving at 400 ft./min., the exposure "window" is about 60 microsec. FIG. 11 shows electro optic modulators 901, 902 and 903 as have been described above, photodetectors 904, 905 and 906 and power operational amplifiers 907, 908 and 909 as have been previously described. Data for the exposure of the several color bands are input on data lines 910. It is presumed that data is available in digital form, but data in analog form can be input in analog form and converted to digital form by devices well known in the electrical arts. The data is in the form of an integer number series from 0 to N max. where Nmax. represents the maximum exposure and where every integer from 0 to Nmax is used. Thus, the intput numbers represent a large series of exposure increments. In the preferred embodiment the increments should be logarithmically related. This relationship simplifies the computation of exposures from characteristic curves. Thus in the preferred embodiment, we may say that the exposure E represented by a given number $n$ should be : log $E$ = $n/N$max. log Emax. (It is presumed that Nmax. is sufficiently large to prevent the occurance of significant rounding-off error). Since time is the parameter being varied to vary exposure, and since time is most easily measured in linear units, the logarithmic value represented by an integer $n$ must be converted to a linear value for use. This is easily done by using the integer exposure series $0 < n < N$max as a series of memory location addresses. The data stored at location n is a number representing the actual number of time units needed for the specified exposure. Some electro optic modulators have considerable switching time delays due to the nature of their structure or substance. Such delays which would normally seriously reduce the accuracy of exposure regulation may be adjusted out of the system by compensating the values stored in the memory locations, such values being used as corrected data for making exposures. The use of such memory devices (911) provides exact exposure-value by exposure-value compensation for all switching delays in electro optic modulators as long as the delays do not vary during a given printing run. Further, any irregularities in the characteristic curves of the printing stock can be compensated in a similar manner by varying the data in memories 911. It is presumed for the sake of discussion that memories 911 are of the read-only type of memory, which is well-known in the art, but the use of read-write memories, in which the calibration data for a given set of conditions can be pre-loaded from suitable data calculating and/or storage means immediately before the start of the printing operation is clearly within the scope of this invention. Further, the use of computer like circuits to measure the electro optic response of the modulators, before, or even during, the printing run and to therefrom derive accurate calibration data and to load such data into memories 911 as a set of exposure values is deemed within the scope of the invention. Memories 911 are clocked by $\phi 2$, one of the clock pulses derived by circuitry presented in FIG. 8.

The rising edge of $\phi 1$ enables buffers 912 and causes transfer of the data just clocked by $\phi 2$ from memories 911.

The data output from memories 911 remains true for about 300 nsec. after the falling edge of $\phi 2$, and thus true data is always transferred to buffers 912. Obviously, other clocking schemes could be used where necessary without violating the essential spirit of the invention. The new memory cycle for memories 911, which begins on the next rising edge of $\phi 2$, does not change data in buffers 912 until the next $\phi 1$ pulse occurs. $\phi 1$ is also used to reset counters 916, which are clocked by high frequency clock 917. Thus counters 916 begin to count on the falling edge of $\phi 1$.

The falling edge of $\phi 1$ is detected by negative edge detectors 918, which generates a brief positive pulse that switches toggles 920 through OR gates 919. This sets the outputs of 920 in the following states: Q = 1, Q = 0, which enables analog gates 921 and disables analog gates 922. The enabling of analog gates 921 switches the adjustable output of potentiometer 923 onto the non-inverting inputs of power operational amplifiers 907, 908 and 909. This causes the electro optic modulators 901, 902 and 903 to switch on, and their transmissivities will rapidly seek the value necessary for their outputs, as detected by photodetectors 904, 905 and 906 to equal the value input by the potentiometer 923. Once the electro optic modulators 901, 902 and 903 are "on", the photodetector-operational amplifier feedback loop maintains the transmitted flux constant despite changes in incident intensity due to light source variations. Thus, counters 916 start to count at the same instant that the electro optic modulators 901, 902 and 903 begin to turn on. The outputs of counters 916, as well as the outputs of buffers 912, are input to equality detectors 913. Each counter 916 will continue to count until its value equals the value input to 913 from 912. Then the equality detector will generate a high signal at its output which resets one of the toggles 920 through OR gate 919. Thus, at the proper times, analog gates 922 will be enabled while analog gates 921 will be disabled, the input to operational amplifiers 907, 908 and 909 will be switched to 0, and the electro optic modulators 901, 902 and 903 will begin to turn off. Since the turn-on and turn-off errors of the electro optic modulators have been accounted for in the "count-to" values output by memories 911, exact exposure of the frame will be achieved. Note that each electro optic modulator is turned off independently of the others, and thus separate regulation of the exposure in each of the several spectral bands can be implemented. When all three exposures have been completed, the 3 Q outputs of toggles 920 will be high. This condition switches the output of AND gate 923 high, which serves as an "end of exposure signal". Suitable logic circuits to generate an "error" signal if new data were loaded before the end of the previous exposure could be devised by those normally skilled in the electrical arts. The outputs from 913 remain high until the counters 916 are reset on the next $\phi 1$ clock pulse. When 913 outputs go low they do not toggle 920 again, and thus the system is properly set for the next exposure cycle.

Since the electro optic modulators have finite switching times and since the electro optic modulators are off for most of the time, the system is less efficient than the previous embodiments in terms of utilizing available light for exposure. However, the stroboscopic action of the device minimizes the blurring effect in contact type optical printer caused by slippage of the master roll with respect to the print stock. It is intended that the device be operated with potentiometer 923 supplying the lowest possible voltage that will achieve maximum exposure within the time "window". A neutral density wedge filter, if one is used in the device, is set near to its maximum transmissivity. Under these conditions, the voltage swings from power operational amplifiers 907, 908 and 909 will be minimized, and the electro optic modulators 901, 902 and 903 will switch faster. This will require different numbers in the memories 911, but will increase the accuracy of the device. It should be noted that increasing the minimum OD of the electro optic modulator does not necessarily decrease the range of exposure values because exposure is dependent on both the maximum exposing flux and the exposure time, whose range increases with decreasing maximum transmittance. An important and useful modification of this embodiment is created if the counters 916 are clocked by 3 voltage controlled oscillators rather than by the high frequency clock 917. The voltage control input on the oscillators is driven by the photodetector signal (which also drives operational amplifiers 907, 908 and 909). In that case, since $f\alpha v$ and $v\alpha I$, then $f\alpha I$ (where I is the transmitted light flux. The exposure can be written as $$E = kx \int_0^t f(t)\, dt$$

and the numerical value of this integral is the total number of VCO pulses at time t. In this mode, each counter at any instant contains the total exposure delivered up to that instant if the VCO frequency is linearly related to input voltage. Thus, the switch-on errors (but not the switch-off errors) of the electro optic modulators 901, 902 and 903 can be measured conveniently as part of the count; and these errors do not have to be incorporated in the correction factors loaded in memories 911. A VCO with frequency range of 0.1-100 MHz and linearity of 0.5-1% is sufficient. The design principles for such oscillators from discrete components are well-known in the electrical arts. It should be noted that analog implementations of this circuit principle are possible but they are not preferred because their accuracies are more limited.

A 10 or 20 breakpoint diode-resistor curve simulator, or related circuit could be used to synthesize the desired calibration curves. However, such an approach would be limited to 10 or 20 linear segments, whereas the preferred embodiment is limited only by the amount of memory used. The analog approach would tend to be more costly, requiring precision components, and less stable, being susceptible to temperature drift and aging of components. It also should be noted for the preferred embodiment that accurate exposure does not depend on the running speed of the printer since exposure is delivered to all areas of a frame virtually simultaneously and as a discrete energy packet. This independence presumes, of course, that the running speed of the printer does not exceed a certain maximum value at which the actual exposure time "window" becomes smaller than that needed to deliver E max. through the switching of the electro optic modulators. The principles described above can also be applied to one of the previous embodiments utilizing 4 electro optic modulators. In that case, higher switching speeds can be achieved because each electro optic modulator would only have to switch through a smaller part of its total OD range to achieve the desired maximum transmitted flux. Higher switching speeds result in smaller errors that have to be calibrated out of the system with memories 911.

Many combinations between various principles shown in the present embodiment and previous embodiments are possible. For example, the use of a VCO-counter as an integrating means and the use of addressable memory cells to provide calibration data are both principles easily applicable to previously described embodiments. All such modified embodiments, whether or not explicitly stated herein, are considered to lie within the spirit of this invention.

Figure 12:
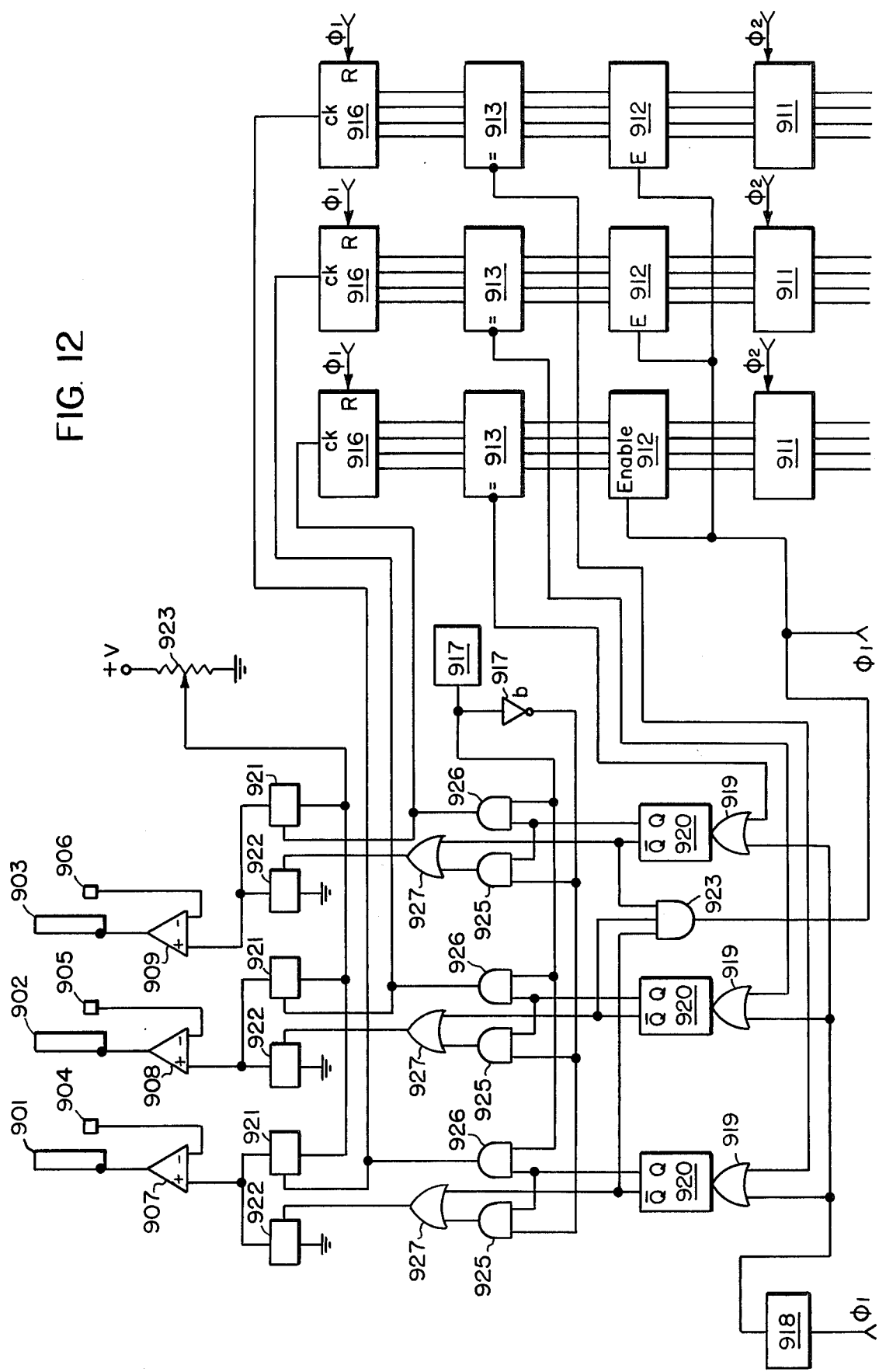

FIG. 12 shows another similar embodiment. Elements 901-924 are as described above in FIG. 11. Note, however, that toggles 920 are now used to activate AND gates 925 and 926 which gate clockpulses and their inverses from high frequency clocks 917 and 917b to the control inputs of analog gates 921 and 922. Thus, whenever toggles 920 are "on", i.e. Q = 1, Q = 0, clock pulses from the clocks switch 921 and 922 on and off in a complementary fashion and the signal to operational amplifiers 907, 908 and 909 alternate between the value adjusted on potentiometer 923 and ground. Thus the electro optic modulators 901, 902 and 903 are switched on and off at the frequency of clock 917 until toggles 920 are clocked off with Q = 0, Q = 1. In that state, analog gates 922 are held permanently "on" through OR gates 927, and the electro optic modulators 901, 902 and 903 are held off. Counters 916 count the clock pulses from gates 926 and thus count the number of "on" cycles of electro optic modulators. In this embodiment, a given exposure is achieved by pulsing the light a given number of times. If the electro optic modulators are of a type that can switch at high frequencies, quite accurate regulation of exposure can be achieved, since a large number of pulses is used to deliver E max. Similarly a pulsed light source could be used in place of the pulsed electro optic modulators.

Figure 13:
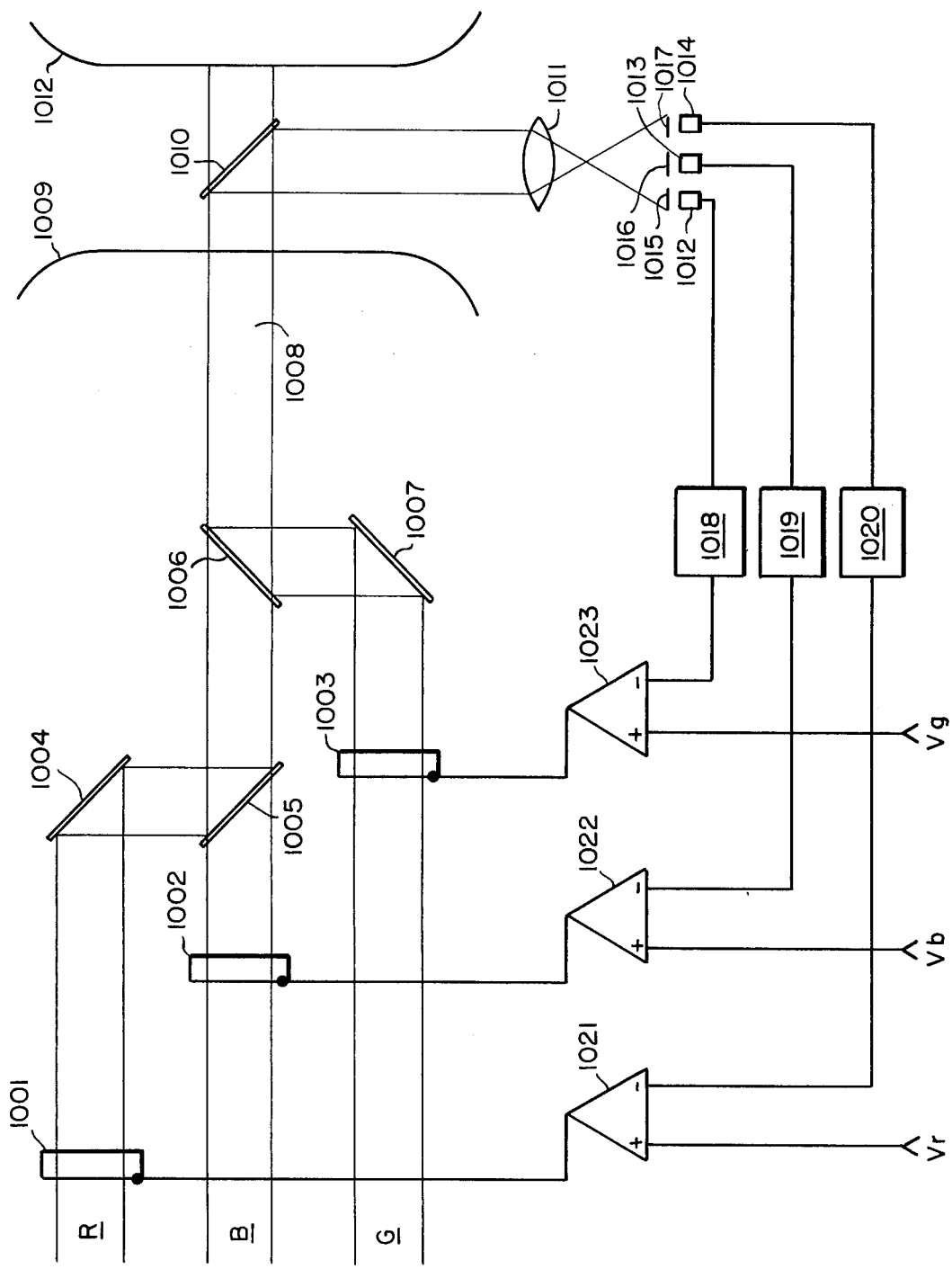

FIG. 13 shows another embodiment of the invention suitable for use with projection printers in which the master image and printing stocks are not in contact with each other, but rather the image on the master roll is optically focused on the print stock. Three electro optic modulators 1001, 1002 and 1003 as described above, are arranged so as to modulate the transmitted intensities of several spectrally separated beams of light. The beams are then combined as described previously and as is well-known in the art using mirrors 1004, 1005, 1006 and 1007 to create a white light beam 1008 for illuminating a frame of a master image roll 1009. The light transmitted by this image is passed through partially a reflective mirror 1010 which reflects a small portion of it to a lens 1011 and transmits most of it to the copy film 1012. Many optical elements can be inserted before the master image and between the master film 1009 and copy film 1012 for the purpose of forming a sharp image on the copy film 1012, and the particular elements are not critical to and do not form part of this invention and need not be shown or described. The light reflected by the mirror 1010 is caused to diverge by lens 1011 and it falls on several photodetectors, 1012, 1013 and 1014, after first passing through color filters 1015, 1016 and 1017 which pass only light flux of the frequencies used to illuminate the electro optic modulators 1001, 1002, and 1003 to which the photodetectors 1012, 1013 and 1014 are wired. The density of the filters 1015, 1016 and 1017 can be adjusted to compensate for variations of photodetector sensitivity to different wavelengths of light. The outputs from the photodetectors 1012–1014 are passed through log convertors 1018, 1019 and 1020 and the logarithmic output values are wired to the inverting inputs of power operational amplifiers 1021, 1022 and 1023. The non-inverting inputs of said operational amplifiers are connected to voltage sources Vr, Vb and Vg, and the outputs of said operational amplifiers are wired to the electrodes of the electro optic modulators 1001–1003. The action of each power operational amplifier 1021–1023 is to adjust its output so that the light striking its associated photodetector will be of correct quantity that, once its electrical equivalent is converted to a logarithmic value by 1018, 1019 or 1020, the voltage generated will equal the voltage input to the non-inverting input. Thus, if the flux incident upon the electro optic modulators 1001–1003 changes, or if the density of the master image in a given spectral band changes, the density of the electro optic modulator for that spectral band will be automatically adjusted so as to maintain the flux at photodetectors 1012, 1013 and 1014, and thus at the copy film, constant. This is equivalent to completely automatic exposure and color balance correction. Of course, the tendency of the system is to adjust the exposure of any frame such that the preponderant density is reproduced as a neutral gray, and likewise for each color. However, offsets for such normalization may be implemented by changing the values of Vr, Vb and Vg.

Clearly, many of the previously described embodiments can be applied to this embodiment, and such hybrid combinations are clearly within the scope of the invention.

Figures 14, 14A:
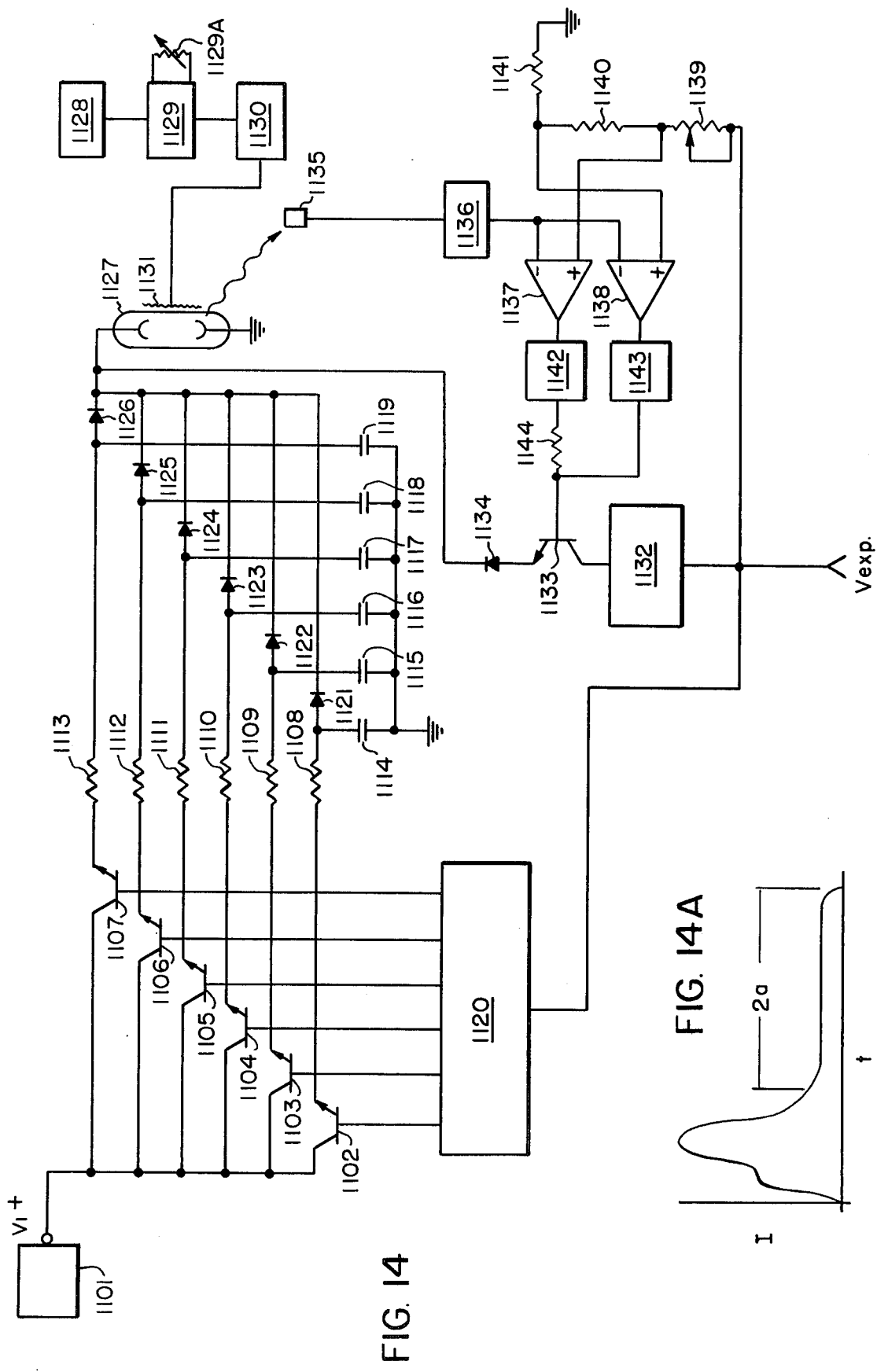
Figure 15:
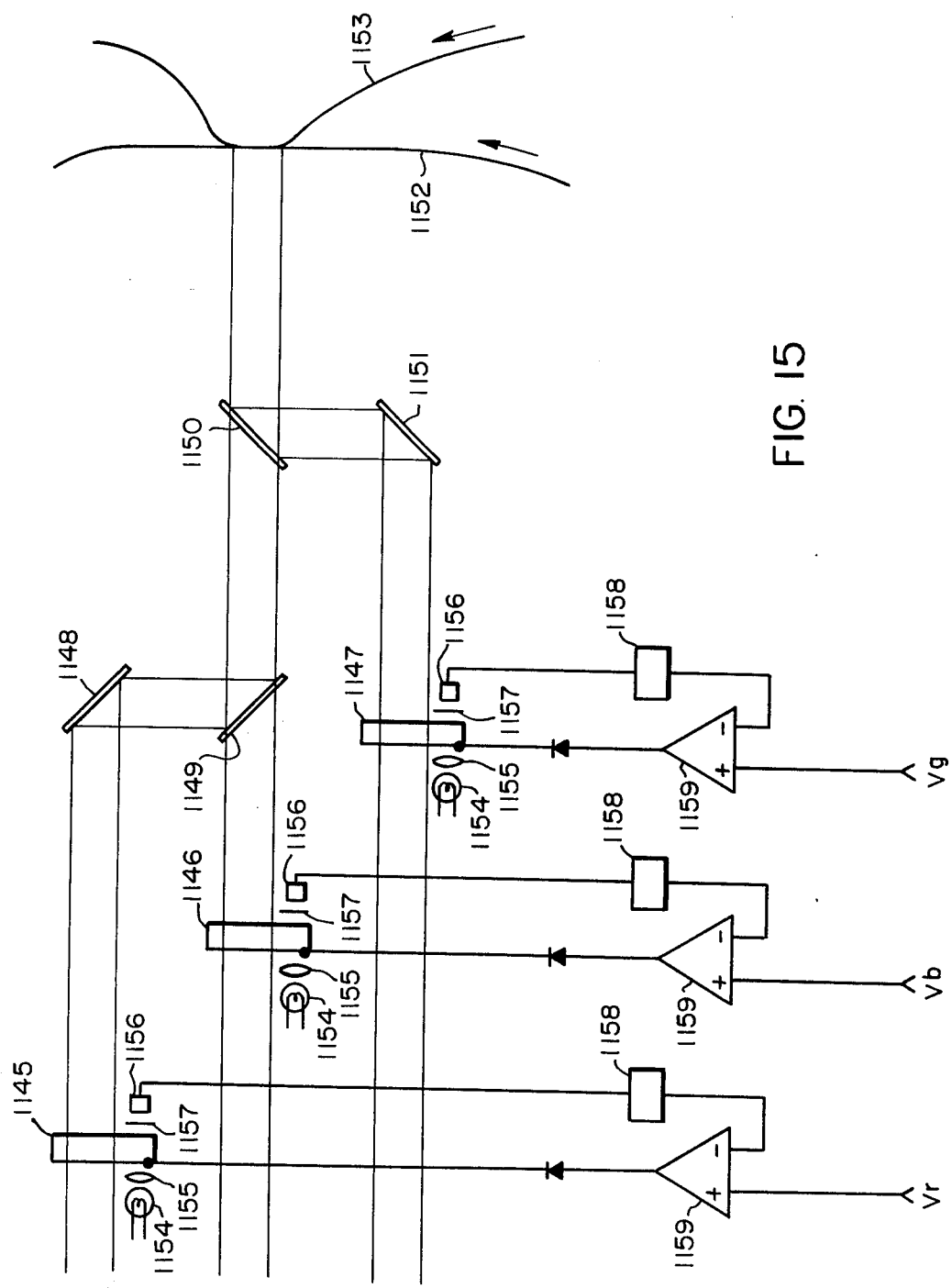

FIGS. 14, 14A and 15 show another embodiment of the invention. This embodiment uses a stroboscopic gaseous discharge tube 1127 to generate the exposing flux.

The amount of light generated by each flash of light from the tube, and the timing of each flash, are controlled by controlling the amount of electrical energy discharged through the tube, and the timing of such discharge. A well-regulated DC power supply 1101 gives high voltage and moderate current at its output $V_1+$. This voltage is connected through transistors 1102–1107 and resistors 1108–1113 to capacitors 1114–1119. Actually, any number of capacitor-resistor-transistor sub-circuits can be used. A control voltage Vexp is input to A-D convertor 1120 which generates a unique combination of high and low logic level voltages on its output lines for each value of Vexp. The code is presumed to be binary weighted. Thus for each value of Vexp, a unique combination of transistors 1102–1107 will be switched "on", and a unique combination of capacitors 1114–1119 will be energized. If the capacitor values are also binary weighted, and if all selected capacitors are fully charged, then the sum energy stored in the capacitors will be directly proportional to the input value of Vexp. The circuit thus described represents, therefore, an energy metering system whose accuracy can be extended to any desired degree by adding more capacitors, resistors, and transistors to the circuit. Capacitor 1114–1119 outputs are summed together through diodes 1121–1126 which are necessary to permit selective charging of the capacitors. The values of resistors 1108–1113 should be selected so that the time constants for charging all the capacitors are equal, and further, so that 5RC is somewhat less than the maximum flash rate at which the strobe tube 1127 will be operated. When a set of capacitors is charged to $V_1+$, the value of $V_1+$ is slightly less than that necessary to ionize the gas in strobe 1127. Thus strobe 1127 will not fire. A sprocket hole detector 1128, such as described above, generates a pulse each time a sprocket is detected. A monostable multivibrator 1129 is a variable delay element whose amount of delay may be adjusted through adjustment of the potentiometer 1129A. A high voltage trigger circuit 1130, upon activation by the delayed pulse from the multivibrator 1129, generates a high voltage pulse. This pulse is applied to strobe 1127 by a trigger electrode 1131, and is of sufficient voltage to ionize the gas within the strobe 1127, thereby rendering it conductive so that capacitors 1114–1119 can discharge through it, creating a flash of light. By varying the delay in the multivibrator 1129 this pulse can be synchronized so that it occurs when a frame of the master image and copy film are properly positioned in an exposure gate. The quantity of light generated will be roughly proportional to the quantity of energy stored in the capacitor bank. Unfortunately, a certain unpredictable, statistical variation in strobe tube efficiency exists. Therefore, although the energy metering system described above can very accurately meter electrical energy to the strobe 1127, the output light energy can vary by as much as 10% or so. To compensate for such variations, an additional, well regulated power supply 1132 is provided, which supply provides large quantities of current at moderate voltages. This current is passed through transistor switch 1133, diode 1134 to the anode of the strobe tube 1127 where it is summed with the energy from the capacitor bank. Presuming for the time being that switch 1133 is conductive, diode 1134 will not allow any current to pass until the voltage in the capacitor bank falls to about 0.6 volts (presuming 1134 is a silicon diode) below the voltage of power supply 1132. However, when the capacitors have discharged almost all their energy through the strobe 1127 and their output voltages fall significantly below the output voltage of the power supply 1132, then current from the power supply 1132 will flow through the diode 1134 and thence thru the flash tube 1127. This will create a trailing edge 2a to the intensity of the flash lamp, as shown in FIG. 14a. The current delivered by power supply 1132 is regulated by the magnitude of Vexp so that the current permitted to flow during the trailing edge is always a fixed fraction of the peak current from the capacitors. Thus the intensity of the trailing light edge will always be some fixed fraction of the peak intensity. Light from strobe 1127 is detected by photodetector 1135 and integrated by integrator 1136. Thus the voltage output by integrator 1136 at a given instant represents the total exposure delivered at that instant since the beginning of the flash. This voltage will always increase during a given flash. This exposure voltage is compared by analog comparator circuits 1137 and 1138. Vexp is passed through resistors 1139, 1140 and 1141 which form a resistive divider that puts about 95% of Vexp into comparator 1138 and about 99.5% into comparator 1137. Thus, when the voltage value of the integral is less than 95% of the desired Vexp, both circuits 1137 and 1138 will be in their positive states and current drivers 1142 and 1143 will supply sufficient base current to switch 1133 to keep it saturated. However, when the integral exceeds 95% of Vexp, comparator 1138 and driver 1143 will turn off. Then the only base current supplied to switch 1133 comes from driver 1142 via resistor 1144. The value of resistor 1144 is selected to supply base current sufficient to keep transistor switch 1133 on but not sufficient to keep it in saturation. When the integral voltage equals 99.5% of Vexp, then comparator 1137 turns off, which turns off transistor switch 1133, and no more light is emitted by strobe 1127. Since switch 1133 is not saturated during this final switch off, current will be switched off quite fast, and accurate exposure regulation is therefore possible. Further, the value of resistor 1139 can be adjusted to calibrate the exposure regulation even more precisely. Integrator 1136 can be reset by means (not shown) when the value of Vexp for the next frame is loaded.

Turning now to FIG. 15, the remainder of the embodiment is shown. Light emitted by flash tube 1127 is resolved by means (not shown) but well-known in the optical art into several collimated spectral band beams. These are passed through electro optic modulators 1145, 1146 and 1147 and recombined to make white light by mirrors 1148-1151. The white light, whose color balance and instensity may be varied by varying the transmissivities of the electro optic modulators 1145, 1146 and 1147 is applied to a master image film 1152—copy film 1153 combination to render exposure of the master image onto the copy film 1153.

Associated with each electro optic modulator 1145, 1146, and 1147 is a small light source 1154 whose color balance is about the same as the master illuminant's (after it has been passed through various color balancing filters as necessary). Light from said small light sources 1154 is focused by lenses 1155 and passed through the electro optic modulators 1145, 1146 and 1147 at a point on their surface removed from the area illuminated by the main illuminant beam. This sub-illumination is detected by photodetectors 1156 which are screened, by filters 1157. The function of these filters has been described above. Presuming that elements 1154, 1155 and 1156 are located at a point on the electro optic modulators 1145, 1146 and 1147 where the OD of the electro optic modulator is the same as for the main illuminant beam, then the photocurrent from the photodetector 1156 is a measure of the transmissivity of the electro optic modulators. Since illuminants 1154 are continuously emitting, the OD of the electro optic modulators 1145, 1146 and 1147 can be continuously monitored and adjusted even though the main illuminant is a pulsed xenon source. It should be noted that the exposure delivered by such a source must be well regulated, since the electro optic modulators will not compensate for undesired variations in exposure. Similarly, the output of supplemental light sources 1154 must be well regulated to prevent unwanted regulations of the main illuminant as the system adjusts for variations in the secondary illuminants. Photodetector signals are connected through log convertors 1158 to the inverting inputs of power operational amplifiers 1159 as described above. Thus, logarithmic regulation of electro optic modulator optical densities, necessary for convenient regulation of exposure and color balance, is achieved. It should be noted that this embodiment can also be operated in a mode in which the light output of the strobe 1127 is regulated to some constant maximum value and the exposure is adjusted as well as the color balance, through variations of the voltages supplied to the non-inverting inputs of operational amplifiers 1159. Such operation is considered to be within the scope of the invention, as is the use of other equivalent circuitry for regulating the maximum exposure value delivered by the strobe 1127. Further, many of the principles given above, such as the use of ideal ramps for exposure regulation, can be readily applied to this embodiment, and such applications are considered to be within the scope of this invention.

Figure 16:
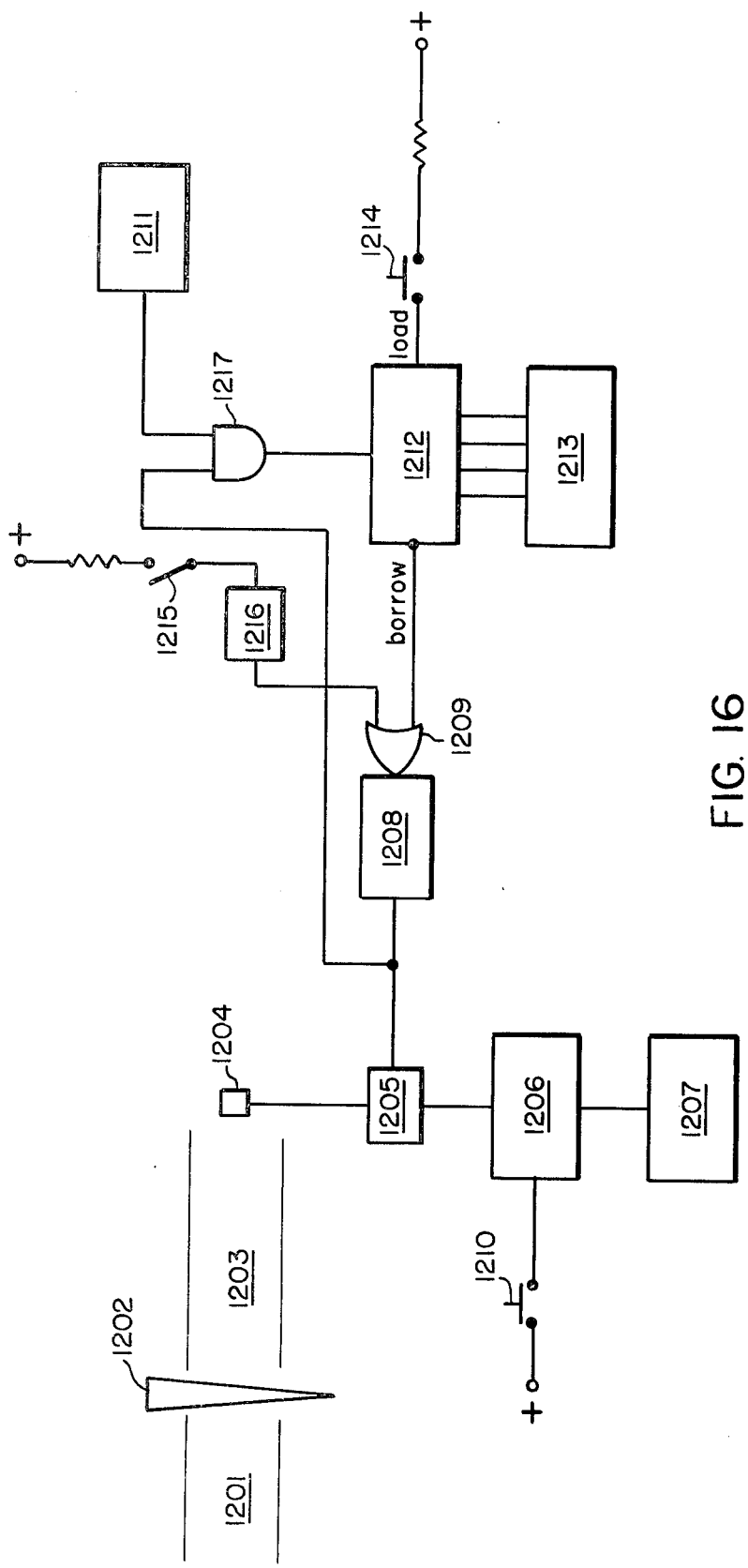

FIG. 16 shows an embodiment of a part of the invention useful for calibrating the overall exposure delivered by the system. It is particularly useful for accurately adjusting the position of the movable neutral density wedge filter, aforementioned, to attenuate the overall exposure delivered by the device into proper range for a given print stock. FIG. 16 shows an incoming light beam 1201 from the illumination control electro optic modulators described in the embodiment above, and focused through a neutral density wedge filter 1202 by optical means (not shown). The emergent beam is similarly recollimated before application to a master image.

A photodetector 1204 is placed in emergent beam 1203 so that it is illuminated by beam 1203. Similarly, a semi-transparent mirror (not shown) could be used to illuminate the photodetector 1204. An analog gate 1205 can be used to switch the output signal of photodetector 1204 into the input of an integrator 1206. Alternately, gate 1205 can be used to disconnect photodetector 1204 from integrator 1206. FIG. 16 shows a readout device 1207 such as a digital display or voltmeter, and a toggling flip flop, 1208 that can be toggled by either input to OR gate 1209. Presume that the output of 1208 is initially in the 0 state so that analog gate 1205 disconnects photodetector 1204 from integrator 1206, and that the initial value of integrator 1206 has been reset to 0 by depressing a reset button 1210. A very accurate high frequency clock 1211 is provided which provides clock pulses to a counter 1212. Counter 1212 is a down counter of the type well known in the electrical arts which generates a high pulse on its borrow output when the count is 0. A digital number generating means 1213 is provided, such as thumbwheels or switches which can be set to produce any desired digital number up to some predetermined maximum. The number preset in means 1213 can be initially loaded into counter 1212 by depressing load button 1214. When switch 1215 is closed, a positive voltage is connected to a rising edge detector 1216, which generates a brief positive pulse. This toggles flip flop 1208 which activates gate 1205 and connects photodetector 1204 to integrator 1206 so that integration can begin. Simultaneously, flip flop 1208's output acitvates AND gate 1217 so that clock pulses are passed to counter 1212, and the down counting begins. When the count in counter 1212 reaches 0, the "borrow" output goes high, which toggles flip flop 1208 and deactivates photodetector 1204 and AND gate 1217 so that no further integration on counting occurs. The mode of operation is that the number dialed on 1213 will represent the duration of exposure at the intended running speed. Since the exposure integral will be taken only during this time period, accurate pulse integrated exposure measurement results.

The invention has been described in detail with particular reference to the preferred embodiments thereof, but it will be understood that variations and modifications can be effected within the spirit and scope of the invention as described hereinabove and as defined in the appended claims.

I claim:

1. An optical printer for making copies of a master film comprising:
   a. means for supporting a master film;
   b. means for supporting a copy film;
   c. a light source;
   d. a printing gate;
   e. means, including said light source for focusing an optical image from a master film supported by said master film supporting means onto a frame of a copy film supported by said copy film supporting means and located in said printing gate, to effect exposure thereof;
   f. electro-optic modulator means disposed in the light beam between said light source and said printing gate for controlling the exposure of a copy film, the light transmitted by said modulator means being a function of the electrical energy applied thereto; and
   g. electric circuit means connected to said modulator means for controlling the electrical energy applied to said modulator means, and wherein the light transmitted by said modulator means is a function of the electric field strength applied thereto, and said electric circuit means controls the voltage applied across said modulator means, and
   h. said modulator means comprising a PLZT electro-optic ceramic.

2. The optical printer according to claim 1 wherein said modulator means includes a pair of transparent electrodes, one on each side of said PLZT ceramic, and wherein said electric circuit means includes means for applying a voltage across said electrodes.

3. The optical printer according to claim 2 wherein said modulator means is a flat plate of uniform thickness extending transverse to said light beam and positioned in the entire area of said beam.

4. An optical printer for making copies of a master film comprising:
   a. means for supporting a master film;
   b. means for supporting a copy film;
   c. a light source;
   d. a printing gate;
   e. means, including said light source, for focusing an optical image from a master film supported by said master film supporting means onto a frame of a copy film supported by said copy film supporting means and located in said printing gate, to effect exposure thereof;
   f. electro-optic modulator means comprising a PLZT ceramic disposed in the light beam between said light source and said printing gate for controlling the exposure of a copy film, the light transmitted by said modulator means being a function of the electrical energy applied thereto;
   g. electric circuit means connected to said modulator means for controlling the electrical energy applied to said modulator means; and
   h. wherein said master film and said copy film are motion picture films and including means for moving said master film and said copy film together in synchronization.

5. The optical printer according to claim 4 including means for holding a master film and a copy film in intimate contact with each other in said printing gate for contact exposure of a copy film.

6. The optical printer according to claim 4 including means for holding a master film and a copy film spaced apart from each other and for projecting exposing a copy film.

7. An optical printer for making copies of a master film comprising:
   a. means for supporting a master film;
   b. means for supporting a copy film;
   c. a light source;
   d. a printing gate;
   e. means, including said light source, for focusing an optical image from a master film supported by said master film supporting means onto a frame of a copy film supported by said copy film supporting means and located in said printing gate, to effect exposure thereof;
   f. electro-optic modulator means comprising a PLZT ceramic disposed in the light beam between said light source and said printing gate for controlling the exposure of a copy film, the light transmitted by said modulator means being a function of the electrical energy applied thereto;

g. electric circuit means connected to said modulator means for controlling the electrical energy applied to said modulator means; and h. wherein said circuit means includes means for measuring the amount of light transmitted by said modulator means.

8. An optical printer for making copies of a master film comprising:
   a. means for supporting a master film;
   b. means for supporting a copy film;
   c. a light source;
   d. a printing gate;
   e. means, including said light source, for focusing an optical image from a master film supported by said master film supporting means onto a frame of a copy film supported by said copy film supporting means and located in said printing gate, to effect exposure thereof;
   f. electro-optic modulator means disposed in the light beam between said light source and said printing gate for controlling the exposure of a copy film, the light transmitted by said modulator means being a function of the electrical energy applied thereto;
   g. electric circuit means connected to said modulator means for controlling the electrical energy applied to said modulator means; and
   h. wherein said circuit means includes means for measuring the amount of light transmitted by said modulator means, said measuring means including means for generating a first electric signal proportional to the amount of light transmitted by said modulator means, means for generating a second electric signal corresponding to the amount of light desired to be passed through said modulator means, means for comparing said first and second electric signals, and means for varying the electric energy applied to said modulator means so as to greatly minimize the difference between said signals.

9. An optical printer for making copies of a master film comprising:
   a. means for supporting a master film;
   b. means for supporting a copy film;
   c. a light source;
   d. a printing gate;
   e. means, including said light source, for focusing an optical image from a master film supported by said master film supporting means onto a frame of a copy film supported by said copy film supporting means and located in said printing gate, to effect exposure thereof;
   f. electro-optic modulator means disposed in the light beam between said light source and said printing gate for controlling the exposure of a copy film, the light transmitted by said modulator means being a function of the electrical energy applied thereto;
   g. electric circuit means connected to said modulator means for controlling the electrical energy applied to said modulator means; and
   h. wherein said electric circuit means includes a feed back loop including said modulator means for accurately and conveniently modulating exposure intensity, said feed back loop comprising:
      1. a photodetector positioned on the opposite side of said modulator means from said light source for receiving a portion of the light transmitted by said modulator means and for creating a first electric signal proportional to the quantity of the light striking said photodetector;
      2. means for generating a second electrical reference signal;
      3. error detecting means for measuring the difference between said first and second signals; and
      4. electric drive means connected to said modulator means and to said error detecting means for applying electrical energy to said modulator means so as to greatly minimize the difference between said first and second signals.

10. The optical printer according to claim 9 wherein said error detecting means includes means for inverting the sense of the difference between said signals.

11. The optical printer according to claim 10 wherein an operational amplifier comprises said sense inversion means and error amplifying means.

12. The optical printer according to claim 9 wherein said means for generating a reference signal includes means for varying said reference signal.

13. The optical printer according to claim 9 including logarithmic conversion means between said photodetector and said error detection means.

14. The optical printer according to claim 9 including anilog conversion means between said error detection means and said means for generating a reference signal.

15. An optical printer for making copies of a master film comprising:
   a. means for supporting a master film;
   b. means for supporting a copy film;
   c. a light source;
   d. a printing gate;
   e. means, including said light source, for focusing an optical image from a master film supported by said master film supporting means onto a frame of a copy film supported by said copy film supporting means and located in said printing gate, to effect exposure thereof;
   f. electro-optic modulator means disposed in the light beam between said light source and said printing gate for controlling the exposure of a copy film, the light transmitted by said modulator means being a function of the electrical energy applied thereto;
   g. electric circuit means connected to said modulator means for controlling the electrical energy applied to said modulator means; and
   h. including means in the light beam between said light source and a copy film for separating said light beam into a plurality of different color light beams, means for recombining said plurality of separate light beams between said separating means and a copy film, said modulator means including a separate electro optic light modulating means in each of said different light beams between said separating means and said recombining means, and wherein said circuit means includes means for independently controlling the electrical energy applied to said separate modulator means for indepentently varying the intensity of each of said different light beams.

16. The optical printer according to claim 15 wherein said separating and recombining means includes a plurality of mirrors and dichroic mirrors for separating said beam into a plurality of separate beams.

17. The optical printer according to claim 16 wherein said plurality of beams include cyan, magenta and yellow light beams.

18. The optical printer according to claim 16 wherein said plurality of separate beams include the red, green and blue spectral regions of light.

19. The optical printer according to claim 15 wherein said electric circuit means includes a separate electric circuit means for each of said separate modulator means.

20. The optical printer according to claim 19 wherein each of said separate circuit means includes a feed back loop including electrical energy to said modulator means so as to greatly minimize the difference between said signals:
  a. a photodetector positioned for receiving a portion of the light transmitted by the respective modulator means and for creating a first electric signal proportional to the quantity of light striking the photodetector;
  b. means for generating a second electric reference signal;
  c. error detecting means connected to said reference signal generating means and to said photodetector for measuring the difference between said first and second signals;
  d. electrical drive means connected to said modulator means and to said error detecting means for applying electrical energy to said modulator means in proportion to the detected difference between said signals.

21. The optical printer according to claim 20 wherein said error detecting means includes means for inverting the sense of the difference between said signals.

22. The optical printer according to claim 20 wherein said error detecting means and electrical drive means is an operational amplifier.

23. The optical printer according to claim 20 wherein said means for generating a reference signal includes means for varying said reference signal.

24. The optical printer according to claim 20 including logarithmic conversion means between said photodetector and said error detection means.

25. The optical printer according to claim 20 including anilog conversion means between said error detection means and said means for generating an electrical reference signal.

26. The optical printer according to claim 20 wherein said separating and recombining means includes a plurality of mirrors and dichroic mirrors for separating said beam into three separate beams.

27. The optical printer according to claim 26 wherein said plurality of separate beams include the red, green and blue spectral regions of light.

28. The optical printer according to claim 20 wherein the light transmitted by said modulator means is a function of the electric field strength applied thereto, and said electric circuit means controls the voltage applied across said modulator means.

29. The optical printer according to claim 28 wherein said modulator means comprises a PLZT electro-optic ceramic with polarization means.

30. The optical printer according to claim 29 wherein said modulator means includes a pair of transparent electrodes, one on each side of said PLZT ceramic, and wherein said electric circuit means includes means for applying a voltage across said electrodes.

31. The optical printer according to claim 30 wherein said modulator means is a flat plate of uniform thickness extending transverse to said light beam and positioned in the entire area of said beam.

32. The optical printer according to claim 31 wherein said master film and said copy film are movie films and including means for moving said master film and said copy film together through said printing gate.

33. The optical printer according to claim 32 including means for holding a master film and a copy film in intimate contact with each other in said printing gate for contact exposure of a copy film.

34. The optical printer according to claim 33 wherein said separating and recombining means includes a plurality of mirrors and dichroic mirrors for separating said beam into three separate beams.

35. The optical printer according to claim 34 wherein said three separate beams correspond to the red, green and blue spectral regions of light.

36. The optical printer according to claim 34 wherein said three separate beams correspond to the cyan, magenta and yellow spectral regions of light.

37. The optical printer according to claim 34 wherein said means for generating a reference signal includes means for varying said reference signal.

38. The optical printer according to claim 37 including logarithmic conversion means between said photodetector and said error detection means.

39. The optical printer according to claim 38 wherein said error detecting means includes means for inverting the sense of the difference between said signals.

40. The optical printer according to claim 39 including a fourth modulator means disposed in the recombined light beam between said recombining means and a copy film, and wherein said electric circuit means includes means for separately applying electric energy to said fourth modulator means.

41. The optical printer, according to claim 40 wherein said means for generating a reference signal includes means for electrically summing at least two electrical signals.

42. The optical printer according to claim 41 including means for varying at least one of said reference signals.

43. The optical printer according to claim 42 including means for maintaining the modulators in a non-light transmitting condition and for switching the modulators to a light-transmitting condition for a period of time sufficient to allow a copy film to receive the desired amount of exposure and for then switching the modulators back to said non-light-transmitting condition again.

44. The optical printer according to claim 20 including a fourth modulator means disposed in the recombined light beam between said recombining means and a copy film, and wherein said electric circuit means includes means for separately applying electric energy to said fourth modulator means.

45. The optical printer according to claim 20 wherein said means for generating a reference signal includes means for electrically summing at least two electrical signals.

46. The optical printer according to claim 20 including means for varying at least one of said reference signals.

47. The optical printer according to claim 20 including means for maintaining the modulators in a non-light-transmitting condition and for switching the modulators to a light-transmitting condition for a period of time sufficient to allow a copy film to receive the desired amount of exposure and for then switching the modulators back to said non-light-transmitting condition again.

48. An optical printer for making copies of a master film comprising:
  a. means for supporting a master film;

b. means for supporting a copy film;
c. a light source;
d. a printing gate;
e. means, including said light source, for focusing an optical image from a master film supported by said master film supporting means onto a frame of a copy film supported by said copy film supporting means and located in said printing gate, to effect exposure thereof;
f. electro-optic modulator means comprising a PLZT ceramic disposed in the light beam between said light source and said printing gate for controlling the exposure of a copy film, the light transmitted by said modulator means being a function of the electrical energy applied thereto;
g. electric circuit means connected to said modulator means for controlling the electrical energy applied to said modulator means; and
h. including means for maintaining the modulators in a non-light-transmitting condition and for switching the modulators to a light-transmitting condition for a period of time sufficient to allow a copy film to receive the desired amount of exposure and for then switching the modulators back to said non-light-transmitting condition again.

49. An optical printer for making copies of a master movie film comprising:
a. means for supporting a master movie film;
b. means for supporting a copy movie film;
c. a stroboscopic gaseous discharge tube light source;
d. a printing gate;
e. means, including said light source, for focusing an optical image from a master movie film supported by said master film supporting means onto a frame of a copy movie film supported by said copy film supporting means and located in said printing gate to effect exposure thereof and;
f. means for firing said light source and for generating a controlled quantity of light while a copy film frame is continuously moving in said printing gate synchronously with said master movie film.

50. An optical printer for making copies of a master film comprising:
a. means for supporting a master film;
b. means for supporting a copy film;
c. a stroboscopic gaseous discharge tube light source;
d. a printing gate;
e. means, including said light source, for focusing an optical image from a master film supported by said master film supporting means onto a frame of a copy film supported by said copy film supporting means and located in said printing gate to effect exposure thereof;
f. means for firing said light source and for generating a controlled quantity of light while a copy film frame is in said printing gate to effect the controlled exposure thereof, and
g. including means for moving a master film and a copy film together for sequentially copying all frames of a master film onto a copy film, and wherein said firing means includes means for firing said light source once for each frame of a master film when a corresponding frame of a copy film is in said printing gate.

51. An optical printer for making copies of a master film comprising:
a. means for supporting a master film;
b. means for supporting a copy film;
c. a stroboscopic gaseous discharge tube light source;
d. a printing gate;
e. means, including said light source, for focusing an optical image from a master film supported by said master film supporting means onto a frame of a copy film supported by said copy film supporting means and located in said printing gate to effect exposure thereof;
f. means for firing said light source and for generating a controlled quantity of light while a copy film frame is in said printing gate to effect the controlled exposure thereof, and
g. wherein said films are movie films and including means for moving said films and including a sprocket hole detector for generating an electrical pulse each time a sprocket hole is detected and for triggering said firing means to fire whereby said light source fires when a copy film frame is correctly positioned in said frame gate.

52. An optical printer for making copies of a master film comprising:
a. means for supporting a master film;
b. means for supporting a copy film;
c. a stroboscopic gaseous discharge tube light source;
d. a printing gate;
e. means, including said light source, for focusing an optical image from a master film supported by said master film supporting means onto a frame of a copy film supported by said copy film supporting means and located in said printing gate to effect exposure thereof;
f. means for firing said light source and for generating a controlled quantity of light while a copy film frame is in said printing gate to effect the controlled exposure thereof; and
g. wherein said firing means includes a capacitor bank and means for discharging said capacitor bank through said tube.

53. An optical printer for making copies of a master film comprising:
a. means for supporting a master film;
b. means for supporting a copy film;
c. a stroboscopic gaseous discharge tube light source;
d. a printing gate;
e. means, including said light source, for focusing an optical image from a master film supported by said master film supporting means onto a frame of a copy film supported by said copy film supporting means and located in said printing gate to effect exposure thereof;
f. means for firing said light source and for generating a controlled quantity of light while a copy film frame is in said printing gate to effect the controlled exposure thereof; and
g. wherein said firing means includes means for varying the amount of electrical energy discharged through said tube.

54. An optical printer for making copies of a master film comprising:
a. means for supporting a master film;
b. means for supporting a copy film;
c. a stroboscopic gaseous discharge tube light source;
d. a printing gate;
e. means, including said light source, for focusing an optical image from a master film supported by said master film supporting means onto a frame of a copy film supported by said copy film supporting means and located in said printing gate to effect exposure thereof;

f. means for firing said light source and for generating a controlled quantity of light while a copy film frame is in said printing gate to effect the controlled exposure thereof; and g. including electro optic modulator means in the light beam between said light source and said printing gate and means for controlling the electrical energy applied to said modulator means for controlling the exposure of a copy film.

55. The optical printer according to claim 54 wherein said controlling means includes an additional light source on one side of said modulator means and a photodetector on the other side of said modulator means for receiving illumination from said additional light source, and electric circuit means connected to said photodetector for continuously adjusting the transmissivity of the modulator means by controlling the electrical energy applied thereto, even though the primary light source is a units pulsed light.

56. An optical printer for making copies of a master film comprising;
a. means for supporting a master film;
b. means for supporting a copy film;
c. a stroboscopic gaseous discharge tube light source;
d. a printing gate;
e. means, including said light source, for focusing an optical image from a master film supported by said master film supporting means onto a frame of a copy film supported by said copy film supporting means and located in said printing gate to effect exposure thereof;
f. means for firing said light source and for generating a controlled quantity of light while a copy film frame is in said printing gate to effect the controlled exposure thereof; and
g. wherein said tube is a pulsed Xenon light source.

57. The optical printer according to claim 24 including circuit means for accepting four electric control signals for controlling the transmissivities of the electro-optic modulators and for producing three electric drive outputs for driving the electro-optic modulators, said electric control signals including three color balance control signals and one exposure control signal; said further circuit means including means for generating said driving signals from said electric control signals such that color balance is independent of the setting of said exposure control signal, and exposure is independent of said color balance control signals.

58. The optical printer according to claim 57 in which said further circuit means includes means for directly relating said control signals to the desired output fluxes.

59. The optical printer according to claim 58 in which said further circuit means includes means for directly relating said electric exposure and color balance electric control signals to the optical densities of the color layers of said master image which is to be exposed, and means for generating said electric drive signals to automatically achieve proper overall exposure and color balance of the copy material from said master image.

60. The optical printer according to claim 59 in which said further circuit means includes means for accepting a fifth electric input control signal to regulate "fading" of a sequence of copy images from black to some exposure predetermined by said electric exposure control signal, and for generating said electric drive signals to produce logarithmic fades from linear changes in said fifth electric input control signal, said fades being independent of said color balance control and exposure control signals.

61. The optical printer according to claim 60 wherein said further circuit means includes means for automatically producing proper exposure of said copy material from said master image film solely from said color balance electric control signals.

62. An optical printer for making copies of a master film comprising:
a. means for supporting a master film;
b. means for supporting a copy film;
c. a light source;
d. a printing gate;
e. means, including said light source, for focusing an optical image from a master film supported by said master film supporting means onto a frame of a copy film supported by said copy film supporting means and located in said printing gate, to effect exposure thereof;
f. means for dividing the output of said light source into a plurality of color beams;
g. a plurality of electro-optic modulator means disposed in the plurality of said color beams for effecting regulation of the transmitted intensity of said plurality of color beams through application of suitable electric drive signals to said modulators;
h. means for re-combining the plurality of color light beams into a single "white" beam; and
i. an additional electro-optic modulator disposed in said recombined "white" beam to effect regulation of the transmitted intensity of said white beam through application of a suitable electric drive signal to said additional modulator.

63. The optical printer according to claim 62 including:
a. a plurality of photo detectors disposed one each in said plurality of color beams downstream from said plurality of electro optic modulators, said photodetectors producing electric signals related to the amount of light transmitted by said plurality of electro-optic modulators, and
b. two additional photodetectors disposed in said "white" recombined beam such that one of said additional photodetectors is struck by said white beam before it passes through said additional electro-optic modulators, and the other of said additional photodetector is struck by the "white" beam transmitted by said additional electro-optic modulator; said two additional photodetectors producing electric signals perportional to the amount of light impinging thereon.

64. The optical printer according to claim 63 including additional electric circuit means for monitoring said photodetector electric signals and producing appropriate electric drive signals for said electro-optic modulators such that the light intensities transmitted by said electro-optic modulators are automatically regulated to be equal to variable reference electric exposure and color balance signals input to said additional electric circuit means.

65. The optical printer according to claim 64 wherein said additional electric circuit means includes electronic logarithmic conversion means for converting the electric signals from said photodetectors into logarithmic form.

66. The optical printer according to claim 65 including further circuit means to accept a plurality of electric control signals whose number equals the number of said plurality of said light beams, and an additional electric control signal, said electric control signals representing the desired color balance and exposure to be output from said additional electro-optic modulator, and said further circuit means including means for generating electric drive signals for said electro-optic modulators so as to create said desired color balance and exposure corrected beam output from said additional electro-optic modulator.

67. The optical printer according to claim 66 including still further electric circuit means for generating said electric drive signals from said electric control inputs such that the color balance of said output beam is independent of the value of said electric exposure control signal, and such that the total exposure produced by said output beam is independent of said plurality of electric color balance control signals.

68. The optical printer according to claim 67 wherein said still further circuit means includes means for directly relating said electric color balance control signals to the desired color balance.

69. The optical printer according to claim 68 wherein said still further circuit means includes means for directly relating said electric color balance control signals to the desired color balance by setting said electric color balance control signals equal to the densities of the layers of the master image for which color correction is desired.

70. The optical printer according to claim 66 in which said additional circuit means includes means for accepting a fifth electric input control signal to regulate "fading" of a sequence of copy images from black to some exposure predetermined by said electric exposure control signal, and for generating said electric drive signals to produce logarithmic fades from linear changes in said fifth electric input control signal, said fades being independent of said color balance control and exposure control signals.

71. The optical printer according to claim 65 including logarithmic ratio computing means connected so as to compute the logarithmic ratio between the electric signals of said two additional photodetectors and therefore of the optical density of said additional electro-optic modulator.

72. The optical printer according to claim 71 including further electric circuit means for creating the desired color corrected and exposure corrected output beam by setting the calibrated electric color control signals equal to the densities of the layers of the master image to be printed.

73. The optical printer according to claim 63 including a plurality of photodetectors corresponding in number to the plurality of said color beams, one each of said photodetectors being disposed in one each of the light paths downstream from said additional electro-optic modulator, including a plurality of color band-pass filters corresponding in number and band-pass characteristics to the number and light composition of said plurality of color beams, said filters being disposed one each immediately upstream of said plurality of photodetectors so as to render each of said photodetectors responsive to the intensity of only one of said color beams, and further including an additional photodetector disposed in a recombined beam upstream of said additional electro-optic modulator.

74. The optical printer according to claim 73 including additional circuit means for accepting a plurality of electric color control input signals and an electric exposure control input signal, and for generating therefrom a plurality of suitable electric electro-optic modulator drive signals, and for regulating the electro-optic modulator densities such as to cause them to add, thus providing light intensity control over a broad range of light intensity outputs.

75. The optical printer according to claim 74 including still further electric circuit means for generating said electric drive signals from said electric control inputs such that the color balance of said output beam is independent of the value of said electric exposure control signal, and such that the total exposure produced by said output beam is independent of said plurality of electric color balance control signals.

76. The optical printer according to claim 75 wherein said still further circuit means includes means for directly relating said electric color balance control signals to the desired color balance.

77. The optical printer according to claim 76 wherein said still further circuit means includes means for directly relating said electric color balance control signals to the desired color balance by setting said electric color balance control signals equal to the densities of the layers of the master image for which color correction is desired.

78. The optical printer according to claim 74 in which said additional circuit means includes means for accepting a fifth electric input control signal to regulate "fading" of a sequence of copy images from black to some exposure predetermined by said electric exposure control signal, and for generating said electric drive signals to produce logarithmic fades from linear changes in said fifth electric input control signal, said fades being independent of said color balance control and exposure control signals.

79. An optical printer for making copies of a master film comprising:
   a. means for supporting a master film;
   b. means for supporting a copy film;
   c. a light source;
   d. a printing gate;
   e. means, including said light source for focusing an optical image from a master film supported by said master film supporting means onto a frame of a copy film supported by said copy film supporting means and located in said printing gate, to effect exposure thereof.
   f. electro-optic modulator means disposed in the light beam between said light source and said printing gate for controlling the exposure of a copy film, the light transmitted by said modulator means being a function of the electrical energy applied thereto;
   g. electric circuit means connected to said modulator means for controlling the electrical energy applied to said modulator means; and
   h. additional circuit means for measuring the speed of motion of the master and copy films past the exposure gate and the exposure time, and further including electrical means for automatically and dynamically correcting the density of the electro-optic modulator means to maintain constant exposure when exposure time varies.

80. An optical printer for making copies of a master film comprising:
   a. means for supporting a master film;
   b. means for supporting a copy film;
   c. a light source;

d. a printing gate;
e. means, including said light source for focusing an optical image from a master film supported by said master film supporting means onto a frame of a copy film supported by said copy film supporting means and located in said printing gate, to effect exposure thereof;
f. electro-optic modulator means disposed in the light beam between said light source and said printing gate for controlling the exposure of a copy film, the light transmitted by said modulator means being a function of the electrical energy applied thereto;
g. electric circuit means connected to said modulator means for controlling the electrical energy applied to said modulator means; and
h. means for measuring the speed of movement of the master and copy films past the printing gate, means for computing the exposure at various printing speeds, and means for dynamically adjusting the density of said electro-optic modulator means so as to effect the desired exposure independently of the speed of movement of the master and copy films.

81. An optical printer for making copies of a master film comprising:
a. means for supporting a master film;
b. means for supporting a copy film;
c. a light source;
d. a printing gate;
e. means, including said light source for focusing an optical image from a master film supported by said master film supporting means onto a frame of a copy film supported by said copy film supporting means and located in said printing gate, to effect exposure thereof;
f. electro-optic modulator means disposed in the light beam between said light source and said printing gate for controlling the exposure of a copy film, the light transmitted by said modulator means being a function of the electrical energy applied thereto;
g. electric circuit means connected to said modulator means for controlling the electrical energy applied to said modulator means; and
h. additional circuit means for detecting the presence of a properly positioned frame in the printing gate independently of the speed of movement of the master and copy films and circuit means for generating an electric ramp signal whose instantaneous value is equivalent to the maximum deliverable exposure at that instant independent of the running speed, means for scaling said electric ramp to represent the desired exposure instant by instant, means for measuring the actual delivered exposure instant by instant as it is delivered, and means for dynamically and automatically adjusting the density of said electro-optic modulator means such that the said actual delivered exposure is made to follow said scaled electric ramp representing the desired exposure.

82. The optical printer according to claim 81 including further circuit means for generating a plurality of said scaled ramps for each frame being exposed, means for measuring said actual delivered exposure in time intervals precisely corresponding to the time intervals of said scaled ramps, and means for automatically and dynamically adjusting the density of said electro-optic modulator means such that said actual delivered exposure is made to follow the exposure specified by said scaled ramps.

83. An optical printer for making copies of a master film comprising:
a. means for supporting a master film;
b. means for supporting a copy film
c. a light source;
d. a printing gate;
e. means, including said light source for focusing an optical image from a master film supported by said master film supporting means onto a frame of a copy film supported by said copy film supporting means and located in said printing gate, to effect exposure thereof;
f. electro-optic modulator means disposed in the light beam between said light source and said printing gate for controlling the exposure of a copy film, the light transmitted by said modulator means being a function of the electrical energy applied thereto;
g. electric circuit means connected to said modulator means for controlling the electrical energy applied to said modulator means; and
h. means for measuring the density of the layers of a reference frame, means for computing therefrom the correct electric color balance and exposure control signals, and means for automatically applying said computed signals to said electric electro-optic modulator drive signal generating means so as to effect correct exposure of a master image associated with said reference frame.

84. The optical printer according to claim 83 including additional means for accepting externally specified electric exposure and color control signals, and creating modified color control and exposure signals representing an offset from "normal" conditions, and for applying said modified signals in a manner producing the desired exposure and color balance off set as specified by said externally specified electric exposure and color balance signals.

85. The optical printer according to claim 84 wherein said accepting means includes means for accepting said externally specified electric signals in digital form.

86. The optical printer according to claim 83 including additional circuit means for accepting electrical function control signals which modify the functioning of said printer with respect to its light handling, density measuring, and exposure computing functions.

87. The optical printer according to claim 83 including additional means for detecting the entering of said reference frame into said printing gate and for automatically adjusting the density of said electro-optic modulator means so as to prevent exposure of said reference frame onto said copy film.

88. The optical printer according to claim 87 wherein said additional means comprises one of a digital and analog interface circuit connected to an external source of information.

89. The optical printer according to claim 20 including additional circuit means for specifying electric exposure and color control signals as a series of digitally represented numbers.

90. The optical printer according to claim 89 including additional circuit means for causing said digital number series to serve as a set of addresses to memory locations containing exposure and color balance data, and means for retrieving the data in said memory locations, and means for rising said data for regulating exposure and color balance rather than said digital number series.

91. The optical printer according to claim 90 wherein said data utilization means comprises a high frequency clock, counters clocked by said clock, and equality comparators, the outputs of which equality comparators are used to turn off exposure of given colors by applying appropriate control signals to said electro-optic modulators when the counters have counted to the identical numbers represented by said retrieved exposure or color control data, said electro-optic modulators being turned on by appropriate control signals at the beginning of exposure when said counters have been reset, and said clock being applied to said counters at the instant said electro-optic modulators are first turned on.

92. The optical printer according to claim 90 including additional means for automatically measuring and calibrating the responses of the electro-optic modulators and for entering appropriate data in appropriate memory cells of said memory locations.

93. The optical printer according to claim 20 wherein said electro-optic modulator means are capable of very high speed operation including additional circuit means for specifying electric exposure and color control signals as a series of digitally represented numbers, and including additional circuit means for rapidly turning on and off said high-speed electro-optic modulators by the application of a suitable control signal thereto a number of times equal to the number contained as exposure or color balance data in said memory storage means.

94. The optical printer according to claim 20 wherein said electro-optic modulator means are capable of very high speed operation including additional circuit means for causing said digital number series to serve as a set of addresses to memory locations containing exposure and color balance data, and means for retreiving the data in said memory locations, means for using said data for regulating exposure and color balance rather than said digital number series, and including additional circuit means for rapidly turning on and off said high-speed electro-optic modulators by the application of a suitable control signal thereto a number of times equal to the number contained as exposure or color balance data in said memory storage means.

95. The optical printer according to claim 20 wherein said electro-optic modulator means are capable of very high speed operation wherein said data utilization means comprises a high frequency clock, counters clocked by said clock, and equality comparators the outputs of which equality comparators are used to turn off exposure of given colors by applying appropriate control signals to said electro-optic modulators when the counters have counted to the identical numbers represented by said retreived exposure or color control data, said electro-optic modulators being turned on by appropriate control signals at the beginning of exposure when said counters have been reset and said clock being applied to said counters at the instant said electro-optic modulators are first turned on, and including additional circuit means for rapidly turning on and off said high-speed electro-optic modulators by the application of a suitable control signal thereto a number of times equal to the number contained as exposure or color balance data in said memory storage means.

96. The optical printer according to claim 20 wherein said electro-optic modulator means are capable of very high speed operation including additional means for automatically measuring and calibrating the responses of the electro-optic modulators and for entering appropriate data in appropriate memory cells of said memory locations, and including additional circuit means for rapidly turning on and off said high-speed electro-optic modulators by the application of a suitable control signal thereto a number of times equal to the number contained as exposure or color balance data in said memory storage means.

97. The optical printer according to claim 15 wherein said master and copy films are physically separated and exposure is effected to transfer images from said master film to said copy film, and including a mirror for capturing a portion of the light transferring the image between the master and copy films and for reflecting it onto a plurality of photodetectors forming a portion of said electric circuit means.

98. An optical printer for making copies of a master film comprising:
 a. means for supporting a master film;
 b. means for supporting a copy film;
 c. a light source;
 d. a printing gate;
 e. means, including said light source for focusing an optical image from a master film supported by said master film supporting means onto a frame of a copy film supported by said copy film supporting means and located in said printing gate, to effect exposure thereof;
 f. electro-optic modulator means disposed in the light beam between said light source and said printing gate for controlling the exposure of a copy film, the light transmitted by said modulator means being a function of the electrical energy applied thereto;
 g. electric circuit means connected to said modulator means for controlling the electrical energy applied to said modulator means; and
 h. means for accurately producing a timed signal variation corresponding to the frame rate of the printer, photodetector means for producing a voltage proportional to incident illumination, means for inserting and removing said photodetector into the output light beam of said printer, means for integrating a signal from said photodetector, means, controlled by said timed signal variation, to switch the output of said photodetector into said integrator for a time period corresponding to said frame rate, and means for reading out the results of such timed integration to provide delivered exposure data useful for calibrating said printer, means for resetting said integrator so that multiple readings may be taken in sequence, and means for attenuating the output of said printer so that accurate calibration of its delivered exposure can be effected.

99. An optical printer for making copies of a master film comprising:
 a. means for supporting a master film
 b. means for supporting a copy film;
 c. a light source;
 d. a printing gate;
 e. means, including said light source for focusing an optical image from a master film supported by said master film supporting means onto a frame of a copy film supported by said copy film supporting means and located in said printing gate, to effect exposure thereof;
 f. electro-optic modulator means disposed in the light beam between said light source and said printing gate for controlling the exposure of a copy film, the light transmitted by said modulator means being a function of the electrical energy applied thereto;

g. electric circuit means connected to said modulator means for controlling the electrical energy applied to said modulator means; and h. means for detecting when a sprocket hole of one of said master and copy film passes a fixed location and for generating a pulse, means for scanning the density of a frame of said master film over a plurality of points on its surface, means for triggering said scan as well as controlling its rate of scan by said sprocket detection means, means for storing the highest and lowest density values of said plurality of points, means for computing therefrom the "normal" exposure and color balance of said frame, and means for automatically and dynamically controlling said electro-optic modulator means to deliver the necessary light to effect said "normal" exposure onto said copy film.

100. The optical printer according to claim 99 including means for scanning said plurality of points on said master image frame before said frame enters said gate, means for storing said computed "normal" exposure and color balance values, and means for applying said saved values to said electro-optic modulator control circuits when said frame enters said printing gate.

101. The optical printer according to claim 102 including additional means for focusing said master image upon the surface of said scanning means.

102. The optical printer according to claim 101 including means for varying the focus of said additional focusing means so as to effect variable area averaging of said scanning function.

103. The optical printer according to claim 101 including additional means for measuring the running speed of said printers during said scanning, means for computing densities from said master images and for correcting for variations in apparent densities caused by variations in the running speed of said printer and thus in the rate of said scanning process, and means for storing said corrected density values.

104. The optical printers according to claim 103 including means for measuring the printer frame rate as said scanned master image enters said printing gate and means for correcting exposure and color balance by automatically and dynamically varying the densities of said electro-optic modulators during the exposure of said master image frame.

105. An optical printer for making copies of a master film comprising:
 a. means for supporting a master film;
 b. means for supporting a photosensitive copy material;
 c. a light source;
 d. means, including said light source, for exposing copy material supported by said copy material supporting means to an optical image from a master film supported by said master film supporting means;
 e. electro-optic modulator means comprising a PLZT ceramic between polarizers disposed in the light beam between said light source and said copy material for controlling the exposure of said copy material, the light transmitted by said modulator means being related to the electrical energy applied thereto; and 106. The optical printer according to claim 105 wherein said master film and said copy material are strips and including means for moving said strips together to effect exposure of sequential frames of the master film strip onto the strip of copy material.

107. The optical printer according to claim 105 wherein said master film consists of a plurality of images and including means for sequentially exposing said plurality of master film images onto different areas of said copy material.

108. The optical printer according to claim 26 wherein said plurality of beams include cyan, magenta and yellow light beams.

* * * * *

UNITED STATES PATENT OFFICE
CERTIFICATE OF CORRECTION

Patent No. 4,076,414             Dated February 28, 1978

Inventor(s) David J. Tulbert

It is certified that error appears in the above-identified patent and that said Letters Patent are hereby corrected as shown below:

Claim 6, line 3, delete "projecting" and insert therefor --projection--.

Claim 20, line 3, after "including", delete "electrical energy to said modulator means so as to greatly minimize the difference between said signals" and insert therefor --said electro optic modulator means for accurately and conveniently modulating exposure intensity, each of said feedback loops comprising:--.

Claim 20(d), line 3, after "means" delete "in proportion to the detected difference between said signals" and insert therefor --so as to greatly minimize the difference between said signals.--

Claim 101, line 1, delete "102" and insert therefor --100--.

UNITED STATES PATENT OFFICE
CERTIFICATE OF CORRECTION

Patent No. 4,076,414  Dated February 28, 1978

Inventor(s) David J. Tulbert

It is certified that error appears in the above-identified patent and that said Letters Patent are hereby corrected as shown below:

Claim 105, insert --(f) electric circuit means connected to said modulator means for controlling the electrical energy applied to said modulator means.--

Signed and Sealed this

Fifteenth Day of August 1978

[SEAL]

Attest:

RUTH C. MASON
Attesting Officer

DONALD W. BANNER
Commissioner of Patents and Trademarks